United States Patent
Iwanaga et al.

(10) Patent No.: US 6,748,811 B1
(45) Date of Patent: Jun. 15, 2004

(54) ULTRASONIC FLOWMETER

(75) Inventors: Shigeru Iwanaga, Nara (JP); Yasuhiro Umekage, Kurita-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/936,890

(22) PCT Filed: Mar. 17, 2000

(86) PCT No.: PCT/JP00/01689

§ 371 (c)(1),
(2), (4) Date: Nov. 7, 2001

(87) PCT Pub. No.: WO00/55581

PCT Pub. Date: Sep. 21, 2000

(30) Foreign Application Priority Data

| Mar. 17, 1999 | (JP) | ............................................. 11-71458 |
| Mar. 31, 1999 | (JP) | ............................................. 11-92560 |
| Apr. 9, 1999 | (JP) | ........................................... 11-102240 |
| Apr. 15, 1999 | (JP) | ........................................... 11-107878 |

(51) Int. Cl.$^7$ ................................................. G01F 1/66
(52) U.S. Cl. ............................... 73/861.27; 73/861.18; 73/361.356
(58) Field of Search ....................... 73/861.18–861.357, 73/861; 389/597

(56) References Cited

U.S. PATENT DOCUMENTS

| 4,556,813 A | * | 12/1985 | Baumoel | ..................... 310/334 |
| 5,311,781 A | * | 5/1994 | Gates | ...................... 73/861.25 |
| 5,351,560 A | * | 10/1994 | Russwurm | ............... 73/861.27 |
| 5,817,932 A | | 10/1998 | Nishimura et al. | |
| 6,089,104 A | * | 7/2000 | Chang | ..................... 73/861.27 |

FOREIGN PATENT DOCUMENTS

| JP | 57-194313 | 11/1982 |
| JP | 58-812 | 1/1983 |
| JP | 60-169716 | 9/1985 |
| JP | 9-21666 | 1/1997 |
| JP | 09-189591 | 7/1997 |
| JP | 10-239125 | 9/1998 |
| WO | WO 97/45707 | 12/1997 |

* cited by examiner

*Primary Examiner*—Edward Lefkowitz
*Assistant Examiner*—Alandra M. Ellington
(74) *Attorney, Agent, or Firm*—Snell & Wilmer, LLP

(57) ABSTRACT

An ultrasonic flow meter of the present invention includes: a measurement flow path 6 through which a fluid to be measured flows; ultrasonic transducers 8 and 9 provided respectively on an upstream side and a downstream side with respect to each other along the measurement flow path 6; an upstream aperture hole 11 and a downstream aperture hole 12, the aperture holes 11 and 12 for exposing the ultrasonic transducers 8 and 9 to the measurement flow path 6; a first influent suppressor 15 provided in a vicinity of at least the downstream aperture hole 12 for reducing inflow of the fluid to be measured into the aperture hole 12; a second influent suppressor 16 provided on an upstream side of the measurement flow path 6 with respect to the aperture holes 11 and 12 for reducing the inflow of the fluid to be measured into the aperture holes 11 and 12; a measurement control section 19 for measuring a propagation time of an ultrasonic wave between the ultrasonic transducers 8 and 9; and a calculation section 20 for calculating a flow rate based on a signal from the measurement control section 19. The first influent suppressor 15 provided for the downstream aperture hole 12 comprises an aperture hole sealing section 21 having at least one ultrasonically transmissive hole 22. Thus, it is possible to stabilize the flow between the ultrasonic transducers so as to enhance the ultrasonic reception level, thereby increasing the measurement precision and the upper limit value for the flow rate measurement, and to reduce the driving input for the ultrasonic transducers.

88 Claims, 44 Drawing Sheets

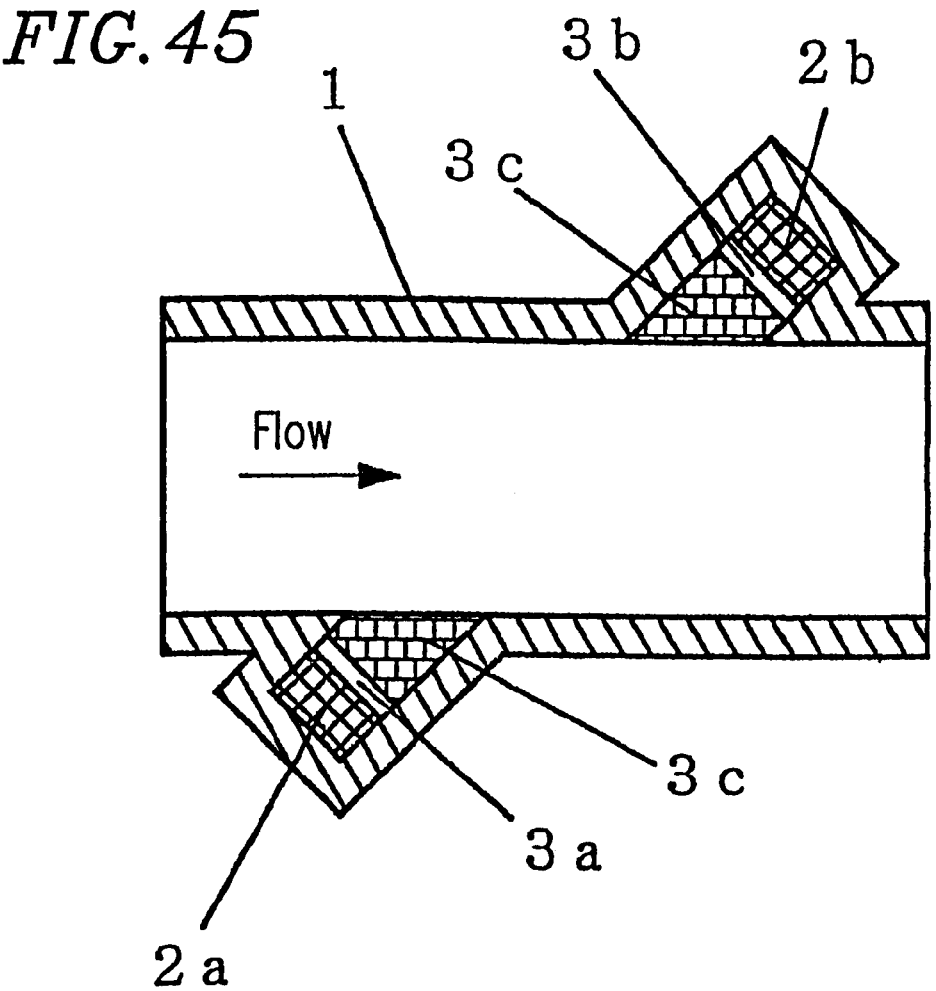

ULTRASONIC FLOWMETER

TECHNICAL FIELD

The present invention relates to an ultrasonic flow meter for ultrasonically measuring a flow rate and/or a flow velocity of a gas or a fluid.

BACKGROUND ART

Conventionally, ultrasonic flow meters of this type are known in the art such as that disclosed in Japanese Laid-Open Publication No. 11-351926. As illustrated in FIG. 44, an ultrasonic flow meter includes measurement pipe 1 for allowing a fluid to flow from one end to the other end thereof, an upstream ultrasonic transducer 2a, and a downstream ultrasonic transducer 2b. The upstream ultrasonic transducer 2a and the downstream ultrasonic transducer 2b oppose each other via the measurement pipe 1 therebetween with a predetermined angle with respect to the center line of the measurement pipe 1. The upstream ultrasonic transducer 2a and the downstream ultrasonic transducer 2b are housed in depressions 3a and 3b, respectively, of the measurement pipe 1. A flow variation suppressing section 5 is further provided on an inlet side 4 of the measurement pipe 1. A fluid entering the measurement pipe 1 is regulated by the flow variation suppressing section 5 so as to reduce the inclination of the flow line in the measurement section and/or to suppress the generation of a vortex, thereby reducing the variation in the ultrasonic reception level due to the reflection and/or refraction of the ultrasonic wave at the interface of a flow disturbance, and thus preventing the measurement precision from deteriorating.

Other conventional examples are known in the art such as that disclosed in Japanese Laid-Open Publication No. 63-26537. As illustrated in FIG. 45, a pair of the ultrasonic transducers 2a and 2b are provided along the wall surface of the measurement pipe 1 respectively on the upstream side and the downstream side with respect to each other. The ultrasonic transducers 2a and 2b are housed in the depressions 3a and 3b, respectively, provided in the measurement pipe 1, with a bulk ultrasonically transmissive member 3c in the cavity space of each of the depressions 3a and 3b, so as to prevent a flow from entering the depressions 3a and 3b, thereby providing a high-precision flow rate measurement.

With the conventional structure as illustrated in FIG. 44, it is possible to reduce flow disturbances in the measurement section of the measurement pipe 1 and the depressions 3a and 3b by the flow variation suppressing section 5, thereby reducing the deterioration of the measurement precision. However, when the flow rate through the measurement pipe 1 increases, the fluid flows into the depressions 3a and 3b to cause a vortex, thereby increasing the flow disturbance between the ultrasonic transducers 2a and 2b. In such a case, the ultrasonic wave is reflected or refracted by the increased vortex, thereby lowering the ultrasonic reception level. Thus, it is difficult to reduce the driving input for the ultrasonic transducers 2a and 2b.

With the conventional structure as illustrated in FIG. 45 in which the bulk ultrasonically transmissive member 3c is provided in each of the depressions 3a and 3b, a propagation loss may occur during the propagation of the ultrasonic wave through the bulk ultrasonically transmissive member 3a, thereby lowering the ultrasonic transmission output or the ultrasonic reception sensitivity. Moreover, because the ultrasonic wave is propagated through a solid as it passes through the bulk ultrasonically transmissive member 3a, the rectilinear property thereof is reduced so that it is difficult to radiate the ultrasonic wave toward the opposing ultrasonic transducer. Thus, it is difficult to reduce the power consumption of the flow meter so that it can be used as a device such as a gas meter for measuring the amount of a fuel gas for household use such as town gas or LPG which is used over an extended period of time, e.g., 10 years, with only a small electric cell capacity.

The present invention solves the above-described problems. An objective of the present invention is to reduce the generation of flow disturbances or vortices between ultrasonic transducers so as to enhance the ultrasonic reception level, thereby increasing the measurement precision and the upper limit value for the flow rate measurement, and reducing the power consumption by reducing the driving input for the ultrasonic transducers.

DISCLOSURE OF THE INVENTION

An ultrasonic flow meter of the present invention includes: a measurement flow path through which a fluid to be measured flows; ultrasonic transducers provided respectively on an upstream side and a downstream side with respect to each other along the measurement flow path; an upstream aperture hole and a downstream aperture hole, the aperture holes for exposing the ultrasonic transducers to the measurement flow path; a first influent suppressor provided in a vicinity of at least the downstream aperture hole for reducing inflow of the fluid to be measured into the aperture hole; a second influent suppressor provided on an upstream side of the measurement flow path with respect to the aperture holes for reducing the inflow of the fluid to be measured into the aperture holes; a measurement control section for measuring a propagation time of an ultrasonic wave between the ultrasonic transducers; and a calculation section for calculating a flow rate based on a signal from the measurement control section, wherein the first influent suppressor provided for the downstream aperture hole includes an aperture hole sealing section having at least one ultrasonically transmissive hole. Thus, it is possible to stabilize the flow between the ultrasonic transducers so as to enhance the ultrasonic reception level, thereby increasing the measurement precision and the upper limit value for the flow rate measurement, and to reduce the driving input for the ultrasonic transducers by the enhancement of the ultrasonic reception level and by improving the attenuation of the ultrasonic wave by providing the influent suppressor.

Another ultrasonic flow meter of the present invention includes: a measurement flow path through which a fluid to be measured flows; ultrasonic transducers provided respectively on an upstream side and a downstream side with respect to each other along the measurement flow path; an upstream aperture hole and a downstream aperture hole, the aperture holes for exposing the ultrasonic transducers to the measurement flow path; a first influent suppressor and a second influent suppressor for reducing inflow of the fluid to be measured into the aperture holes for both a forward flow and a reverse flow of the fluid to be measured; a measurement control section for measuring a propagation time of an ultrasonic wave between the ultrasonic transducers; and a calculation section for calculating a flow rate based on a signal from the measurement control section, wherein: the first influent suppressor provided for the aperture hole which is on the downstream side when the fluid flows in a forward direction is an aperture hole sealing section having at least one ultrasonically transmissive hole; and the second influent suppressor is provided on both an inlet side and an outlet side of the measurement flow path. Thus, even when the flow has a pulsation and causes a momentary reverse flow, it is possible to reduce, as in the case of a forward flow, the inflow of the fluid to be measured into the aperture hole, and to significantly reduce flow disturbances between the ultrasonic transducers, thereby increasing the measurement precision and the upper limit value for the flow rate measurement.

Another ultrasonic flow meter of the present invention includes: a measurement flow path through which a fluid to be measured flows; ultrasonic transducers provided respectively on an upstream side and a downstream side with respect to each other along the measurement flow path; aperture holes for exposing each ultrasonic transducer to the measurement flow path; a propagation path flow regulator provided along an ultrasonic wave propagation path between the upstream ultrasonic transducer and the downstream ultrasonic transducer and having a regulation section exposed to the flow; a measurement control section for measuring a propagation time of an ultrasonic wave between the ultrasonic transducers; and a calculation section for calculating a flow rate based on a signal from the measurement control section. Thus, the regulation section of the propagation path flow regulator arranged immediately upstream of the ultrasonic wave propagation path facilitates the disturbance of the flow across the entire zone from the upstream side to the downstream side of the ultrasonic wave propagation path. Therefore, in the ultrasonic wave propagation path, the flow condition is equally disturbed across the entire area of the ultrasonic wave propagation path along the width direction from an area near the upstream aperture hole to an area near the downstream aperture hole irrespective of the flow rate, whereby it is possible to reduce the changes in the correction coefficient across the entire flow rate measurement zone, thereby preventing increases in the error due to the correction coefficient and increasing the measurement precision. Thus, the measurement precision is maintained even when the Reynolds number changes due to the change in the kinematic viscosity of the fluid, whereby it is possible to realize a measurement device which is resistant against changes in the temperature of the fluid or changes in the composition of the fluid, thereby increasing the practicability of the device.

Another ultrasonic flow meter of the present invention includes: a measurement flow path through which a fluid to be measured flows; ultrasonic transducers provided respectively on an upstream side and a downstream side with respect to each other along the measurement flow path; aperture holes for exposing each ultrasonic transducer to the measurement flow path; a propagation path flow regulator provided along an ultrasonic wave propagation path between the upstream ultrasonic transducer and the downstream ultrasonic transducer and having a regulation section exposed to the flow; an influent suppressor for reducing inflow of the fluid to be measured into the aperture hole; a measurement control section for measuring a propagation time of an ultrasonic wave between the ultrasonic transducers; and a calculation section for calculating a flow rate based on a signal from the measurement control section. Thus, the regulation section of the propagation path flow regulator arranged immediately upstream of the ultrasonic wave propagation path facilitates the disturbance of the flow across the entire zone from the upstream side to the downstream side of the ultrasonic wave propagation path. Therefore, in the ultrasonic wave propagation path, the flow condition is equally disturbed across the entire area of the ultrasonic wave propagation path along the width direction from an area near the upstream aperture hole to an area near the downstream aperture hole irrespective of the flow rate, whereby it is possible to reduce the changes in the correction coefficient across the entire flow rate measurement zone, thereby preventing increases in the error due to the correction coefficient and increasing the measurement precision. Moreover, it is possible to arrange the influent suppressor for the aperture hole which opens into the measurement flow path so as to reduce the fluid flow into the aperture hole, thereby significantly reducing flow disturbances along the ultrasonic wave propagation path between the ultrasonic transducers and increasing the upper limit value for the flow rate measurement.

In one embodiment, the first influent suppressor provided for the upstream aperture hole is a flow deflector. Thus, it is possible to eliminate the propagation losses of the ultrasonic waves through the ultrasonically transmissive hole for the upstream aperture hole, thereby reducing the driving input for the ultrasonic transducers, and to reduce the flow of the fluid into the upstream aperture hole, thereby stabilizing flow disturbances along the ultrasonic wave propagation path and improving the measurement precision.

In one embodiment, the first influent suppressor provided for the upstream aperture hole is an aperture hole sealing section having at least one ultrasonically transmissive hole. Thus, it is possible to significantly reduce the inflow of the fluid into the upstream and downstream aperture holes, thereby increasing the upper limit value for the flow rate measurement and increasing the measurement precision even for a flow which is accompanied by a reverse flow. Moreover, it is possible to realize an ultrasonic transmission/reception with desirable S/N characteristics by the significant reduction in flow disturbances due to the aperture hole. Thus, it is possible to reduce the transmission output and the driving input, thereby reducing the power consumption.

In one embodiment, an aperture ratio of the aperture hole sealing section provided for the upstream aperture hole is greater than an aperture ratio of the aperture hole sealing section provided for the downstream aperture hole. Thus, propagation losses of the ultrasonic waves can be reduced, whereby it is possible to improve the upper limit value for the flow rate measurement and the measurement precision for a reverse flow, and to reduce the power consumption by reducing the driving input for the ultrasonic transducers.

In one embodiment, the propagation path flow regulator is arranged on the upstream side and the downstream side with respect to the ultrasonic wave propagation path. Thus, the ultrasonic wave propagation path is surrounded by the upstream and downstream propagation path flow regulators, whereby it is possible to equalize the disturbance condition from the upstream side and the downstream side of the ultrasonic wave propagation path, thereby further stabilizing the correction coefficient and further improving the measurement precision. Moreover, the influence of the flow condition on the downstream side along the measurement flow path is reduced by the downstream propagation path flow regulator. Thus, it is possible to realize a stable measurement irrespective of the piping condition on the downstream side of the measurement device, thereby improving the freedom in the installment of the measurement device. Moreover, the same effect is obtained both for a forward flow and a reverse flow along the measurement flow path, so that it is possible to stabilize the correction coefficient even for a pulsating flow, thereby increasing the measurement precision.

In one embodiment, the propagation path flow regulators arranged on the upstream side and the downstream side with respect to the ultrasonic wave propagation path are integrated together via a connector section. Thus, it is possible to prevent and stabilize a shift in the distance between the propagation path flow regulators or a positional shift between the upstream regulation section and the downstream regulation section, thereby realizing a measurement device with reduced variation. Moreover, the connecting section reinforces the propagation path flow regulators, whereby it is possible to reduce the size or the thickness of the regulation section. Therefore, it is possible to equalize the flow condition in the ultrasonic wave propagation path or to reduce the loss of pressure in the measurement flow path.

In one embodiment, the propagation path flow regulators arranged on the upstream side and the downstream side with respect to the ultrasonic wave propagation path and the influent suppressor are integrated together. Thus, it is possible to define the positional relationship, e.g., distance, between the upstream and downstream propagation path flow regulators and the influent suppressor, thereby stabilizing the flow condition. Therefore, it is possible to reduce the variations in the flow condition in the ultrasonic wave propagation path and to realize a stable measurement with little variation. It is possible by such integration to further increase the mechanical strength of the propagation path flow regulator, thereby preventing its deformation over a long term use and thus improving its durability and reliability.

In one embodiment, the influent suppressor is a first influent suppressor provided for the downstream aperture hole. Thus, the influent suppressor is arranged for the downstream aperture hole around which a strong vortex easily occurs because the downstream aperture hole extends in a direction at an acute angle with respect to the flow. Therefore, it is possible to reduce the fluid flow into the aperture hole so as to efficiently reduce flow disturbances between the ultrasonic transducers, thereby increasing the upper limit value for the flow rate measurement.

In one embodiment, the influent suppressor is a first influent suppressor provided for the upstream aperture hole and the downstream aperture hole. Thus, disturbances in the aperture hole, which account for a major part of the total flow disturbance in the ultrasonic wave propagation path, can be reduced efficiently, whereby it is possible to increase the measurement precision and the upper limit value for the flow rate measurement.

In one embodiment, the influent suppressor is a second influent suppressor which is obtained by providing the propagation path flow regulator arranged along the ultrasonic wave propagation path with an influent suppressing section. Thus, by the integration of the propagation path flow regulator with the influent suppressor, it is possible to reduce variations in the suppression of the fluid flow into the aperture hole, thereby increasing the reliability and allowing for provision of a compact ultrasonic wave propagation path. Therefore, it is possible to reduce the size of the measurement flow path.

In one embodiment, the influent suppressor includes a first influent suppressor provided for the aperture hole and a second influent suppressor obtained by providing the propagation path flow regulator with an influent suppressing section. Thus, the disturbance in the aperture hole is reduced by the multiplier effect of the first and second influent suppressors, and variations in the suppression of the fluid flow into the aperture hole are reduced by the integration of the propagation path flow regulator and the influent suppressor. Therefore, it is possible to increase the measurement precision and the reliability. Moreover, it is possible to provide a compact ultrasonic wave propagation path, thereby reducing the size of the measurement flow path.

In one embodiment, the first influent suppressor is an aperture hole sealing section having at least one ultrasonically transmissive hole. Thus, by covering the aperture hole with the aperture hole sealing section, it is possible to further increase the effect of suppressing the flow of the fluid to be measured into the aperture hole, thereby reducing and stabilizing the flow in the aperture hole.

In one embodiment, the first influent suppressor includes an aperture hole sealing section having at least one ultrasonically transmissive hole and a flow deflector provided in a vicinity of the aperture hole. Thus, it is possible to further increase the effect of suppressing the flow of the fluid to be measured into the aperture hole, thereby further improving the measurement precision. Moreover, it is possible by the provision of the flow deflector to reduce the attachment of foreign matter such as dust onto the aperture hole sealing section. Thus, the aperture hole sealing section can be selected primarily in view of the ultrasonic transmissivity without so much concern about the clogging of the aperture hole sealing section, thereby increasing the freedom of the selection. Moreover, it is possible to further increase the ultrasonic transmissivity so as to reduce the power consumption, or to further increase the sensitivity so as to realize a device with a desirable measurement precision.

In one embodiment, an aperture ratio of the aperture hole sealing section provided for the upstream aperture hole is greater than an aperture ratio of the aperture hole sealing section provided for the downstream aperture hole. Thus, propagation losses of the ultrasonic waves can be reduced, whereby it is possible to improve the upper limit value for the flow rate measurement and the measurement precision for a reverse flow, and to reduce the power consumption by reducing the driving input for the ultrasonic transducers.

In one embodiment, the aperture hole sealing section is a meshed member of an inclined mesh pattern having an inclination with respect to a horizontal direction. Thus, the pattern is inclined with respect to the horizontal direction, so that it is possible to facilitate settling of minute particles such as dust attached onto the inclined mesh portions, thereby reducing the amount of such minute particles deposited and thus preventing clogging of the meshed member. Therefore, it is possible to ensure propagation of the ultrasonic wave therethrough and to maintain a stable measurement precision over a long time, thereby improving the durability and reliability.

In one embodiment, the flow deflector is provided on the upstream side and the downstream side of the aperture hole. Thus, both for a forward flow and a reverse flow along the measurement flow path, it is possible to further improve the measurement precision, to suppress the flow into the aperture hole, and to prevent foreign matter from entering the aperture hole. Therefore, even for a pulsating flow which is accompanied by a reverse flow, it is possible to maintain a stable measurement precision over a long time, thereby improving the durability and reliability.

In one embodiment, a distance between the propagation path flow regulator and the ultrasonic propagation path is varied depending on a type of the fluid to be measured. Thus, it is possible to commonly use the measurement flow path irrespective of the type of the fluid to be measured by changing only the propagation path flow regulator, thereby improving the convenience, and to maintain a stable measurement precision irrespective of the fluid to be measured.

Moreover, since the measurement flow path can be commonly used, it is possible to reduce the cost.

In one embodiment, the regulation section of the propagation path flow regulator is provided in the form of a meshed member. Thus, it is possible to reduce the installment space of the propagation path flow regulator with respect to the flow direction, thereby reducing the size of the measurement flow path.

In one embodiment, the regulation section of the propagation path flow regulator is provided in the form of a lattice member whose wall surfaces extend along the flow direction. Thus, it is possible to regulate the flow direction by the wall surfaces extending along the flow direction, thereby further equalizing the flow velocity distribution in the ultrasonic wave propagation path and thus improving the measurement precision.

In one embodiment, an interval between two adjacent regulation sections of the propagation path flow regulator is varied depending on a position along a transverse section of the measurement flow path. Thus, it is possible to optimize the size of each regulation section according to the position along the transverse section of the measurement flow path while maintaining a reduced length of the regulation section along the flow direction. Therefore, it is possible to further equalize the flow velocity distribution in the ultrasonic wave propagation path and reduce the length of the regulation section along the flow direction, thereby reducing pressure losses while improving the measurement precision due to the equalization of the flow velocity distribution.

In one embodiment, a cross section of the measurement flow path along a direction perpendicular to the flow therethrough has a rectangular shape. Thus, by employing the rectangular cross section, it is possible to increase the measurement area with respect to the total measurement cross-sectional area, thereby allowing for a flow measurement under the same condition from the upstream side to the downstream side of the ultrasonic wave propagation path. Moreover, it is possible to increase the two-dimensionality of the flow along the measurement flow path, thereby allowing for a high precision measurement of the average flow velocity of the fluid. Furthermore, it is possible to further increase the two-dimensionality of the flow by providing a second influent suppressor.

In one embodiment, a cross section of the measurement flow path along a direction perpendicular to the flow therethrough has a rectangular shape with an aspect ratio less than 2. Thus, it is not necessary to create a two-dimensional flow by increasing the aspect ratio, and it is possible to freely set the cross-sectional specification according to the height of the flow path such that interference by reflected waves is reduced, thereby allowing for ultrasonic transmission/reception with an increased sensitivity. Moreover, it is possible to reduce the loss of pressure in the measurement flow path by adjusting the measurement cross section such that the length along which the measurement cross section contacts the fluid is reduced without excessively flattening the measurement cross section.

In one embodiment, the aperture hole opens into the measurement flow path in a shape which has a side extending along a direction substantially perpendicular to the direction of the flow through the measurement flow path. Thus, it is possible to equally transmit/receive the ultrasonic wave with respect to the height direction of the measurement flow path, and to shorten the aperture length of the aperture hole in the measurement flow path along the flow direction. Therefore, it is possible to further reduce flow disturbances due to the aperture hole, thereby further improving the measurement precision.

In one embodiment, an introduction section arranged on the upstream side of the measurement flow path is provided with a non-uniform flow suppressor which has a passage opening with a minute aperture. Thus, it is possible to supply a stable flow into the measurement flow path irrespective of the shape of the flow path or the piping configuration upstream of the measurement flow path, thereby reducing flow disturbances between the ultrasonic transducers. Therefore, it is possible to further increase the upper limit value for the flow rate measurement and to further improve the measurement precision. Moreover, it is possible to realize a stable measurement irrespective of the shape of the flow path or the piping configuration upstream of the measurement flow path, thereby increasing the freedom in the installment of the measurement device.

In one embodiment, an introduction section arranged on the upstream side of the measurement flow path and an exit section arranged on the downstream side of the measurement flow path are each provided with a non-uniform flow suppressor which has a passage opening with a minute aperture. Thus, it is possible to supply a stable flow into the measurement flow path even when the fluid to be measured has a pulsating flow which is accompanied by a reverse flow or the fluid to be measured has a pulsation source on the downstream side. Therefore, it is possible to reduce flow disturbances between the ultrasonic transducers, to further improve the upper limit value for the flow rate measurement, and to further improve the measurement precision. Moreover, it is possible to realize a stable measurement irrespective of the shape of the flow path, the piping configuration, or the pulsation source, upstream or downstream of the measurement flow path, thereby further improving the freedom in the installment of the measurement device.

In one embodiment, a cross-sectional area of the introduction section or the exit section is greater than a cross-sectional area of the measurement flow path. Thus, it is possible to increase the installment cross-sectional area of the non-uniform flow suppressor so as to reduce pressure losses due to the non-uniform flow suppressor, thereby preventing increases in the pressure loss. Moreover, it is possible to increase the cross-sectional area of the introduction section or the exit section, thereby allowing for attachment of the measurement device without changing the shape of the introduction section or the exit section even when the shape of the flow path or the piping configuration on the upstream side or the downstream side is varied. Thus, it is possible to realize a measurement device with an increased freedom in the installment thereof.

In one embodiment, an aperture size of the passage opening of the non-uniform flow suppressor is less than an aperture size of a passage opening provided in the second influent suppressor. Thus, even when the upstream or downstream connection port is arranged with a positional shift, the fluid can equally flow within the measurement flow path, thereby allowing for a measurement with an increased measurement precision. Moreover, even when the fluid to be measured has a pulsation, it is possible to supply the fluid into the measurement flow path in a flow with a reduced pulsation due to the passage opening having a small aperture size, thereby improving the measurement precision even for a pulsating flow. Furthermore, due to the passage opening of the non-uniform flow suppressor having a small aperture size, it is possible to reduce the amount of dirt and/or dust entering the measurement section, thereby increasing the reliability of the measurement operation along the measurement flow path.

In one embodiment, another ultrasonic flow meter of the present invention includes: a measurement flow path through which a fluid to be measured flows; ultrasonic transducers provided respectively on an upstream side and a downstream side with respect to each other along the measurement flow path; and an upstream aperture hole and a downstream aperture hole, the aperture holes for exposing the ultrasonic transducers to the measurement flow path, wherein at least one of the aperture holes includes a plurality of partitioned paths extending along a propagation direction of the ultrasonic wave. Thus, since the ultrasonic wave propagates through the fluid within the partitioned paths, there is little decrease in the sensitivity. Moreover, due to the partitioning of the paths, it is possible to maintain the rectilinear property of the ultrasonic wave and to realize a desirable transmission/reception thereof. Furthermore, the aperture flow path within the aperture hole provided along the side surface of the flow path is divided into small parts, whereby a vortex is less likely to occur and it is possible to reduce the flow of the fluid into the aperture hole. Therefore, it is possible to properly measure the flow rate even when a pulsation occurs.

In one embodiment, at least one of the aperture holes includes a plurality of partitioned paths extending along a propagation direction of the ultrasonic wave. Thus, the fluid flow into the aperture hole can be reduced by the influent suppressor and the upper limit value for the measurement can be improved. Moreover, since the ultrasonic wave propagates through the fluid within the partitioned paths, there is little decrease in the sensitivity. Furthermore, due to the partitioning of the paths, it is possible to maintain the rectilinear property of the ultrasonic wave and to realize a desirable transmission/reception thereof. Moreover, the aperture flow path within the aperture hole provided along the side surface of the flow path is divided into small parts, whereby a vortex is less likely to occur and it is possible to further reduce the flow of the fluid into the aperture hole. Therefore, it is possible to properly measure the flow rate even when a pulsation occurs.

In one embodiment, each of the partitioned paths has an inlet surface extending along a vibration surface of the ultrasonic transducer and an outlet surface extending along a wall surface of the measurement flow path. Thus, since the ultrasonic waves can enter the partitioned paths at a right angle and thus travel therethrough in a straight path, an ultrasonic wave propagation path with no reflection and little attenuation is provided. Moreover, since the outlet is a flat surface with respect to the wall surface of the flow path, there is no disturbance in the flow in the periphery layer along the wall surface of the flow path. Furthermore, due to the alignment of the outlet surface as the radiation surface, it is possible to radiate the ultrasonic wave efficiently.

In one embodiment, each of the partitioned paths of one of the aperture holes extends colinearly with a corresponding one of the partitioned paths of the other aperture hole. Thus, the transmission surface and the reception surface are aligned with each other along the traveling direction of the ultrasonic wave, whereby it is possible to reduce the reflective attenuation thereof due to the partition plate in the partitioned paths of the opposing aperture hole.

In one embodiment, one side of a vertical section of each of the partitioned paths is longer than a half wavelength of an ultrasonic wave used for transmission/reception. Thus, the viscosity influence from the partition surface is reduced, whereby it is possible to provide partitioned paths with little attenuation.

In one embodiment, one side of a vertical section of each of the partitioned paths is not an integral multiple of a half wavelength of an ultrasonic wave used for transmission/reception. Thus, it is possible to suppress resonance in the lateral direction, thereby realizing an efficient propagation.

In one embodiment, a distance between the partitioned paths of the aperture hole and the vibration surface of a corresponding one of the ultrasonic transducers is an integral multiple of a half wavelength of the ultrasonic wave. Thus, resonance is provided at the half wavelength, whereby it is possible to provide an efficient radiation.

In one embodiment, a thickness of each partition of the partitioned paths is shorter than the wavelength of an ultrasonic wave used for transmission/reception. Thus, it is possible to prevent the reflection of the ultrasonic wave, thereby providing an efficient transmission/reception thereof.

In one embodiment, the partitioned paths are formed by fitting a honeycomb lattice into the aperture hole. Thus, by the employment of a lattice, it is possible to divide each aperture hole in the vertical and lateral directions.

In one embodiment, one of the partitioned paths has its opening at a center of the aperture hole. Thus, the aperture hole is aligned with the center of the ultrasonic transducer, thereby allowing for an efficient transmission/reception.

In one embodiment, a path length of each of the partitioned paths is shorter than the wavelength of an ultrasonic wave used for transmission/reception. Thus, it is possible to provide an ultrasonic wave propagation path with little attenuation.

In one embodiment, the partitioned paths are formed by arranging a net member in the aperture hole along a direction perpendicular to a propagation direction of the ultrasonic wave. Thus, by dividing the aperture hole with a net, it is possible to minimize the length of the path.

In one embodiment, each of the partitioned paths includes a communication section at a certain point along its length for communicating the partitioned path with an adjacent one of the partitioned paths. Thus, it is possible to minimize the attenuation due to the partition plates.

BRIEF DESCRIPTION OF THE DRAWINGS

FIG. 41 is a cross-sectional view illustrating communication sections of the partitioned paths according to Embodiment 6 of the present invention;

FIG. 45 is a diagram illustrating a structure of another conventional ultrasonic flow meter.

BEST MODE FOR CARRYING OUT THE INVENTION

Embodiments of the present invention will now be described with reference to the drawings.

EMBODIMENT 1

Figure 1:
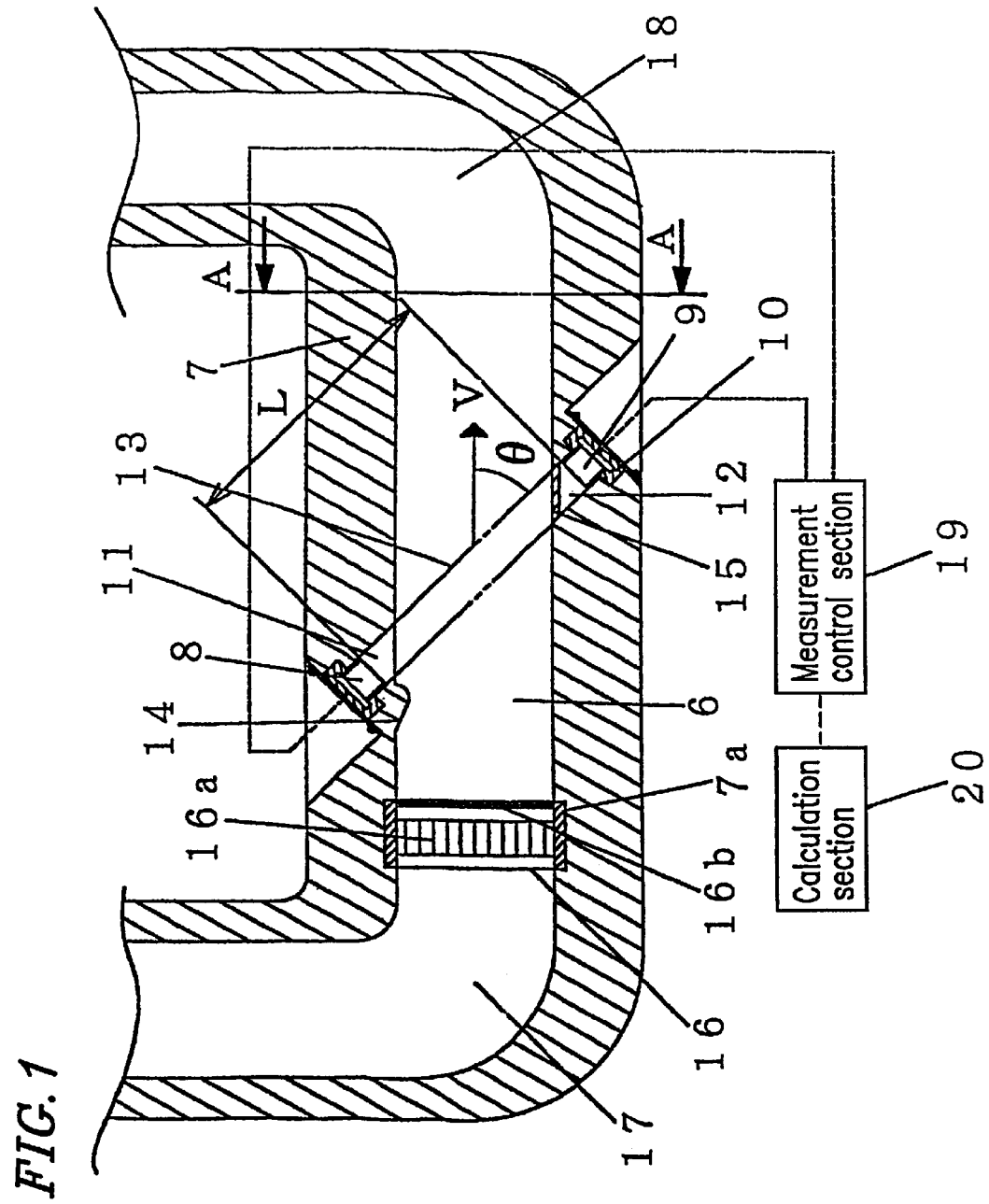
FIG. 1 is a cross-sectional view illustrating a structure of an ultrasonic flow meter according to Embodiment 1 of the present invention.

FIG. 1 is a cross-sectional view illustrating a structure of an ultrasonic flow meter according to Embodiment 1 of the present invention. In FIG. 1, reference numeral 6 is a measurement flow path surrounded by a flow path wall 7, reference numerals 8 and 9 are upstream and downstream ultrasonic transducers, respectively, attached to the flow path wall 7 via a vibration conduction suppressor 10 so as to oppose each other. The upstream ultrasonic transducer 8 and the downstream ultrasonic transducer 9 are spaced from each other by a distance L and inclined by an angle θ with respect to the flow direction of the measurement flow path 6. Reference numerals 11 and 12 are upstream and downstream aperture holes for exposing the ultrasonic transducers 8 and 9, respectively, to the measurement flow path 6. The aperture holes 11 and 12 are each provided in the form of a depression in the flow path wall 7. Reference numeral 13 is an ultrasonic wave propagation path (indicated by two-dot chain lines) along which an ultrasonic wave transmitted from one of the ultrasonic transducers 8 and 9 opposing each other is propagated directly to the other one of the ultrasonic transducers 8 and 9 without being reflected by the wall surface. Reference numeral 14 is a first influent suppressor provided for the upstream aperture hole 11 for reducing the inflow of the fluid to be measured into the upstream aperture hole 11, and reference numeral 15 is a first influent suppressor provided for the downstream aperture hole 12 for reducing the inflow of the fluid to be measured into the downstream aperture hole 12. Reference numeral 16 is a second influent suppressor provided on the upstream side of the ultrasonic wave propagation path 13 for reducing the inflow of the fluid to be measured into the upstream and downstream aperture holes 11 and 12. The second influent suppressor 16 is fit into a depression 7a provided in the flow path wall 7.

Figure 2:
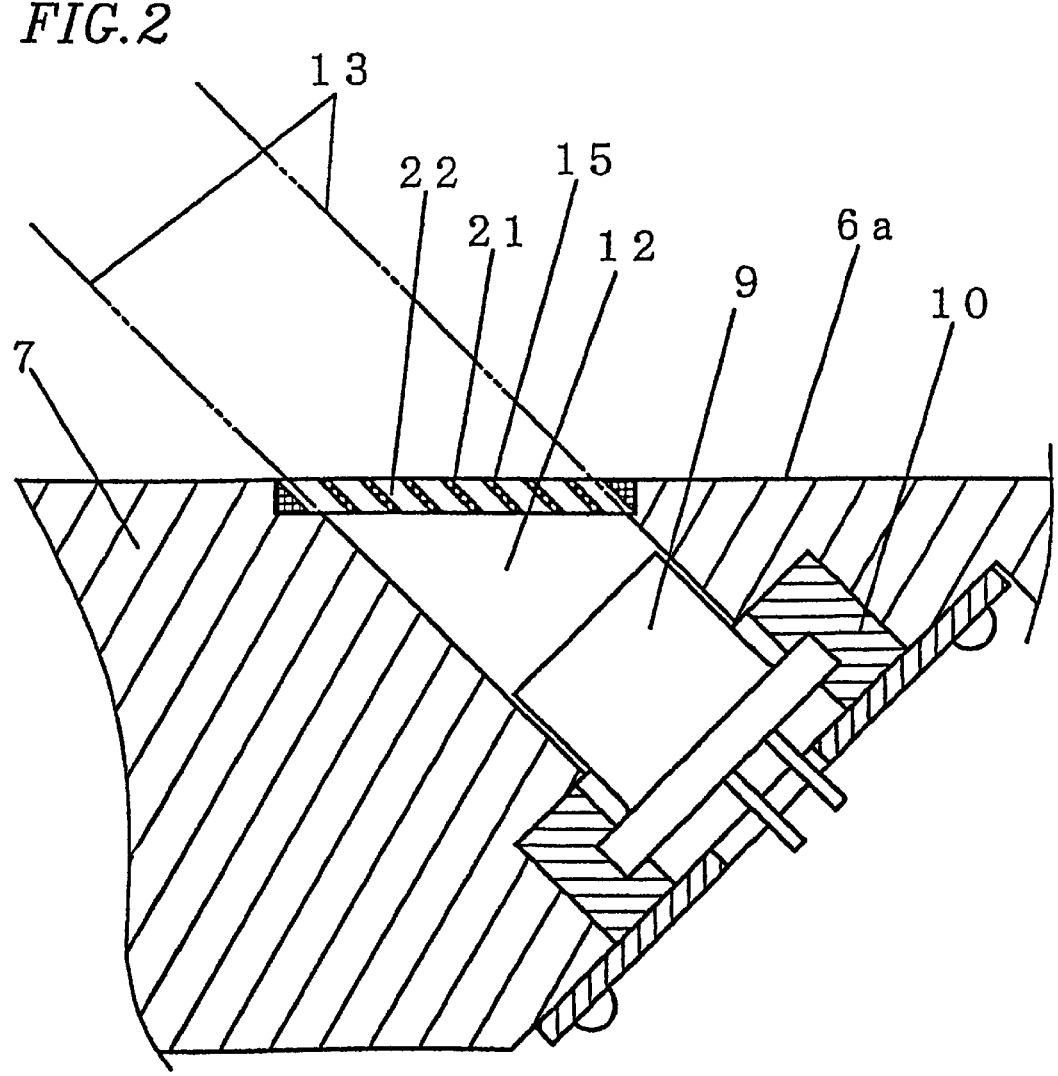
FIG. 2 is a cross-sectional view illustrating a first influent suppressor shown in FIG. 1.

FIG. 2 illustrates the first influent suppressor 15 provided for the downstream aperture hole 12. Reference numeral 21 is an aperture hole sealing section having many ultrasonically transmissive holes 22 capable of transmitting an ultrasonic wave therethrough. The aperture hole sealing section 21 is provided across the ultrasonic wave propagation path 13 so as to cover the aperture hole 12 and extend coplanarly with a measurement flow path surface 6a, thereby preventing the inflow of the fluid to be measured into the aperture hole 12. Herein, the aperture hole sealing section 21 is a mesh, or the like, having many ultrasonically transmissive holes 22 capable of transmitting an ultrasonic wave therethrough, which is directly provided in a portion of the measurement flow path surface 6a of the measurement flow path 6 corresponding to the aperture hole 12 and is coplanar with the measurement flow path surface 6a so as not to disturb the flow.

Figure 3:
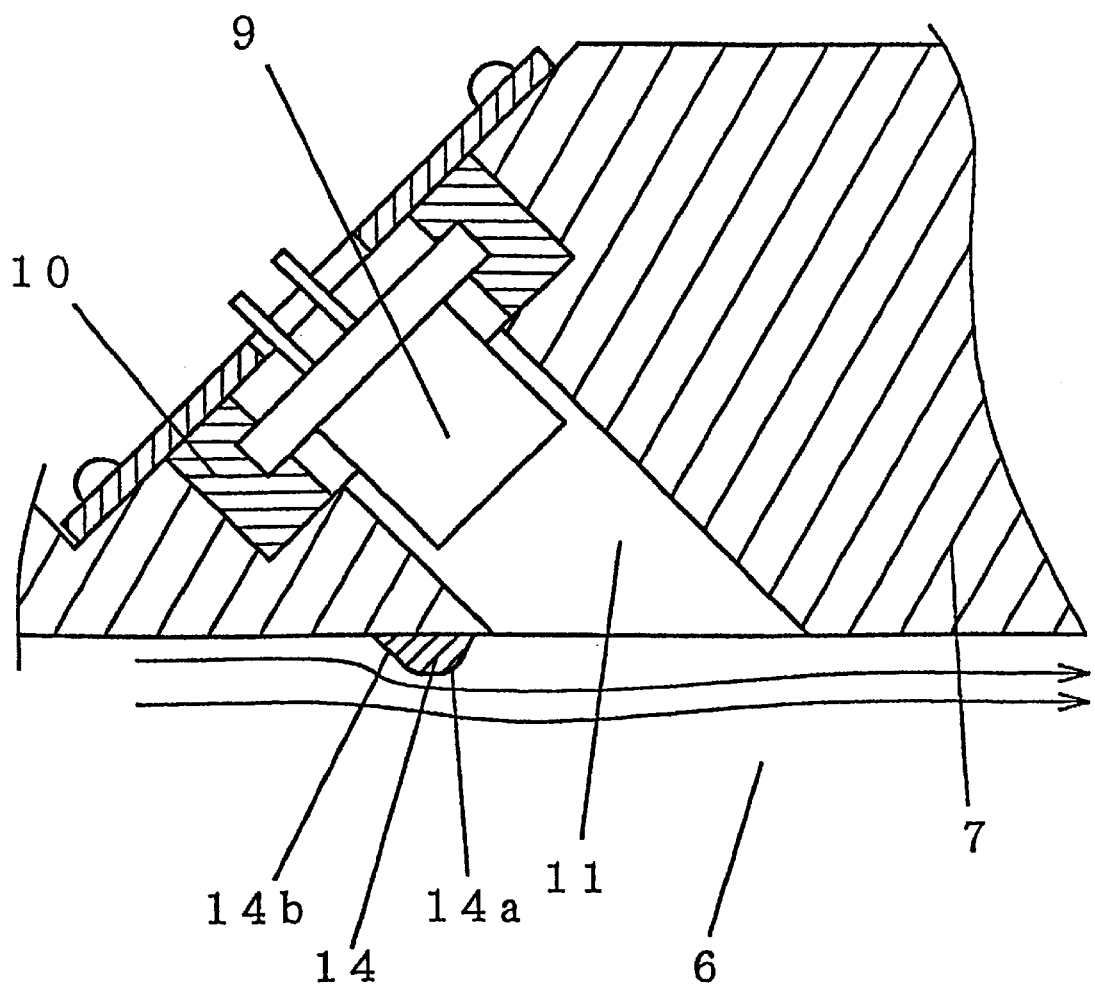
FIG. 3 is a cross-sectional view illustrating an alternative first influent suppressor.

FIG. 3 illustrates the first influent suppressor 14 provided for the upstream aperture hole 11. The first influent suppressor 14 protrudes from the flow path wall 7 and includes a flow deflector 14a in the form of a smooth protrusion and a guide surface 14b provided on the upstream side of the flow deflector 14a with smoothly increasing protrusion heights.

The second influent suppressor 16 has a direction regulation section 16a for adjusting the flow direction of the fluid to be measured and a variation suppressing section 16b for making the flow velocity distribution uniform or reducing the pulsation of the flow. The direction regulation section 16a includes partition walls for dividing the cross section of the measurement flow path 6 into small portions. The variation suppressing section 16b has a small length along the flow direction and has many minute communication paths along the cross section of the measurement flow path 6.

Reference numeral 17 is an upstream elbow section which communicates with a control valve (not shown) provided on the upstream side along the measurement flow path 6, and reference numeral 18 is a downstream elbow section which communicates with an outlet (not shown) provided on the downstream side along the measurement flow path 6. By the use of the elbow sections 17 and 18, the flow path is provided in a compact structure. Reference numeral 19 is a measurement control section connected to the ultrasonic transducers 8 and 9 for effecting the transmission and reception of an ultrasonic wave, and reference-numeral 20 is a calculation section for calculating the flow velocity based on a signal from the measurement control section 19 so as to calculate the flow rate.

Next, the flow rate measurement operation using an ultrasonic wave will be described. Along the ultrasonic wave propagation path 13 of the measurement flow path 6, an ultrasonic wave is transmitted and received between the ultrasonic transducers 8 and 9 across the measurement flow path 6 by the function of the measurement control section 19. Specifically, the propagation time T1, the amount of time required for an ultrasonic wave emitted from the upstream ultrasonic transducer 8 to be received by the downstream ultrasonic transducer 9, is measured. The propagation time T2, the amount of time required for an ultrasonic wave emitted from the downstream ultrasonic transducer 9 to be received by the upstream ultrasonic transducer 8, is also measured.

The flow rate is calculated by the calculation section 20 based on the measured propagation times T1 and T2 according to the expressions shown below.

Where the flow velocity of the fluid to be measured along the longitudinal direction of the measurement flow path 6 is denoted by V, the angle between the flow direction and the ultrasonic wave propagation path 13 is denoted by $\theta$, the distance between the ultrasonic transducers 8 and 9 is denoted by L, and the sound velocity through the fluid to be measured is denoted by C, the flow velocity V is calculated based on the following expressions.

$$T1 = L/(C + V \cos \theta)$$

$$T2 = L/(C - V \cos \theta)$$

The following expression can be obtained by eliminating the sound velocity C from an expression of subtracting the inverse number of T2 from the inverse number of T1.

$$V = (L/2 \cos \theta)((1/T1) - (1/T2))$$

Since the values of $\theta$ and L are known, the flow velocity V can be calculated from the values of T1 and T2. Consider a measurement of the flow rate of an air where angle $\theta = 45°$, distance L=70 mm, sound velocity C=340 m/s, and flow velocity V=8 m/s. Then, $T1 = 2.0 \times 10^{-4}$ sec and $T2 = 2.1 \times 10^{-4}$. Thus, an instantaneous measurement is possible.

Next, from the transverse-sectional area S of the measurement flow path 6 along the direction perpendicular to the flow direction, the flow rate Q is obtained as follows.

$$Q = KVS$$

Herein, K is a correction coefficient which is determined in view of the flow velocity distribution across the transverse-sectional area S.

Thus, the flow rate is obtained by the calculation section 20.

Next, the flow condition in the measurement flow path of the ultrasonic flow meter and the measurement operation thereof will be described. The fluid to be measured enters the measurement flow path 6 with a non-uniform flow or a flow pulsation due to the increase/decrease in the flow path cross-sectional area provided by the control valve (not shown) which is provided on the upstream side of the measurement flow path 6 or due to the passage through the elbow section 17. Then, the flow in the measurement flow path 6 is rectified and the flow disturbance is reduced by the direction regulation section 16a of the second influent suppressor 16 provided on the upstream side of the ultrasonic wave propagation path 13 to a direction such that the fluid does not easily flow into the aperture holes 11 and 12, while disturbances from variations in the flow due to a pulsating flow, or the like, are reduced by the variation suppressing section 16b so as to further suppress the fluid flow into the aperture holes 11 and 12. Then, the flow enters the ultrasonic wave propagation path 13. The variation suppressing section 16b may be a meshed member, a foamed member, a microporous plate, a non-woven fabric, or the like, with a large aperture ratio, which can be provided to have a small thickness along the flow direction. Thus, it is possible to reduce pressure losses by the variation suppressing section 16b, whereby it is possible to reduce variations in the flow along the measurement flow path without increasing the pressure loss. Moreover, it is possible to reduce variations in the flow in a zone where the flow velocity is high so as to suppress variations in the propagation time of the ultrasonic wave, whereby it is possible to increase the upper limit value for the flow rate or flow velocity measurement and to further increase the measurement precision.

Next, in the aperture hole 12 which is opened in front of the downstream ultrasonic transducer 9 where a strong vortex easily occurs because the aperture hole 12 extends in a direction at an acute angle with respect to the measurement flow path, the aperture hole sealing section 21 such as a mesh having many ultrasonically transmissive holes 22 capable of transmitting an ultrasonic wave therethrough is provided along the measurement flow path surface 6a of the measurement flow path 6 for the flow rectified by the second influent suppressor 16 to be coplanar with the measurement flow path surface 6a so as not to disturb the flow. Thus, it is possible to further increase the effect of suppressing the flow of the fluid to be measured into the downstream aperture hole 12 and to significantly reduce the vortices or flow disturbances in the ultrasonic wave propagation path 13. For the upstream aperture hole 11, on the other hand, the first influent suppressor 14 is formed by the flow deflector 14a in the form of a protrusion provided near and on the upstream side of the aperture hole 11 so as to further reduce the flow of the fluid into the aperture hole 11 as indicated by arrows in FIG. 3, thereby reducing flow disturbances such as vortices and stabilizing the flow. Since the upstream aperture hole 11 extends in a direction at an obtuse angle with respect to the measurement flow path 6, the intensity of any vortex is smaller than that for the downstream aperture hole 12. Thus, the adverse influence thereof is small, and it may not be necessary to provide the first influent suppressor 14. However, by providing the first influent suppressor 14 for the upstream aperture hole 11, it is possible to further stabilize the flow. Moreover, the first influent suppressor 14 may be formed integrally with the flow path wall 7 so as to simplify the structure and reduce the cost.

Thus, the ultrasonic waves are transmitted and received between the ultrasonic transducers 8 and 9 along the ultrasonic wave propagation path 13 where the flow is stabilized. Thus, it is possible to increase the ultrasonic reception level, thereby realizing a high-precision flow velocity measurement, and to reduce the attenuation of the ultrasonic waves due to variations in the flow, thereby increasing the upper limit value for the flow rate measurement.

Moreover, since the ultrasonic reception level can be improved by the stabilization of the flow, it is possible to reduce the power consumption for the transmission of an ultrasonic wave. In addition, when the aperture hole sealing section 21 is provided only for the downstream aperture hole 12, it is possible to reduce the amount of attenuation of the ultrasonic wave through the aperture hole sealing section 21 and to reduce the power consumption by the reduction in the driving power input for the ultrasonic transducers 8 and 9. Thus, when an electric cell is used for driving the device such as a gas meter for household use, it is possible to continuously use the meter with only a small electric cell capacity over a long period of time.

Figure 4:
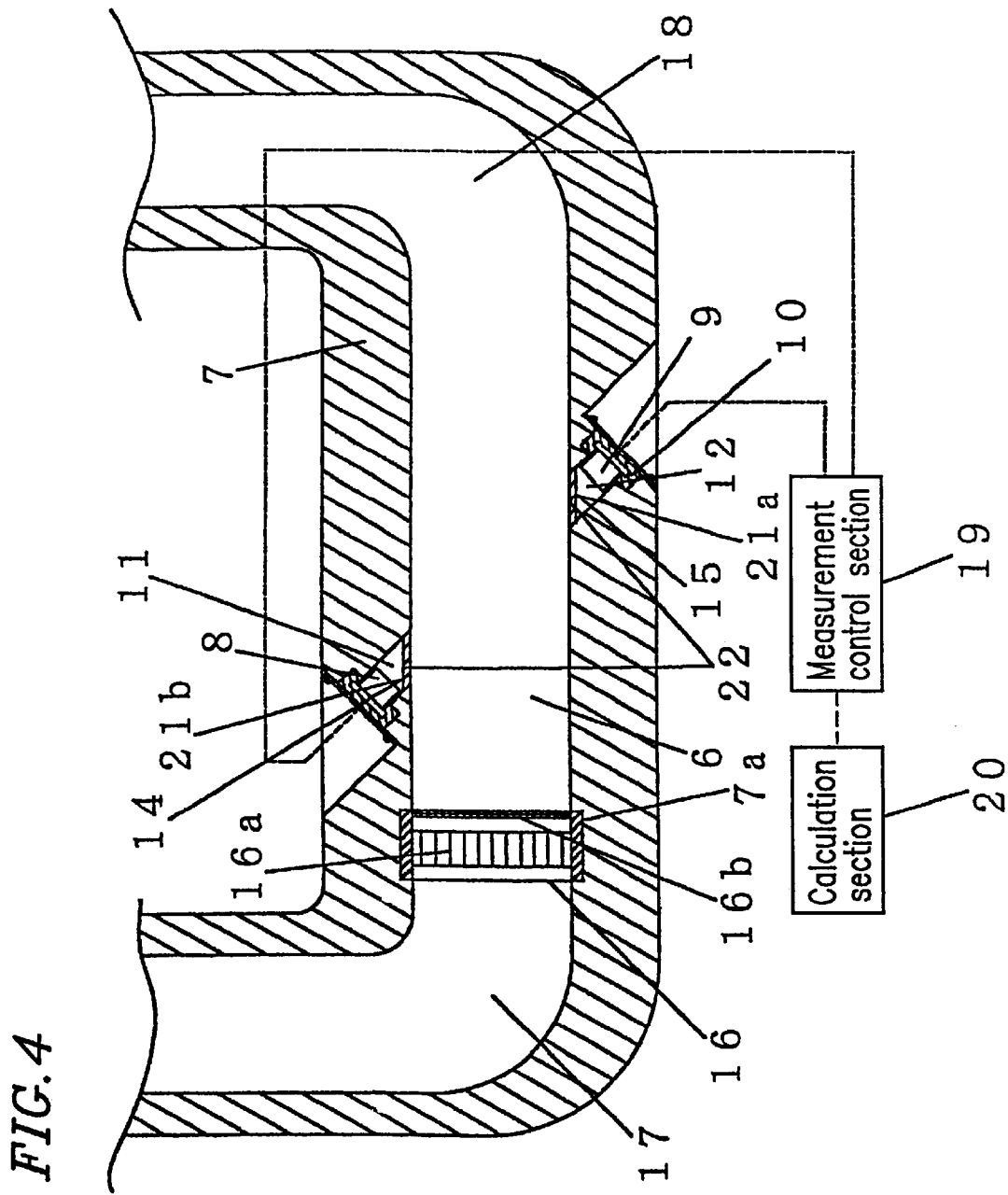
FIG. 4 is a cross-sectional view of a structure of an ultrasonic flow meter illustrating an alternative first influent suppressor.

FIG. 4 is a cross-sectional view of an ultrasonic flow meter illustrating an alternative first influent suppressor.

Like elements and functions to those of the embodiment shown in FIGS. 1 to 3 are provided with like reference numerals and will not be described in detail, and the parts which are different from the above embodiment will be focused on in the following description. For the downstream aperture hole 12, an aperture hole sealing section 21a having the ultrasonically transmissive holes 22 as those of the embodiment of FIG. 1 is provided as the first influent suppressor 15. Similarly, for the upstream aperture hole 11, an aperture hole sealing section 21b having the ultrasonically transmissive holes 22 is provided as the first influent suppressor 14. Both of the aperture hole sealing sections 21a and 21b are provided coplanarly with the measurement flow path surface. Thus, by providing the aperture hole sealing sections 21a and 21b for both of the upstream aperture hole 11 and the downstream aperture hole 12, respectively, it is possible to suppress the inflow of the fluid into the aperture holes so as to prevent vortices or flow disturbances, thereby improving the measurement precision, as well as to realize a measurement with an increased precision even for a pulsating flow with a momentary reverse flow. Moreover, since the flow disturbance in the aperture holes 11 and 12 can be significantly reduced, it is possible to reduce the refraction and/or reflection of the ultrasonic waves due to any disturbances, thereby realizing transmission and reception of the ultrasonic waves with desirable S/N characteristics, and to reduce the transmission output, thereby reducing the driving input and thus the power consumption.

Another embodiment of the aperture hole sealing sections 21a and 21b will be described without reference to a figure. Since the upstream aperture hole 11 extends in a direction at an obtuse angle with respect to the measurement flow path 6, the intensity of the vortex is smaller. Therefore, the influent suppression effect can be expected even if the aperture ratio of the aperture hole sealing section 21b provided in the upstream aperture hole 11 is greater than the aperture ratio of the aperture hole sealing section 21a provided in the downstream aperture hole 12. Thus, in this embodiment, the upstream aperture hole sealing section 21b has an aperture ratio greater than that of the downstream aperture hole sealing section 21a. Since the area of each ultrasonically transmissive hole of the upstream aperture hole sealing section 21b is greater, propagation losses of the ultrasonic waves are less than those of the downstream aperture hole sealing section 21a. Therefore, it is possible to reduce propagation losses of the ultrasonic waves from that when the aperture hole sealing section having the same aperture ratio is used for both on the upstream side and the downstream side, whereby it is possible to reduce the power consumption by the reduction in the driving input for the ultrasonic transducers.

Figure 5:
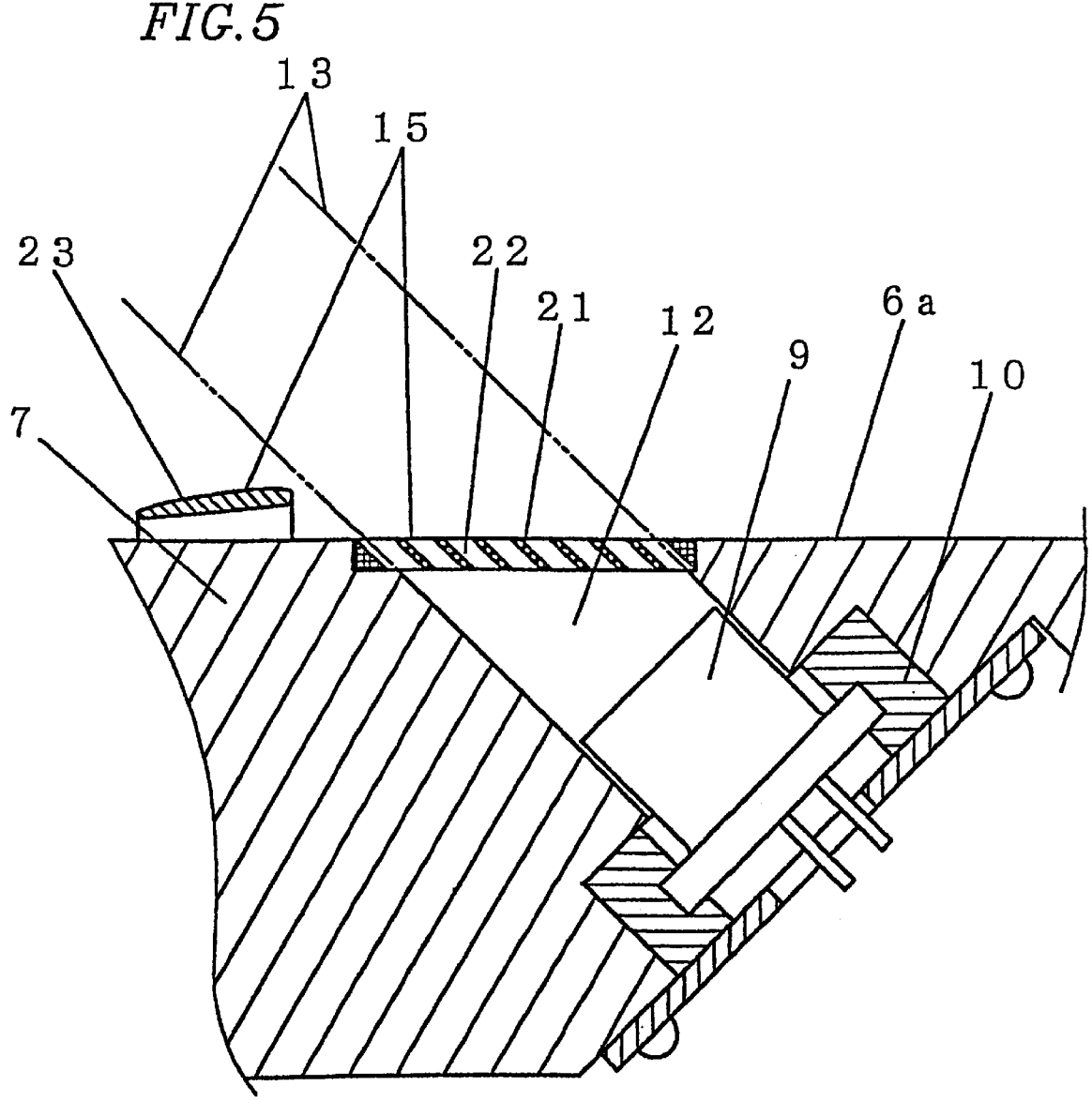
FIG. 5 is a cross-sectional view illustrating an alternative first influent suppressor according to Embodiment 1 of the present invention.

FIG. 5 illustrates another embodiment of the first influent suppressor 15 provided for the downstream aperture hole 12. Reference numeral 23 is a flow deflector provided near and on the upstream side of the downstream aperture hole 12 including the aperture hole sealing section 21. The flow deflector 23 is provided in the form of a plate or a blade and regulates the flow direction so that the fluid to be measured does not flow into the aperture hole 12. Thus, the aperture hole 12 is provided with both the aperture hole sealing section 21 and the flow deflector 23 as the first influent suppressor 15.

For the aperture hole 12, the flow direction is regulated by the flow deflector 23 so as to reduce the amount of flow directed to the downstream aperture hole 12. Even if there is a slight amount of flow directed to the downstream aperture hole 12, the flow is prevented by the aperture hole sealing section 21 from flowing into the aperture hole 12 so as to prevent flow disturbances such as vortices in the aperture hole 12 and thus stabilize the flow in the ultrasonic wave propagation path 13, thereby further improving the measurement precision. Moreover, since the amount of flow hitting the aperture hole sealing section 21 can be reduced by the flow deflector 23, even when fine particle foreign matter such as dust is included in the fluid to be measured, it is possible to reduce the attachment of the foreign matter onto the aperture hole sealing section 21. Thus, the specification of the aperture hole sealing section 21 can be selected primarily in view of the ultrasonic transmissivity, thereby improving the freedom in the selection or setting thereof. Moreover, it is possible to further increase the ultrasonic transmissivity to increase the sensitivity, thereby reducing the power consumption or increasing the precision. A similar structure can be employed for the upstream aperture hole 11 so as to further improve the measurement precision.

Figure 6:
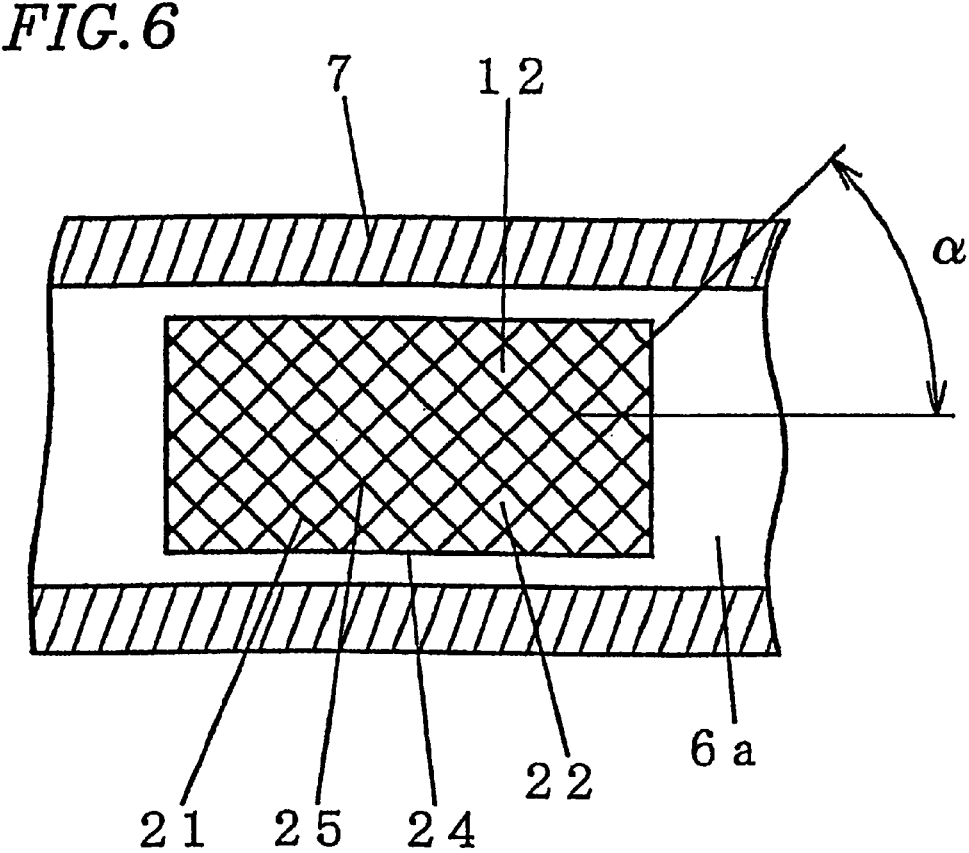
FIG. 6 is a front view illustrating an alternative example of an aperture hole sealing section shown in FIG. 4.

FIG. 6 illustrates another embodiment of the aperture hole sealing section. Reference numeral 24 is a meshed member having the ultrasonically transmissive holes 22 arranged in a meshed pattern. The meshed member 24 is provided along the measurement flow path surface 6a over the aperture hole 12 as the aperture hole sealing section 21. Herein, the flow direction of the fluid to be measured along the measurement flow path 6 is substantially horizontal and the measurement flow path surface 6a along which the aperture holes 11 and 12 are provided is substantially vertical. For this arrangement of the measurement flow path, the meshed member 24 is formed by inclined mesh portions 25 having an angle of a with respect to the horizontal direction such that there is no mesh portion arranged along the horizontal direction.

When the fluid to be measured flows with fine particle foreign matter such as dust contained therein, such foreign matter may attach onto the meshed member 24 provided in the downstream aperture hole 12. However, since the meshed member 24 is formed by the inclined mesh portions 25 having an inclination with respect to the horizontal direction, the attached fine particle foreign matter is facilitated to slip down along the inclination. Therefore, it is possible to prevent the clogging of the meshed member 24 due to the deposition of the attached fine particle foreign matter so as to ensure the transmission of the ultrasonic wave, thereby maintaining a stable measurement of the flow rate and the flow velocity. While the above description has been directed to the downstream aperture hole 12, the same applies to the upstream aperture hole 11.

Figure 7:
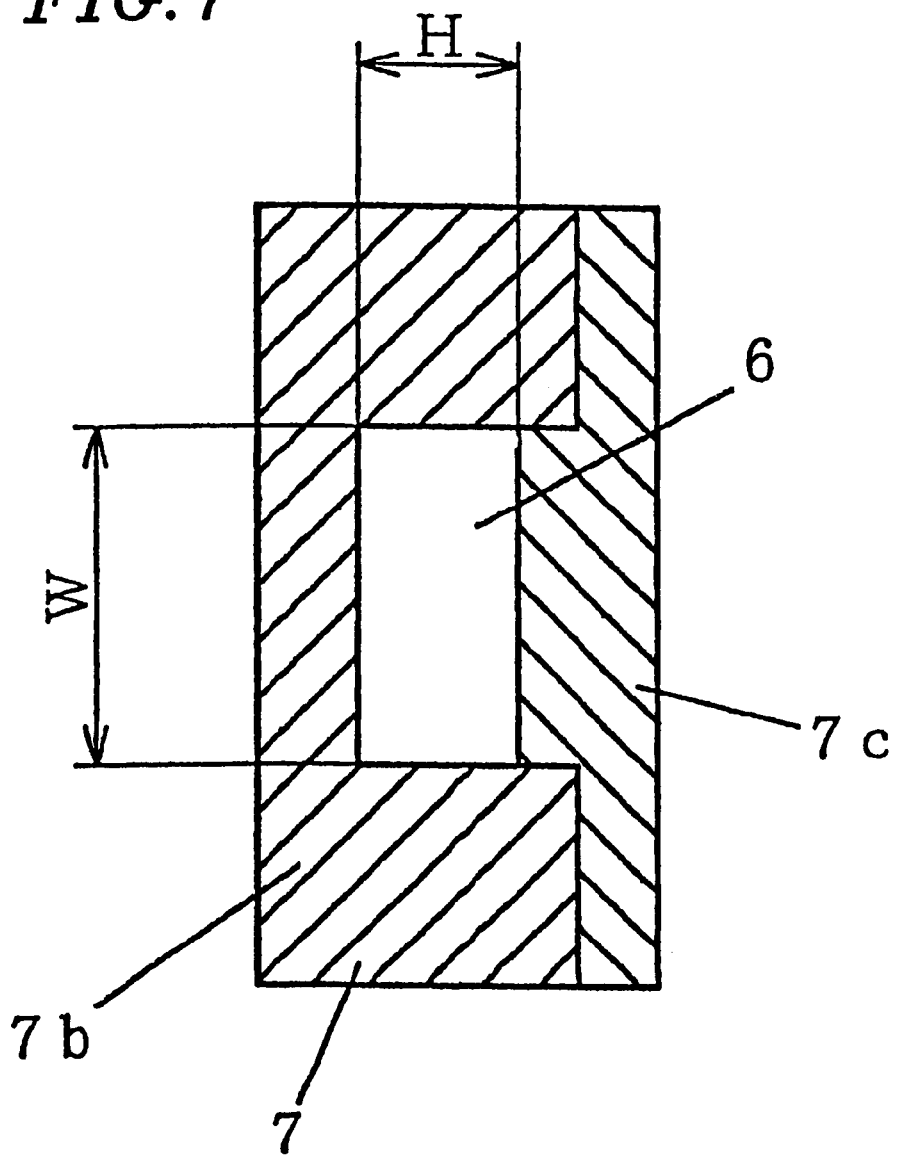
FIG. 7 is a cross-sectional view illustrating the measurement flow path shown in FIG. 1 taken along line A—A.

FIG. 7 is a cross-sectional view illustrating the measurement flow path shown in FIG. 1 taken along line A—A. The cross section of the measurement flow path 6 along a direction perpendicular to the flow has a rectangular shape with a width W along the sides on which the ultrasonic transducers 8 and 9 are arranged to oppose each other, and with a height H. The measurement flow path 6 is formed by the flow path wall 7 which is obtained by mating a flow path wall 7b having a depression and a flow path wall 7c having a protrusion with each other. Because of the rectangular cross section, a two-dimensional flow is realized within the measurement flow path 6, and the flow variation which is likely to occur in each corner section of the rectangular cross section is suppressed by the second influent suppressor 16, whereby it is possible to facilitate the two-dimensional flow within the measurement flow path 6. Moreover, because the height H of the measurement flow path 6 between the ultrasonic transducers is constant, it is possible to increase the ratio of the measurement area through which an ultrasonic wave propagates with respect to the total cross-sectional area of the flow path, thereby allowing for a high-precision measurement of the average flow velocity of the fluid.

It is understood that the rectangular cross section as used herein also includes a generally rectangular shape with a rounded portion (corner R) in each corner of the rectangular cross section so as to ensure the durability of the manufacturing equipment such as a metallic die used in the case where the flow path wall 7 is formed by die casting.

Figure 8:
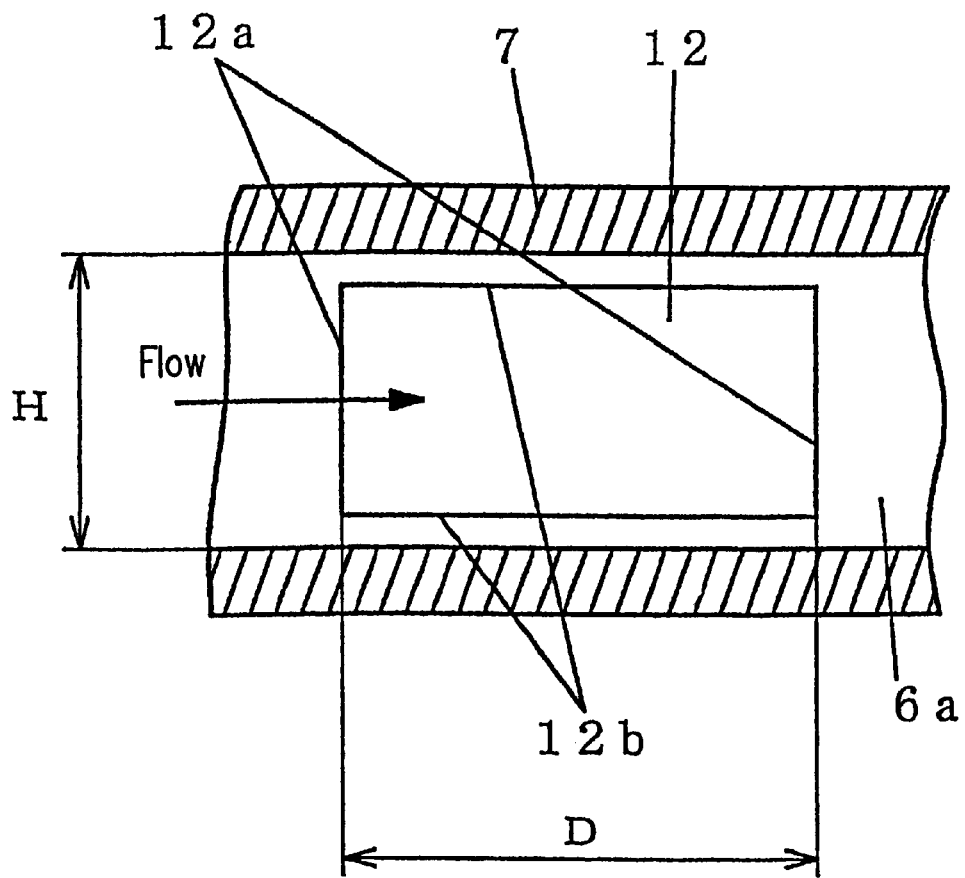
FIG. 8 is a front view illustrating an aperture hole shown in FIG. 6.

FIG. 8 illustrates the aperture shape of the aperture hole 12 provided along the measurement flow path surface 6a of the measurement flow path 6 shown in FIG. 7 having the rectangular cross section. The aperture shape of the aperture hole 12 along the measurement flow path surface 6a has a rectangular shape with a side 12a extending in a direction substantially perpendicular to the flow direction (indicated by an arrow in the figure) through the measurement flow path 6 and a side 12b extending in a direction substantially parallel to the flow direction.

Thus, in the measurement flow path 6, the aperture hole 12 has a constant length as indicated by D in the figure along the flow direction for any height H, whereby it is possible to equally transmit and receive an ultrasonic wave with respect to the height direction H and thus to effect an equal measurement across the measurement flow path 6, thereby realizing a high-precision measurement. Moreover, the length D of such an aperture hole along the flow direction is shorter than that which results when the aperture hole has a circular shape or a shape with an arc portion of the same area, whereby it is possible to further reduce flow disturbances in the measurement flow path 6 and/or the fluid flow into the aperture hole 12, thereby improving the measurement precision. While the above description has been directed to the downstream aperture hole 12, it is understood that the aperture shape of the upstream aperture hole 11 along the measurement flow path surface 6a may also be rectangular so as to further improve the measurement precision.

As described above, in the ultrasonic flow meter of the present invention, the inflow of the fluid to be measured into the aperture hole 12 is reduced by the first influent suppressor 15 provided at least for the downstream aperture hole, whereby it is possible to significantly reduce flow disturbances between the ultrasonic transducers 8 and 9, thereby increasing the measurement precision and the upper limit value for the flow rate measurement. The first influent suppressor 15 may be the aperture hole sealing section 21 having the ultrasonically transmissive holes 22 so as to further increase the effect of suppressing the flow of the fluid to be measured into the aperture hole, thereby stabilizing the flow in the aperture hole. Moreover, while the propagation of the ultrasonic wave can be ensured by the ultrasonically transmissive holes 22, the aperture hole sealing section 21 can be provided only for the downstream aperture hole 12 so as to further reduce the attenuation of the ultrasonic wave, thereby reducing the driving input for the ultrasonic transducers and the power consumption, and improving the measurement precision.

The first influent suppressor 14 provided for the upstream aperture hole 11 includes the aperture hole sealing section 21b having the ultrasonically transmissive holes 22. Thus, it is possible to significantly reduce the inflow of the fluid into the upstream and downstream aperture holes, thereby increasing the upper limit value for the flow rate measurement and increasing the measurement precision even for a flow which is accompanied by a reverse flow.

The aperture ratio of the aperture hole sealing section 21b provided for the upstream aperture hole 11 is greater than the aperture ratio of the aperture hole sealing section 21a provided for the downstream aperture hole 12. Thus, propagation losses of the ultrasonic waves can be reduced, whereby it is possible to improve the upper limit value for the flow rate measurement and the measurement precision for a reverse flow, and to reduce the power consumption by reducing the driving input for the ultrasonic transducers.

The first influent suppressor 15 includes the aperture hole sealing section 21 having the ultrasonically transmissive holes 22 and the flow deflector provided in the vicinity of the aperture hole 11 or 12. Thus, it is possible to further increase the effect of suppressing the flow of the fluid to be measured into the aperture hole, thereby further improving the measurement precision. Moreover, it is possible by the provision of the flow deflector to reduce the attachment of foreign matter such as dust onto the aperture hole sealing section. Thus, the aperture hole sealing section can be selected primarily in view of the ultrasonic transmissivity without so much concern about the clogging of the aperture hole sealing section, thereby increasing the freedom of the selection. Moreover, it is possible to further increase the ultrasonic transmissivity so as to reduce the power consumption, or to further increase the sensitivity so as to realize a device with a desirable measurement precision.

The aperture hole sealing section 21 is a meshed member 24 of an inclined mesh pattern having an inclination with respect to the horizontal direction. Thus, the pattern is inclined with respect to the horizontal direction, so that it is possible to facilitate settling of minute particles such as dust attached onto the inclined mesh portions 25, thereby reducing the amount of such minute particles deposited and thus preventing clogging of the meshed member. Therefore, it is possible to ensure propagation of the ultrasonic wave therethrough and to maintain a stable measurement precision over a long time, thereby improving the durability and reliability.

The cross section of the measurement flow path 6 along a direction perpendicular to the flow therethrough has a rectangular shape. Thus, by employing the rectangular cross section, it is possible to increase the measurement area with respect to the total measurement cross-sectional area, thereby allowing for a flow measurement under the same condition from the upstream side to the downstream side of the ultrasonic wave propagation path 13. Moreover, it is possible to increase the two-dimensionality of the flow along the measurement flow path 6, thereby allowing for a high precision measurement of the average flow velocity of the fluid. Furthermore, it is possible to further increase the two-dimensionality of the flow by providing the second influent suppressor 16.

Each of the aperture holes 11 and 12 opens into the measurement flow path 6 in a shape which has a side extending along a direction substantially perpendicular to the direction of the flow through the measurement flow path 6. Thus, it is possible to equally transmit/receive the ultrasonic wave with respect to the height direction of the measurement flow path 6, and to shorten the aperture length of the aperture hole in the measurement flow path along the flow direction. Therefore, it is possible to further reduce flow disturbances due to the aperture hole, thereby further improving the measurement precision.

A case where the elbow sections 17 and 18 are bent in the width W direction of the measurement flow path 6 has been illustrated in the present embodiment. However, it is understood that the elbow sections 17 and, 18 may alternatively be bent in the height H direction of the measurement flow path 6 or any other direction, and the elbow sections 17 and 18 may be bent at different angles. Moreover, the effect of suppressing the inflow of the fluid into the aperture hole has been described as the function of the first influent suppressors 14 and 15. However, it is understood that the first influent suppressors 14 and 15 are also expected to have an entrainment suppressing effect to suppress vortices which are generated when the fluid in the aperture hole is entrained by the fluid flowing through the measurement flow path due to the viscosity thereof.

EMBODIMENT 2

Figure 9:
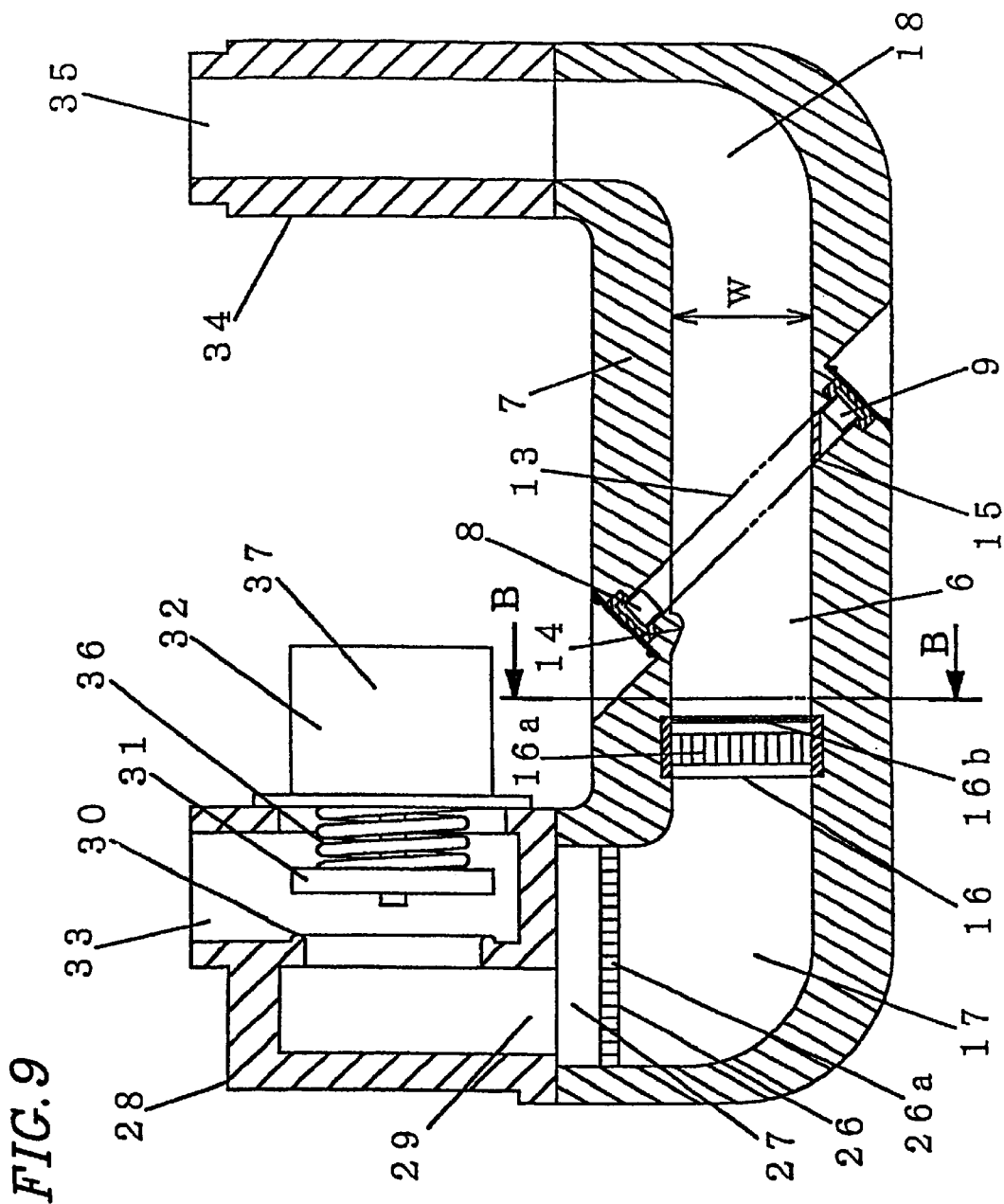
FIG. 9 is a cross-sectional view illustrating a structure of an ultrasonic flow meter according to Embodiment 2 of the present invention.

FIG. 9 is a cross-sectional view illustrating a structure of an ultrasonic flow meter according to Embodiment 2 of the present invention. In FIG. 9, like elements and functions to those of the embodiment shown in FIGS. 1 to 8 are provided with like reference numerals and will not be described in detail, and the parts which are different from the above embodiment will be focused on in the following description.

Reference numeral 26 is a non-uniform flow suppressor provided in an introduction section 27, which is an inlet of the measurement flow path 6, and having many minute passage openings 26a. The non-uniform flow suppressor 26 equalizes the flow velocity distribution when the fluid flowing into the introduction section 27 has a deviation in its flow velocity distribution, before the fluid is supplied to the measurement flow path 6. Reference numeral 28 is a valve block connected on the upstream side of the elbow section 17 and having a connection port 29 which is opened to the introduction section 27. The valve block 28 is provided with a control valve 32 having a valve seat 30 and a valve element 31 opposing the valve seat 30. Reference numeral 33 is a fluid inlet provided on the upstream side of the valve seat 30 through which the fluid flows in. Reference numeral 34 is an outlet block connected to the downstream side of the elbow section 18 and having a fluid outlet 35 through which the fluid flows out. Reference numeral 36 is a spring for biasing the valve element 31 toward the valve seat 30, and reference numeral 37 is a driving section such as a solenoid or a motor for driving the valve element 31 to open or close the control valve 32.

Next, the operation of the ultrasonic flow meter will be described. When the control valve 32 is opened, the fluid to be measured flows in through the fluid inlet 33, passes through the valve seat 30 and the connection port 29, and flows into the introduction section 27. The fluid flowing into the introduction section 27 has a reduced uniformity in the flow direction and/or the flow velocity distribution and has irregularity such as pulsation due to the influence of the piping configuration upstream of the fluid inlet 33 and/or the passage through the bent path through the valve block 28. However, as the fluid flows through the minute passage openings 26a of the non-uniform flow suppressor 26 provided in the introduction section 27, the non-uniformity in the flow direction and/or the flow velocity distribution is improved and the pulsation of the flow is reduced, thereby providing a stable flow flowing into the measurement flow path 6. As described above, in the measurement flow path 6, the flow velocity distribution of the fluid across the cross section of the measurement flow path 6 is equalized by the direction regulation section 16a of the second influent suppressor 16, and the flow is rectified in a direction such that the fluid is less likely to flow into the aperture holes 11 and 12, while the flow variation such a pulsation is further reduced by the variation suppressing section 16b. Then, the fluid flows into the ultrasonic wave propagation path 13. Moreover, the first influent suppressors 14 and 15 are provided near and on the upstream side of the upstream and downstream aperture holes 11 and 12, respectively, so as to reduce the flow of the fluid into the aperture holes 11 and 12. Thus, it is possible to realize a high-precision flow velocity measurement by transmitting and receiving an ultrasonic wave between the ultrasonic transducers 8 and 9 along the ultrasonic wave propagation path 13 in which the flow is further stabilized irrespective of the upstream piping configuration. Moreover, it is possible to further increase the upper limit value for the flow rate measurement by reducing the attenuation of the ultrasonic wave due to the variation in the flow.

Figure 10:
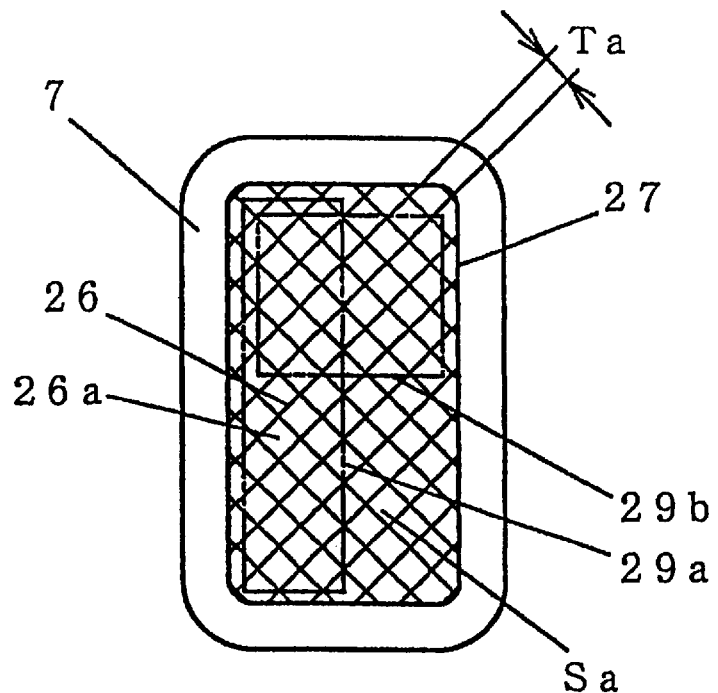
FIG. 10 is a plan view illustrating an introduction section according to Embodiment 2 of the present invention.

FIG. 10 is a plan view illustrating the introduction section 27. The non-uniform flow suppressor 26 is provided across the entire area of the introduction section 27. Reference numeral 29a denotes a first aperture position (indicated by a two-dot chain line) of the connection port 29 in the case where the control valve 32 is provided along the left-right direction of the figure as shown in FIG. 9 with the connection port 29 being provided on the left side of the figure, and reference numeral 29b denotes a second aperture position (indicated by a two-dot chain line) of the connection port 29 in the case where the control valve 32 is provided along the front-back direction of FIG. 9 with the connection port 29 being provided on the reverse side of the figure. The cross-sectional area Sa of the introduction section 27 is set to be greater than the cross-sectional area Sb of the measurement flow path 6 defined by a rectangular shape having the width W and the height H (see FIG. 11) (Sa>Sb), thereby increasing the installment area for the non-uniform flow suppressor 26 so that the first aperture position 29a and the second aperture position 29b can be both arranged in the introduction section 27. Thus, it is possible to reduce the loss in the pressure of the fluid to be measured due to the non-uniform flow suppressor 26. Moreover, even when the first and second aperture positions 29a and 29b have a positional deviation with respect to the introduction section 27 for various arrangements/configurations of the valve block 28, it is possible to equalize the flow distribution by the minute passage openings 26a of the non-uniform flow suppressor 26 before the fluid flows into the measurement flow path 6. Therefore, it is possible to ensure the measurement precision for the variation in the flow path configuration and/or the piping configuration upstream of the measurement flow path 6, e.g., the valve block 28, whereby it is possible to improve the freedom in the installment.

Figure 11:
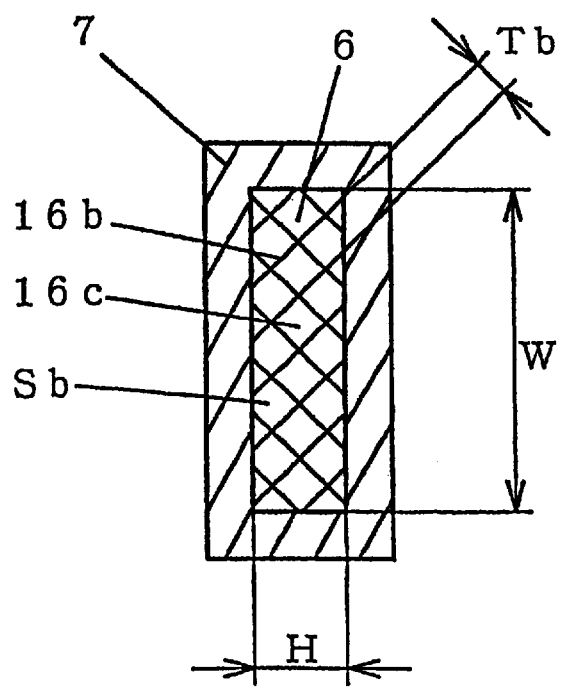
FIG. 11 is a cross-sectional view illustrating the measurement flow path shown in FIG. 9 taken along line B—B.

Moreover, as shown in FIG. 11, the aperture dimension Ta of the passage openings 26a of the non-uniform flow suppressor 26 each having a minute aperture is set to be less than the aperture dimension Tb of passage openings 16c of the variation suppressing section 16b of the second influent suppressor 16 each having a minute aperture (Ta<Tb). Thus, the non-uniform flow suppressor 26 can have a greater function of equalizing the flow pulsation or the deviation in the flow velocity distribution than that of the second influent suppressor 16. Therefore, by providing the non-uniform flow suppressor 26, it is possible to supply a more stabilized flow into the measurement flow path 6. Thus, even when the connection port 29 through which the fluid flows in from the upstream side is positionally deviated, it is possible to perform a measurement with an increased precision by supplying the fluid into the measurement flow path 6 in a more equalized manner. Even when the incoming fluid has a pulsation, it is possible to supply a flow with a reduced pulsation so that it is possible to improve the measurement precision even for a pulsating flow. Furthermore, the aperture dimension of the passage openings 26a of the non-uniform flow suppressor 26 is set to be smaller than that of the passage openings 16c of the variation suppressing section 16b of the second influent suppressor 16, whereby it is possible to reduce the amount of foreign matter such as dirt or dust entering the measurement flow path 6 so as to ensure a proper measurement operation and to increase the reliability. Moreover, the cross-sectional area Sa of the non-uniform flow suppressor 26 is set to be greater than the cross-sectional area Sb of the measurement flow path 6, whereby it is possible to reduce the loss in the pressure of the fluid to be measured and to prevent deterioration of the measurement characteristics even when the foreign matter is attached onto the non-uniform flow suppressor 26.

Figure 12:
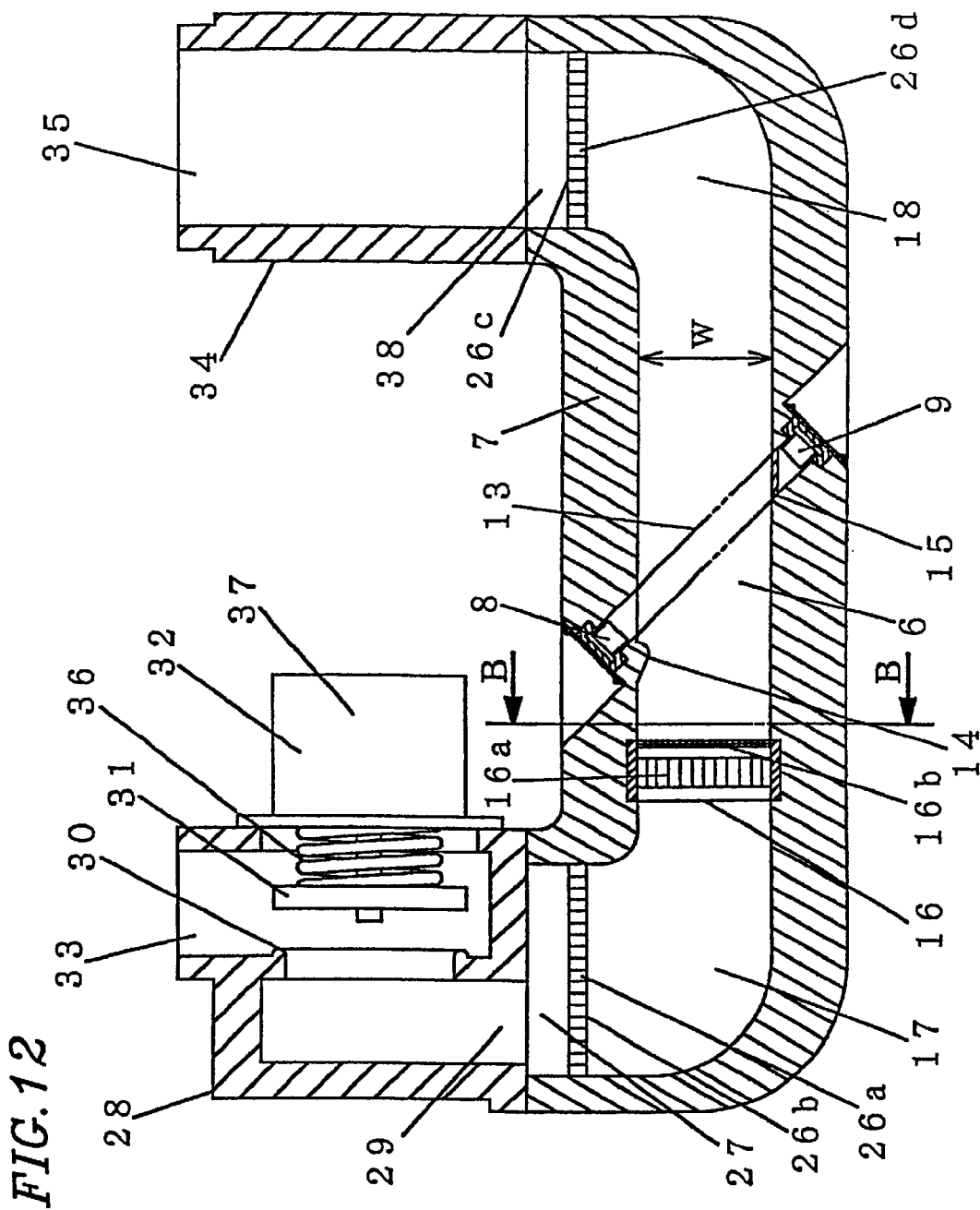
FIG. 12 is a cross-sectional view of a structure of an ultrasonic flow meter illustrating an alternative non-uniform flow suppressor.

FIG. 12 illustrates an alternative embodiment of the non-uniform flow suppressor 26. A first non-uniform flow suppressor 26b is provided in the introduction section 27, and a second non-uniform flow suppressor 26a is provided in an exit section 38 on the downstream side of the measurement flow path 6. The second non-uniform flow suppressor 26c includes many minute passage openings 26d as the first non-uniform flow suppressor 26b. With this structure, when there is a flow variation or an influent deviation on the upstream side of the measurement flow path 6, the first non-uniform flow suppressor 26b provides the above-described effect of reducing the pulsation and the effect of suppressing the non-uniform flow. When there is a cause of flow variation or flow deviation on the downstream side of the measurement flow path 6, the second non-uniform flow suppressor 26c provides the effect of reducing the pulsation and the effect of suppressing the non-uniform flow. Thus, it is possible to improve the measurement precision and to realize a stable measurement irrespective of the flow path configuration and/or the piping configuration upstream or downstream of the measurement flow path 6, thereby further improving the freedom in the installment of the measurement device. Moreover, even when a momentary reverse flow is generated by the pulsation, it is possible to perform a measurement with an increased precision and to perform a stable measurement irrespective of the location of the source of pulsation. Furthermore, the aperture dimension of the passage openings 26d of the second non-uniform flow suppressor 26c can be set to be less than that of the passage openings 16c of the second influent suppressor 16, and/or the cross-sectional area of the exit section 38 where the second non-uniform flow suppressor 26a is provided can be set to be greater than that of the measurement flow path 6 so as to provide the above-described effects as with the introduction section 27. Thus, it is possible to improve the measurement precision, the freedom in the installment, and/or the reliability of the device against foreign matter.

As described above, in the ultrasonic flow meter according to Embodiment 2 of the present invention, the non-uniform flow suppressor 26 including the passage openings 26a each having a minute aperture is provided in the introduction section 27 provided on the upstream side of the measurement flow path 6. Thus, it is possible to supply a stable flow into the measurement flow path 6 irrespective of the flow path configuration and/or the piping configuration on the upstream side of the measurement flow path 6 so as to reduce flow disturbances between the ultrasonic transducers 8 and 9. Therefore, it is possible to further increase the upper limit value for the measurement and further improve the measurement precision. Moreover, it is possible to realize a stable measurement irrespective of the flow path configuration and/or the piping condition on the upstream side of the measurement flow path 6, thereby improving the freedom in the installment of the measurement device.

The non-uniform flow suppressors 26b and 26c having the passage openings 26a and 26d each having a minute aperture are provided in the introduction section 27 provided on the upstream side of the measurement flow path 6 and in the exit section 38 on the downstream side of the measurement flow path 6, respectively. Thus, for either a fluid to be measured which has a pulsating flow accompanied by a reverse flow or a fluid to be measured which has a source of pulsation on the downstream side, it is possible to supply a stable flow through the measurement flow path 6 so as to reduce flow disturbances between the ultrasonic transducers 8 and 9. Therefore, it is possible to further increase the upper limit value for the measurement and to further improve the measurement precision. Moreover, it is possible to realize a stable measurement irrespective of the flow path configuration, the piping condition, and/or a source of pulsation, upstream or downstream of the measurement flow path 6, thereby further improving the freedom in the installment of the measurement device.

The cross-sectional area of the introduction section 27 or the exit section 38 can be set to be greater than that of the measurement flow path 6. Thus, it is possible to increase the installment cross-sectional area of the non-uniform flow suppressor 26 so as to reduce pressure losses due to the non-uniform flow suppressor 26, thereby preventing increases in pressure losses. Moreover, it is possible to increase the cross-sectional area of the introduction section 27 or the exit section 38, thereby allowing for attachment of the measurement device without changing the shape of the introduction section or the exit section even when the shape of the flow path or the piping configuration on the upstream side or the downstream side is varied. Thus, it is possible to realize a measurement device with an increased freedom in the installment thereof.

The aperture size of the passage opening of the non-uniform flow suppressor 26 is less than the aperture size of the passage opening provided in the second influent suppressor 16. Thus, even when the upstream or downstream connection port is arranged with a positional shift, the fluid can equally flow within the measurement flow path, thereby allowing for a measurement with an increased measurement precision. Moreover, even when the fluid to be measured has a pulsation, it is possible to supply the fluid into the measurement flow path in a flow with a reduced pulsation due to the passage opening having a small aperture size, thereby improving the measurement precision even for a pulsating flow. Furthermore, due to the passage opening of the non-uniform flow suppressor having a small aperture size, it is possible to reduce the amount of dirt and/or dust entering the measurement section, thereby increasing the reliability of the measurement operation along the measurement flow path.

A case where the elbow sections 17 and 18 are bent in the width W direction of the measurement flow path 6 has been illustrated in the present embodiment. However, it is understood that the elbow sections 17 and 18 may alternatively be bent in the height H direction of the measurement flow path 6 or any other direction, and the elbow sections 17 and 18 may be bent at different angles.

EMBODIMENT 3

Figure 13:
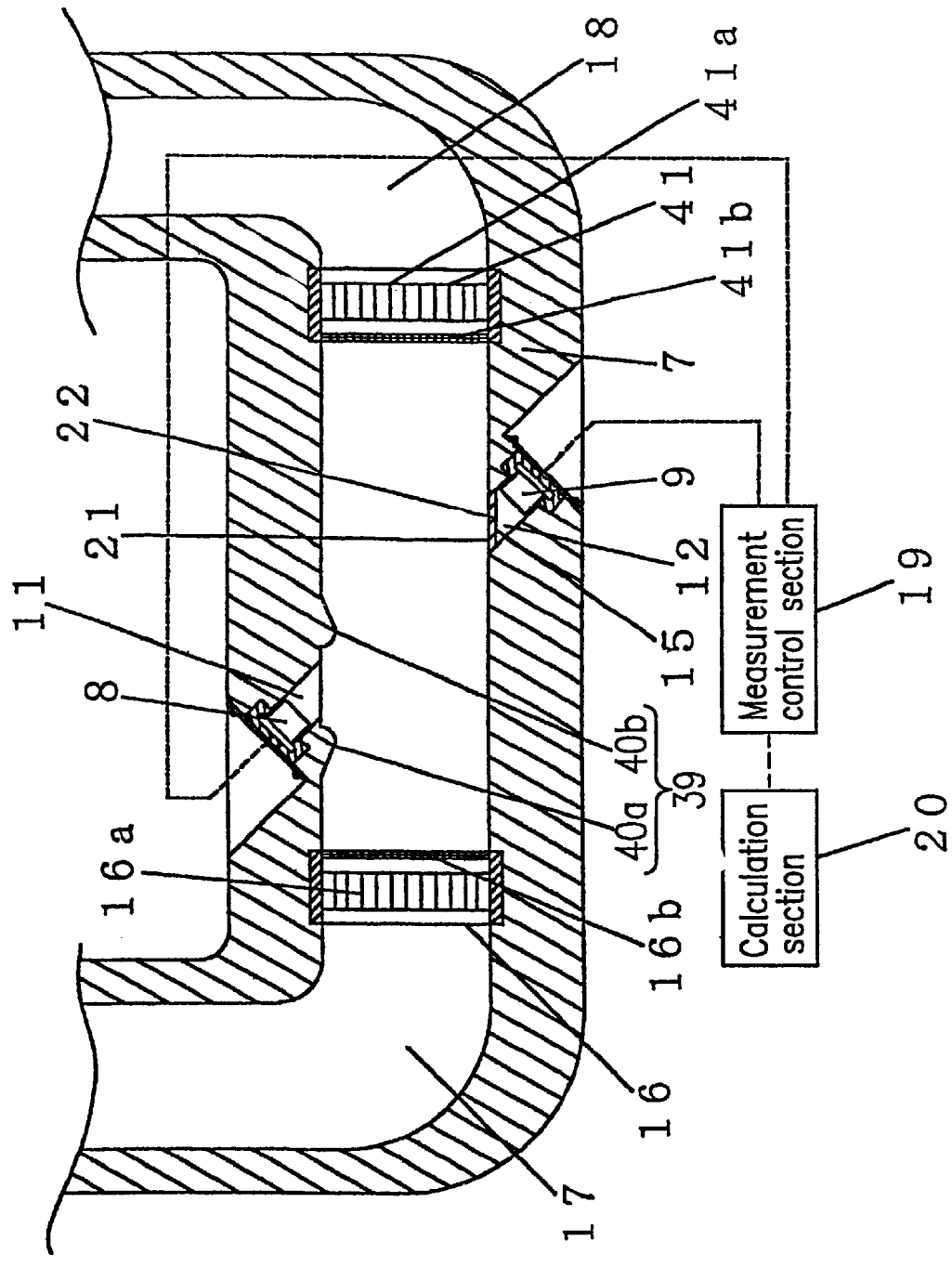
FIG. 13 is a cross-sectional view illustrating a structure of an ultrasonic flow meter according to Embodiment 3 of the present invention.

FIG. 13 is a cross-sectional view illustrating a structure of an ultrasonic flow meter according to Embodiment 3 of the present invention. In FIG. 13, like elements and functions to those of the embodiments shown in FIGS. 1 to 12 are provided with like reference numerals and will not be described in detail, and the parts which are different from the above embodiments will be focused on in the following description.

Reference numeral 39 is a first influent suppressor for reducing the inflow of the fluid to be measured into the aperture hole 11 irrespective of whether the fluid to be measured is flowing in the forward direction or in the reverse direction along the measurement flow path 6. The first influent suppressor 39 includes a flow deflector 40a provided near and on the upstream side of the aperture hole 11 and a flow deflector 40b provided near and on the downstream side of the aperture hole 11. Reference numeral 41 is a second influent suppressor provided on the downstream side of the ultrasonic wave propagation path 13. The second influent suppressor 41 includes a direction regulation section 41a for adjusting the flow direction of the fluid to be measured and a variation suppressing section 41b for making the flow velocity distribution uniform or reducing the pulsation of the flow. The above-described first influent suppressor 15 including the aperture hole sealing section 21 having the ultrasonically transmissive holes 22 is provided for the downstream aperture hole 12. The second influent suppressor 16 including the direction regulation section 16a and the variation-suppressing section 16b is provided on the up-stream side of the ultrasonic wave propagation path 13.

Next, the flow condition in the measurement flow path of the ultrasonic flow meter and the measurement operation thereof will be described. First, in the case where the fluid to be measured flows in the forward direction through the measurement flow path 6, even if a non-uniform flow or a pulsating flow enters the measurement flow path 6, such a flow is prevented from flowing into the aperture holes 11 and 12 by the second influent suppressor 16 or the first influent suppressor 39 or 15, as described above in Embodiment 1. Thus, the flow is stabilized in the ultrasonic wave propagation path 13, whereby it is possible to improve the measurement precision and/or the upper limit value for the measurement.

Next, in the case where a pulsation causes a momentary reverse flow or a change in the flow direction or where the fluid flows in the reverse direction due to an erroneous piping connection, a reverse flow may enter the measurement flow path 6. Even then, the first influent suppressor 15 or 39 or the second influent suppressor 41 can function for such a reverse flow as for a forward flow to prevent the flow from entering the aperture holes 11 and 12. Therefore, even when apulsating flow causes a momentary reverse flow, it is possible to reduce the inflow of the fluid to be measured into the aperture hole as for a forward flow and to significantly reduce flow disturbances between the ultrasonic transducers 8 and 9, thereby increasing the measurement precision and the upper limit value for the flow rate measurement. Moreover, it is possible to perform a measurement with an increased precision even for a reverse flow, and to increase the freedom of the installment, thereby improving the convenience.

A case where the first influent suppressor 39 includes the protrusions of the flow deflectors 40a and 40b provided along the surface in which the aperture hole 11 is opened near and on the upstream side of the aperture hole 11 and near and on the downstream side of the aperture hole 11, respectively, has been described above. However, it is understood that the protrusions may be provided to surround the circumference of the aperture hole 11 and/or the aperture hole 12 (not shown). Moreover, the first influent suppressor 39 can be provided by using the aperture hole sealing section described above with reference to FIG. 2 or 5, so as to improve the measurement precision even for a strong reverse flow and to increase the convenience.

Figure 14:
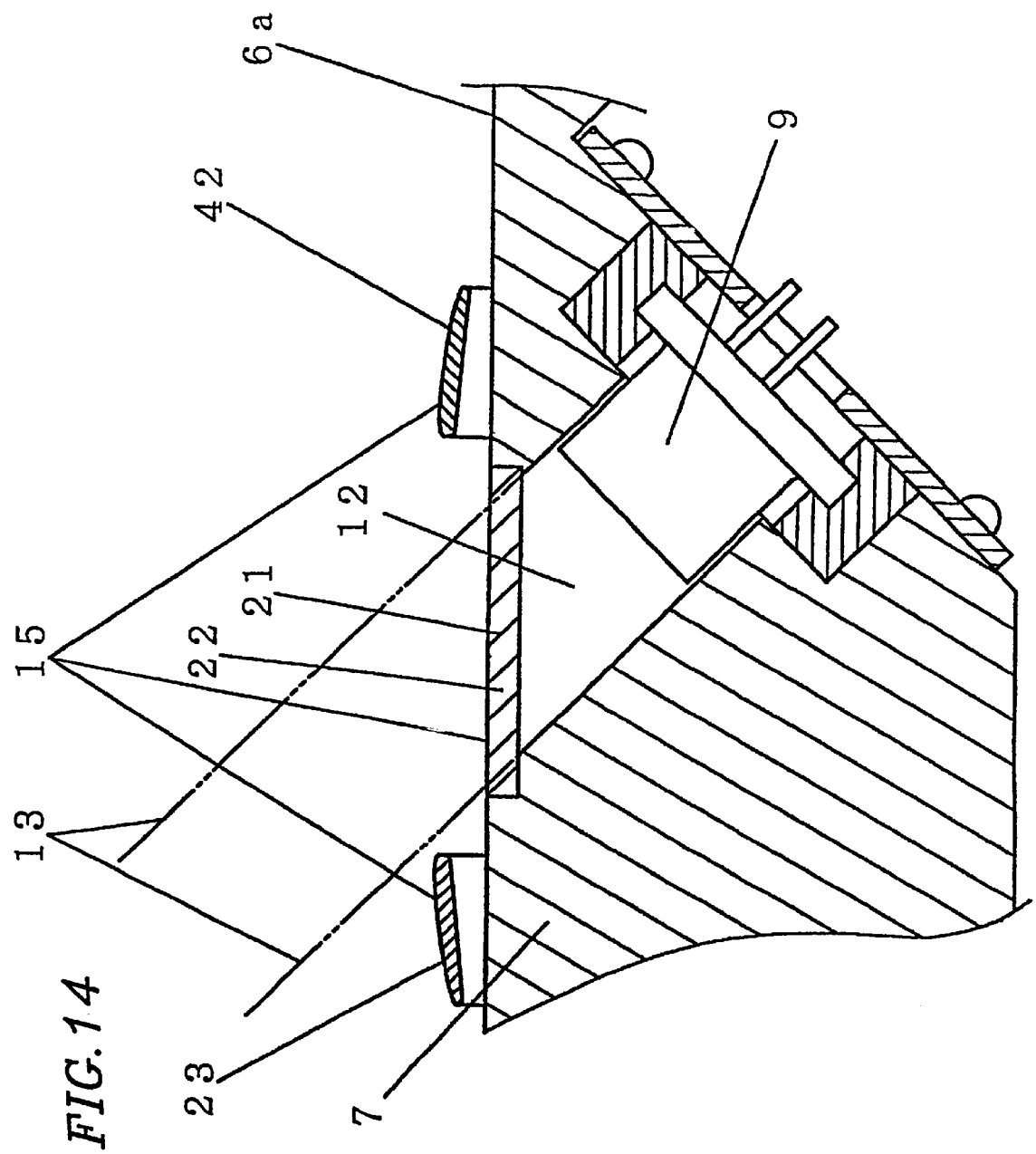
FIG. 14 is a cross-sectional view illustrating an alternative first influent suppressor according to Embodiment 3 of the present invention.

FIG. 14 illustrates an alternative embodiment of the first influent suppressor. A case where the first influent suppressor is provided for the downstream aperture hole 12 will be described. Reference numeral 23 is a flow deflector provided near and on the upstream side of the aperture hole 12 including the aperture hole sealing section 21, and reference numeral 42 is a flow deflector provided near and on the downstream side of the aperture hole 12. Each of the flow deflectors 23 and 42 is provided in the form of a plate or a blade and regulates the flow direction so that the fluid to be measured does not flow into the aperture hole 12. Thus, in this embodiment, the first influent suppressor includes the aperture hole sealing section 21 and the flow deflectors 23 and 42 which are provided upstream and downstream, respectively, of the aperture hole 11 and/or the aperture hole 12.

Herein, for a fluid flowing in the forward direction through the measurement flow path 6, the flow direction is regulated by the flow deflector 23 provided on the upstream side of the aperture hole 12 so as to reduce the amount of flow directed into the aperture hole 12. For a fluid flowing in the reverse direction through the measurement flow path 6, the flow direction is regulated by the flow deflector 42 provided on the downstream side of the aperture hole 12 so as to reduce the amount of flow directed into the aperture hole 12. If there remains a flow, even in a slight amount, which is directed into the aperture hole 12, it is prevented by the aperture hole sealing section 21 from flowing into the aperture hole 12, so as to prevent flow disturbances such as vortices in the aperture hole 12 and thus stabilize the flow in the ultrasonic wave propagation path 13, both for a flow in the forward direction and for a flow in the reverse direction, thereby further improving the measurement precision.

Since the amount of flow hitting the aperture hole sealing section 21 can be reduced by the flow deflectors 23 and 42, even when fine particle foreign matter such as dust is included in the fluid to be measured, it is possible to reduce the attachment of the foreign matter onto the aperture hole sealing section 21. Thus, the specification of the aperture hole sealing section 21 can be selected primarily in view of the ultrasonic transmissivity, thereby improving the freedom in the selection or setting thereof. Moreover, it is possible to further increase the ultrasonic transmissivity to increase the sensitivity, thereby reducing the power consumption or increasing the precision. The aperture hole sealing section 21 and the flow deflectors 23 and 42 can be provided also for the upstream aperture hole 11 as for the downstream aperture hole 12 so as to provide a similar effect for the aperture hole 11. Moreover, it is possible to further improve the measurement precision for a reverse flow, whereby it is possible to increase the ultrasonic transmissivity so as to increase the sensitivity and to reduce the power consumption or to increase the measurement precision.

As described above, with the ultrasonic flow meter according to Embodiment 3 of the present invention, even when the flow has a pulsation and causes a momentary reverse flow, it is possible to reduce, as in the case of a forward flow, the inflow of the fluid to be measured into the aperture hole, and to significantly reduce flow disturbances between the ultrasonic transducers, thereby increasing the measurement precision and the upper limit value for the flow rate measurement. Moreover, it is possible to perform a measurement with an increased precision even for a reverse flow, and to increase the freedom of the installment, thereby improving the convenience.

The flow deflector is provided on the upstream side and the downstream side of the aperture hole. Thus, both for a forward flow and a reverse flow along the measurement flow path, it is possible to further improve the measurement precision, to suppress the flow into the aperture hole, and to prevent foreign matter from entering the aperture hole. Therefore, even for a pulsating flow with a reverse flow, it is possible to maintain a stable measurement precision over a long time, thereby improving the durability and reliability.

A case where the elbow sections 17 and 18 are bent in the width W direction of the measurement flow path 6 has been illustrated in the present embodiment. However, it is understood that the elbow sections 17 and 18 may alternatively be bent in the height H direction of the measurement flow path 6 or any other direction, and the elbow sections 17 and 18 may be bent at different angles.

EMBODIMENT 4

Figure 15:
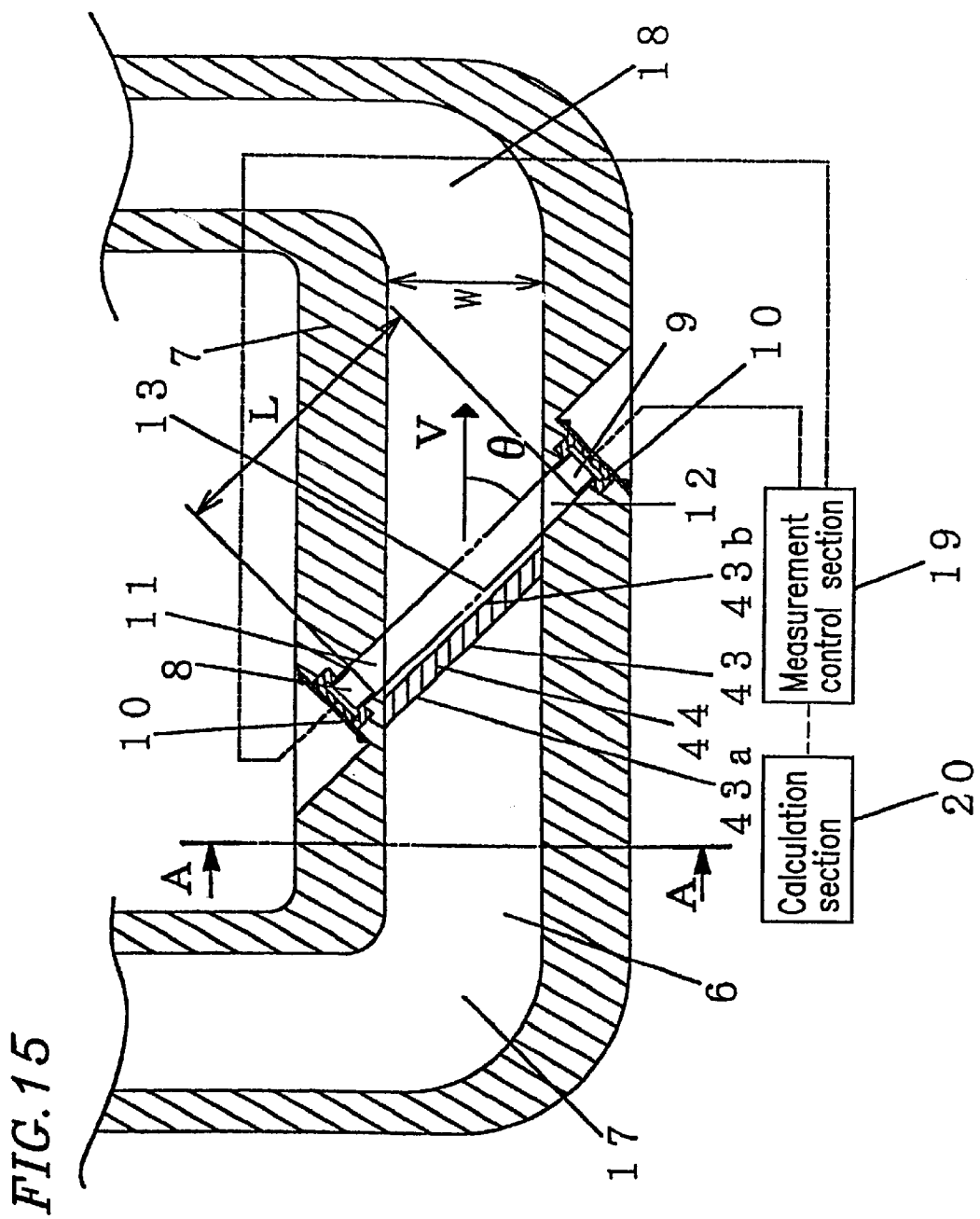
FIG. 15 is a cross-sectional view illustrating a structure of an ultrasonic flow meter according to Embodiment 4 of the present invention.

FIG. 15 is a cross-sectional view illustrating a structure of an ultrasonic flow meter according to Embodiment 4 of the present invention. In FIG. 15, like elements and functions to those of the embodiments shown in FIGS. 1 to 14 are provided with like reference numerals and will not be described in detail, and the parts which are different from the above embodiments will be focused on in the following description.

Reference numeral 43 is a propagation path flow regulator provided on the upstream side of the ultrasonic wave propagation path 13. The propagation path flow regulator 43 is arranged substantially parallel to the ultrasonic wave propagation path 13 which extends diagonally across the measurement flow path 6 and is spaced slightly apart from the ultrasonic wave propagation path 13 so as not to interfere with the propagation of the ultrasonic wave.

Figure 16:
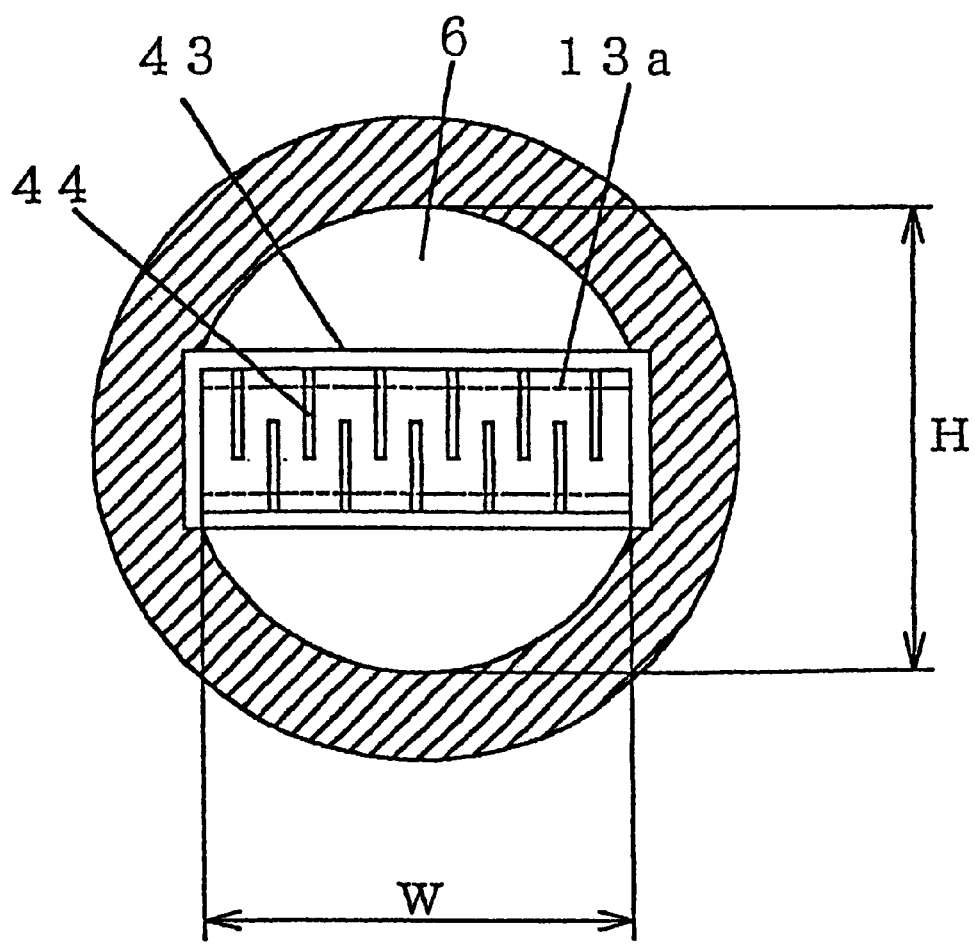
FIG. 16 is a front view of a propagation path flow regulator according to Embodiment 4 of the present invention as viewed along the flow direction.

FIG. 16 illustrates the propagation path flow regulator 43 as viewed along the direction of the flow through the measurement flow path 6. The propagation path flow regulator 43 is arranged in the measurement flow path 6 which has a circular transverse cross section. Reference numeral 13a is an ultrasonic wave propagation path as shown in the cross-sectional view of the measurement flow path 6 taken along the direction normal to the paper of FIG. 15 (the height direction of the measurement flow path 6). The propagation path flow regulator 43 has a width along the height direction greater than the width of the ultrasonic wave propagation path 13a along the height direction which is indicated by a two-dot chain line, and has many regulation sections 44 which are exposed to the flow.

Next, the operation of the ultrasonic flow meter will be described. The fluid to be measured enters the measurement flow path 6 with a non-uniform flow or a flow pulsation due to the increase/decrease in the flow path cross-sectional area provided by the control valve (not shown) which is provided on the upstream side of the measurement flow path 6 or due to the passage through the elbow section 17. Then, the disturbance of the flow is facilitated by the regulation sections 44 of the propagation path flow regulator 43 provided immediately upstream of the ultrasonic wave propagation path 13. The propagation path flow regulator 43 is provided immediately upstream of the ultrasonic wave propagation path 13 to extend all the way from the vicinity of the upstream ultrasonic transducer 8 to the vicinity of the downstream ultrasonic transducer 9, whereby the flow disturbance is equally facilitated across the entire area of the ultrasonic wave propagation path 13. In this way, the variation in the flow condition is reduced in the ultrasonic wave propagation path 13 from the upstream side to the downstream side so as to facilitate the measurement of the average flow velocity in the ultrasonic wave propagation path 13. Particularly, when the flow velocity is small (when the flow rate is small) and thus the fluid flows into the measurement flow path 6 as a laminar flow, the flow disturbance is facilitated by the propagation path flow regulator 43 in the ultrasonic wave propagation path 13. Thus, the difference between this flow disturbance and the flow disturbance which results in the ultrasonic wave propagation path 13 when the flow velocity is large (when the flow rate is large), and thus the fluid flows into the measurement flow path 6 as a disturbed flow is small. Therefore, it is possible to stably disturb the flow in the ultrasonic wave propagation path 13 over a wide flow rate range from a small flow rate to a large flow rate. Moreover, the propagation path flow regulator 43 is arranged to extend diagonally across the measurement flow path 6, whereby the propagation path flow regulator 43 can have a greater length within the measurement flow path 6 than that obtained when the propagation path flow regulator 43 is arranged to extend orthogonal to the measurement flow path 6. Therefore, it is possible to provide the propagation path flow regulator 43 with a large aperture ratio and to realize a measurement device with a reduced pressure loss.

Figure 17:
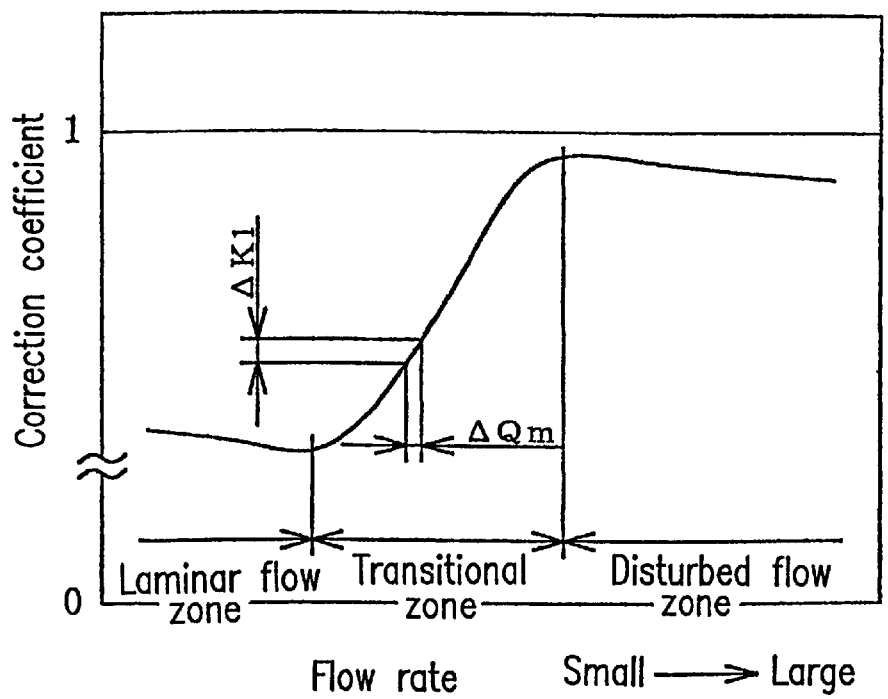
FIG. 17 is a graph illustrating the correction coefficient characteristics in the case where the propagation path flow regulator of FIG. 15 is absent.

With the measurement flow path 6 having such a structure, the flow velocity V is obtained based on the ultrasonic propagation times T1 and T2, as described above, and the flow rate is obtained from the cross-sectional area S of the measurement flow path 6 and the correction coefficient K. The correction coefficient K substantially changes in the transitional zone where the flow rate zone transitions from the laminar flow zone to the disturbed flow zone as illustrated in FIG. 17 in the absence of the propagation path flow regulator 43 extending along the ultrasonic wave propagation path 13. Thus, when an error of ΔQm occurs in measured flow rate, the correction coefficient K substantially changes, i.e., by ΔK1, thereby resulting in an increased flow rate measurement error. This error may occur from a variation in the flow condition caused by the variation in the Reynolds number which is due to the change in the kinematic viscosity occurring from the change in temperature of the fluid or the composition ratio of the fluid. Particularly, when measuring the flow rate of a fluid such as town gas or LPG (liquefied petroleum gas) where there may be a variation in the gas composition due to a seasonal or regional variation, this error needs to be taken into consideration.

Figure 18:
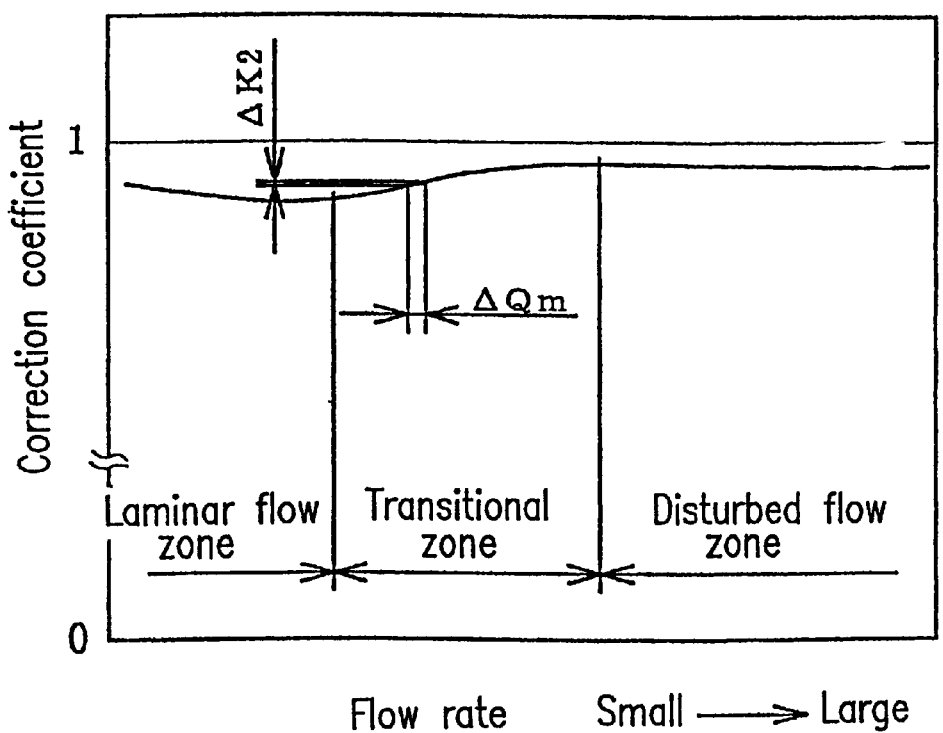
FIG. 18 is a graph illustrating the correction coefficient characteristics in the case where the propagation path flow regulator according to Embodiment 4 of the present invention is present.

However, when the propagation path flow regulator 43 is provided along the ultrasonic wave propagation path 13, as in the present embodiment, it is possible to reduce the difference between the correction coefficient K in the laminar flow zone where the flow velocity is small and that in the disturbed flow zone, as illustrated in FIG. 18, because the fluid can be equally disturbed in the ultrasonic wave propagation path 13 from the upstream side to the downstream side. Moreover, the change in the correction coefficient is also small in the transitional zone where the flow transitions from a laminar flow to a disturbed flow. Thus, the correction coefficient is averaged. Therefore, even when an error ΔQm occurs in the measured flow rate, the change in the correction coefficient can be sufficiently small, i.e., ΔK2 (K2<K1), thereby allowing for a measurement with an increased measurement precision. This is advantageous when there is a change in the temperature or a change in the composition of the fluid. Thus, it is possible to realize a measurement with a further increased precision particularly when measuring the flow rate of a fuel gas such as town gas or LPG for which such a change in the composition and a change in the temperature are expected.

Figure 19:
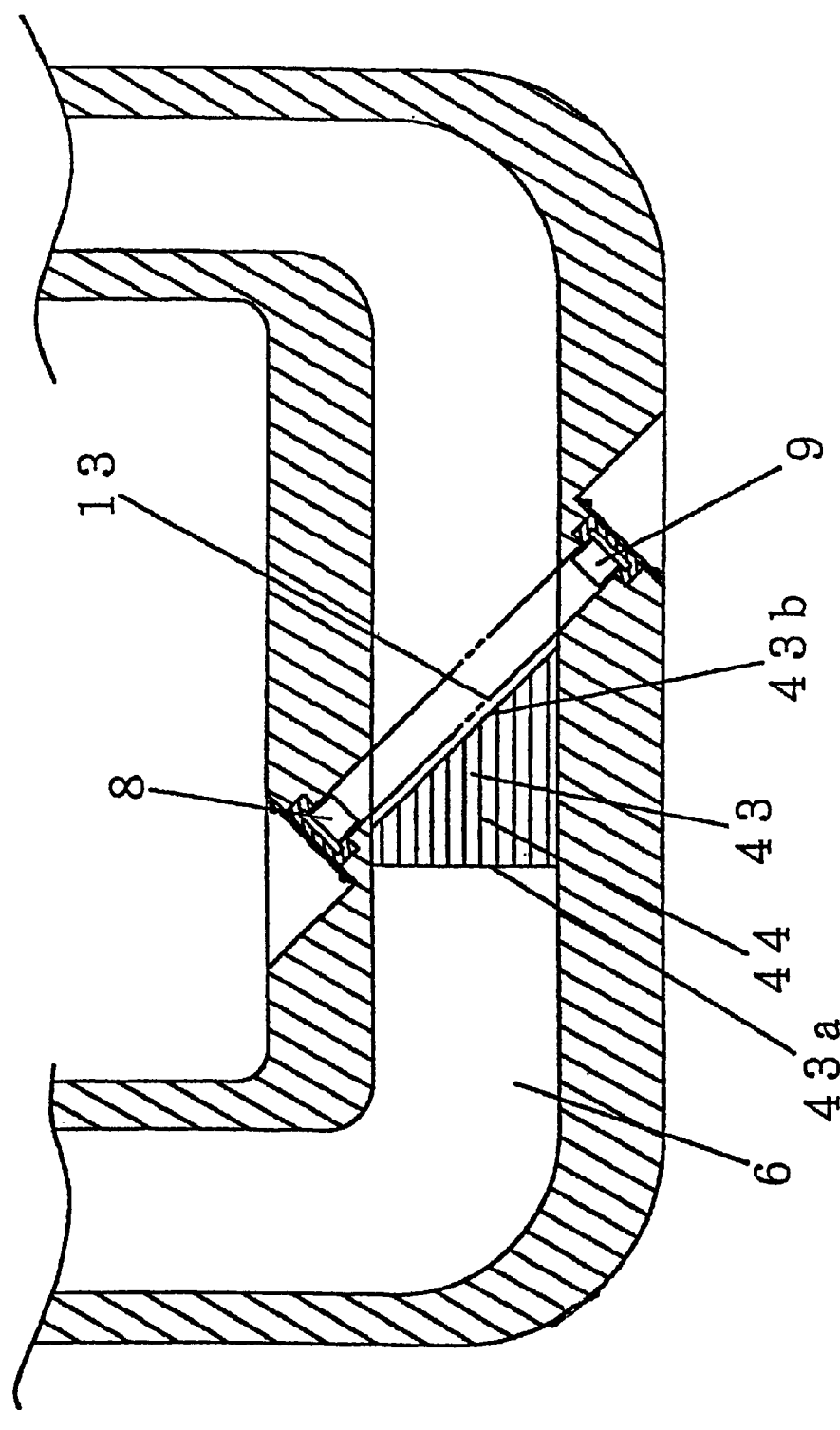
FIG. 19 is a cross-sectional view illustrating an alternative propagation path flow regulator according to Embodiment 4 of the present invention.

An example in which the length of the propagation path flow regulator 43 from an inlet side 43a to an outlet side 43b is substantially constant across the width W direction of the measurement flow path 6 has been illustrated above. However, as in another embodiment of the propagation path flow regulator 43 illustrated in FIG. 19, only the outlet side 43b closer to the ultrasonic wave propagation path 13 may extend along the ultrasonic wave propagation path 13 with the inlet side 43a not extending along the ultrasonic wave propagation path 13. The disturbance will still be equally facilitated in the ultrasonic wave propagation path 13 from the upstream side to the downstream side. Thus, it is understood that the length from the inlet side 43a to the outlet side 43b may be varied according to the position along the width direction. Moreover, while the propagation path flow regulator 43 is arranged to extend only over a portion of the circular cross section of the measurement flow path 6 corresponding to the ultrasonic wave propagation path 13, it is understood that the propagation path flow regulator 43 may alternatively be provided to extend across the height H direction of the cross section to facilitate the stabilization of the correction coefficient K. Furthermore, while the outlet side 43b of the propagation path flow regulator 43 is arranged to extend substantially parallel to the ultrasonic wave propagation path 13 in the present embodiment, it is understood that the propagation path flow regulator 43 may be provided in any other arrangement as long as it is provided at a substantially equal position with respect to the width W direction of the measurement flow path 6 from the upstream end to the downstream end of the ultrasonic wave propagation path 13, and that the propagation path flow regulator 43 may have some depression or protrusion along the outlet side 43b.

Figure 20:
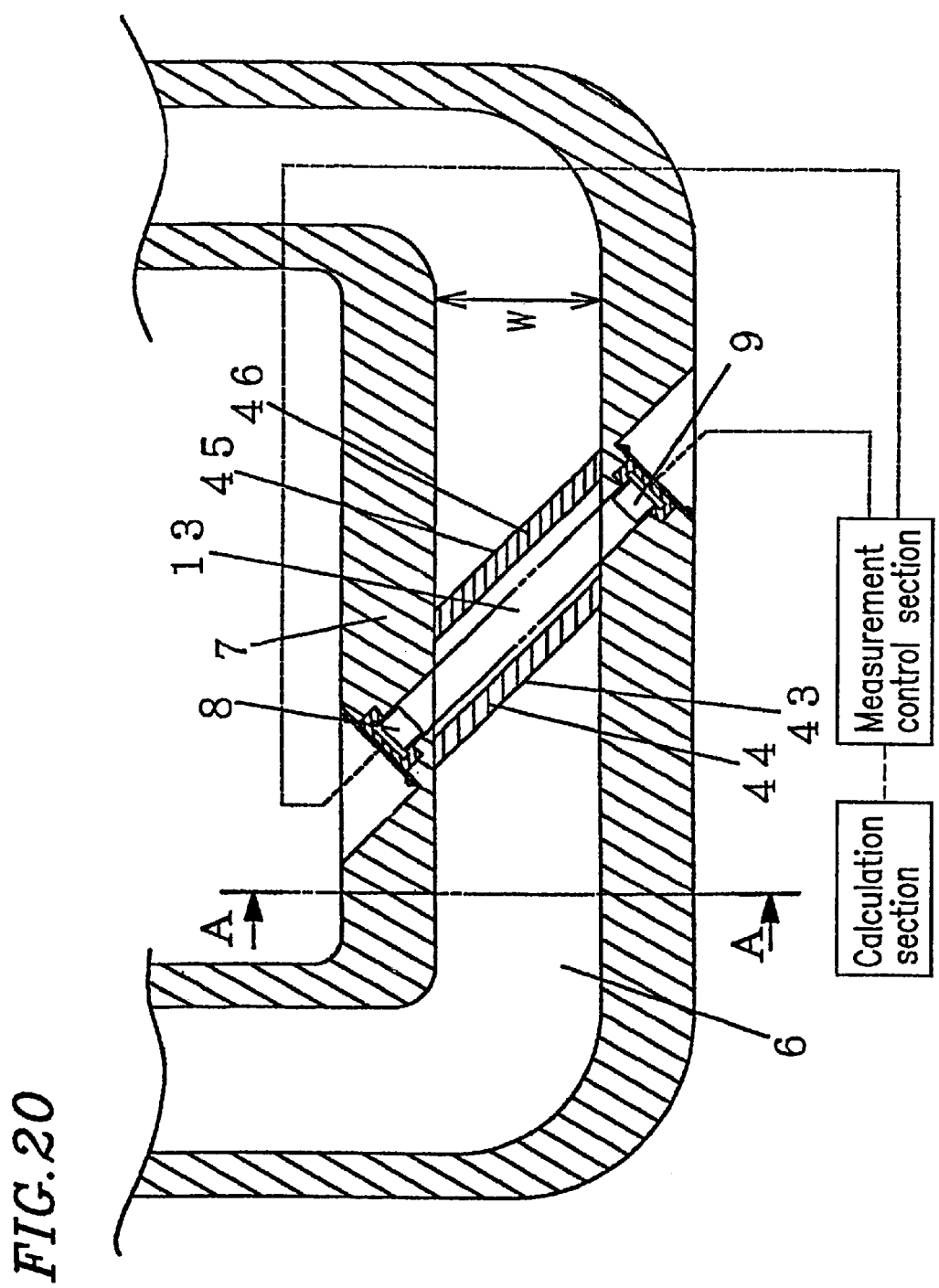
FIG. 20 is a cross-sectional view of a structure of an ultrasonic flow meter illustrating an alternative propagation path flow regulator according to Embodiment 4 of the present invention.

FIG. 20 illustrates the structure of the ultrasonic flow meter illustrating an alternative embodiment of the propagation path flow regulator. In FIG. 20, like elements and functions to those of the embodiments shown in FIGS. 1 to 19 are provided with like reference numerals and will not be described in detail, and the parts which are different from the above embodiments will be focused on in the following description.

Reference numeral 45 is a propagation path flow regulator provided on the downstream side of the ultrasonic wave propagation path 13. The downstream propagation path flow regulator 45 is arranged substantially parallel to the ultrasonic wave propagation path 13 which extends diagonally across the measurement flow path 6 and is spaced slightly apart from the ultrasonic wave propagation path 13 so as not to interfere with the propagation of the ultrasonic wave. Reference numeral 46 is a regulation section provided in the downstream propagation path flow regulator 45 and exposed to the flow. Thus, the ultrasonic wave propagation path 13 is surrounded by the upstream propagation path flow regulator 43 and the downstream propagation path flow regulator 45.

Next, the operation of the ultrasonic flow meter will be described. The flow disturbance is equally facilitated across the width W direction in the ultrasonic wave propagation path 13 by the regulation sections 44 of the propagation path flow regulator 43 provided immediately upstream of the ultrasonic wave propagation path 13 across the width W direction of the measurement flow path 6. Moreover, the downstream propagation path flow regulator 45, which surrounds the ultrasonic wave propagation path 13 together with the upstream propagation path flow regulator 43 so as to apply a back pressure to the flow in the ultrasonic wave propagation path 13. Thus, it is possible to further equalize and stabilize the flow conditions and to further stabilize the correction coefficient. Moreover, the influence of a pulsation, or the like, which occurs due to variations in the downstream piping configuration or due to the conditions under which the fluid to be measured is used, on the flow condition in the ultrasonic wave propagation path 13, can be reduced so that it is possible to perform a stable flow rate measurement. Even when a reverse flow occurs, it is possible to maintain a stable correction coefficient and to improve the measurement precision.

Figure 21:
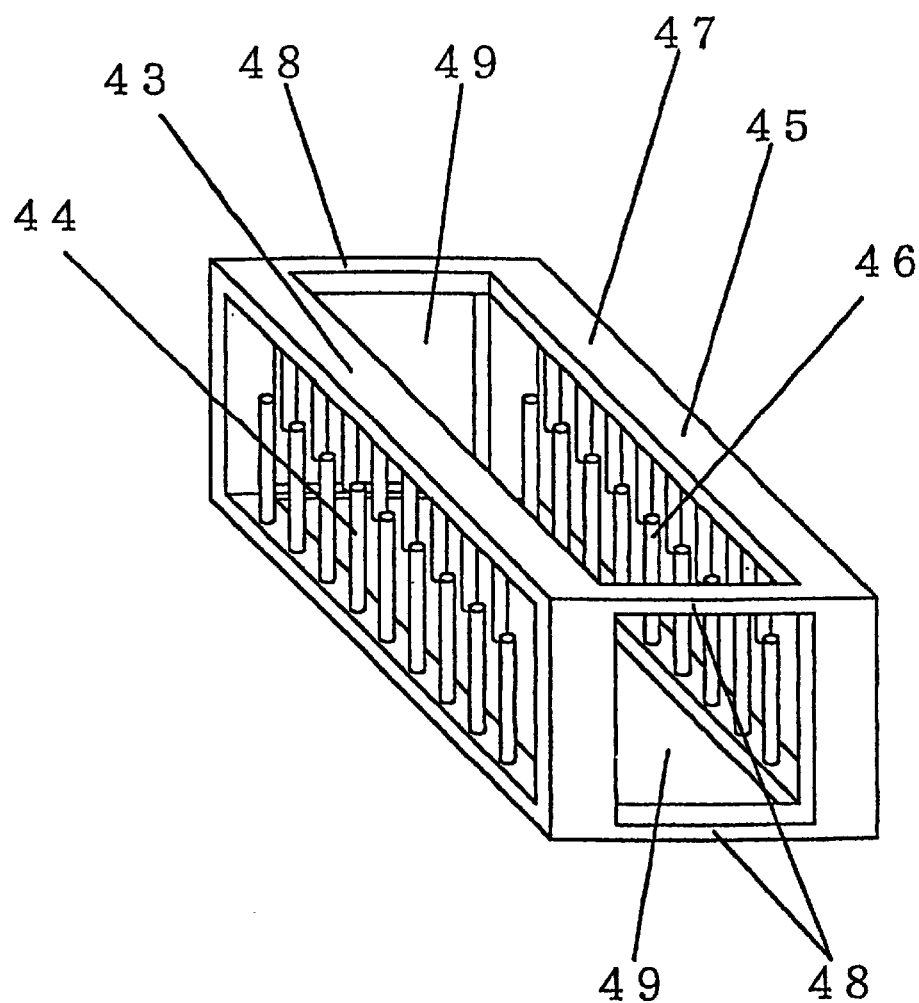
FIG. 21 is a perspective view illustrating an alternative propagation path flow regulator according to Embodiment 4 of the present invention.

FIG. 21 is a perspective view illustrating a propagation path flow regulator 47 obtained by integrating together the upstream propagation path flow regulator 43 and the downstream propagation path flow regulator 45. Reference numeral 48 is a connecting section for connecting and integrating together the upstream propagation path flow regulator 43 and the downstream propagation path flow regulator 45, and reference numeral 49 is an ultrasonic transmission window having an aperture opened therein so as not to interfere with the ultrasonic transmission.

The propagation path flow regulator 47 is connected and integrated together by the connecting section 48, whereby it is possible to prevent the positional shift of the upstream regulation sections 44 and the downstream regulation sections 46 with respect to each other. Thus, it is possible to stabilize the flow by reducing the variation in flow conditions in the ultrasonic wave propagation path 13, thereby realizing a measurement with little variation. Moreover, the propagation path flow regulator 47 can be structurally reinforced by the connecting section 48, whereby it is possible to reduce the thickness or the size of each of the propagation path flow regulators 43 and 45, including the regulation sections 44 and 46. Thus, it is possible to equalize the flow conditions in the ultrasonic wave propagation path 13 irrespective of the position across the cross section of the measurement flow path 6. Furthermore, by the reduction in the thickness or the size of the regulation sections 44 and 46, it is possible to increase the aperture area through which the fluid to be measured flows, whereby it is possible to reduce the loss of pressure in the measurement flow path. Moreover, since the propagation path flow regulators 43 and 45 are reinforced by the connecting section 48, it is possible to prevent deformation over a long term use, thereby improving the durability and the reliability. While a case where the connecting section 48 is arranged to extend between the corners of the propagation path flow regulator 47 has been illustrated above, it is understood that the connecting section 48 may be provided in any other position suitable for the reinforcement as long as it does not interfere with the ultrasonic propagation.

Figure 22:
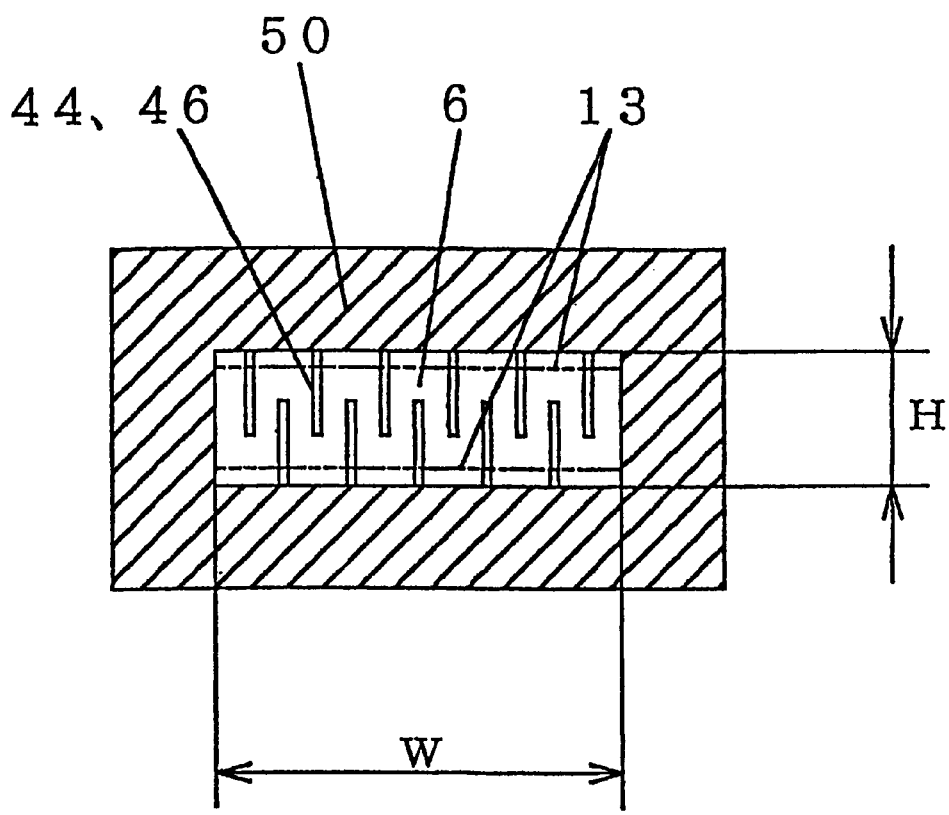
FIG. 22 is a cross-sectional view illustrating the propagation path flow regulator shown in FIG. 20 taken along line A—A.

FIG. 22 is a cross-sectional view illustrating an alternative cross section of the measurement flow path 6 according to Embodiment 4 taken along line A—A. Reference numeral 50 is a flow path wall defining the measurement flow path 6 which has a rectangular cross section with a width of W and a height of H. The regulation sections 44 and 46 are arranged across the rectangular cross section.

Next, the measurement operation in the case of the rectangular cross section will be described. The ultrasonic wave propagation path 13 extends across the width W direction of the ultrasonic wave propagation path 13, and it is thus possible to increase the ratio of the measurement area with respect to the height H direction of the rectangular cross section. The ratio of the measurement area along the height H direction can be constant across the width W direction from the upstream side to the downstream side. Therefore, it is possible to perform a high-precision measurement of the average flow velocity of the fluid in the ultrasonic wave propagation path 13. For the flow in the ultrasonic wave propagation path 13, the flow disturbance is equally facilitated by the regulation sections 44 and 46 of the propagation path flow regulators 43 and 45 from the upstream side to the downstream side over a wide flow rate range, whereby it is possible to measure the average flow velocity with a high precision. Thus, it is not necessary to employ a method of increasing the measurement precision by increasing the aspect ratio (W/H) of the rectangular cross section so as to increase the flatness thereof to generate a stable two-dimensional flow in the measurement flow path 6. The height H can be determined in order to reduce the influence of the ultrasonic wave reflected by the upper and lower surfaces which together define the height H of the cross-section. Therefore, it is possible to freely set the cross-sectional specification according to the height H of the flow path such that interference by reflected waves is reduced, thereby allowing for ultrasonic transmission/reception with an increased sensitivity. Moreover, it is possible to increase the measurement precision by reducing variations in the correction coefficient.

Furthermore, it is possible to employ a rectangular cross section having a small flatness with an aspect ratio of less than 2 so as to reduce the length along which the cross section contacts the fluid to be measured, thereby reducing the loss of pressure in the measurement flow path. It is understood that the rectangular cross section as used herein also includes a generally rectangular shape with a rounded portion (corner R) in each corner of the rectangular cross section so as to ensure the durability of the manufacturing equipment such as a metallic die used in the case where the flow path wall 7 is formed by die casting.

Figure 23:
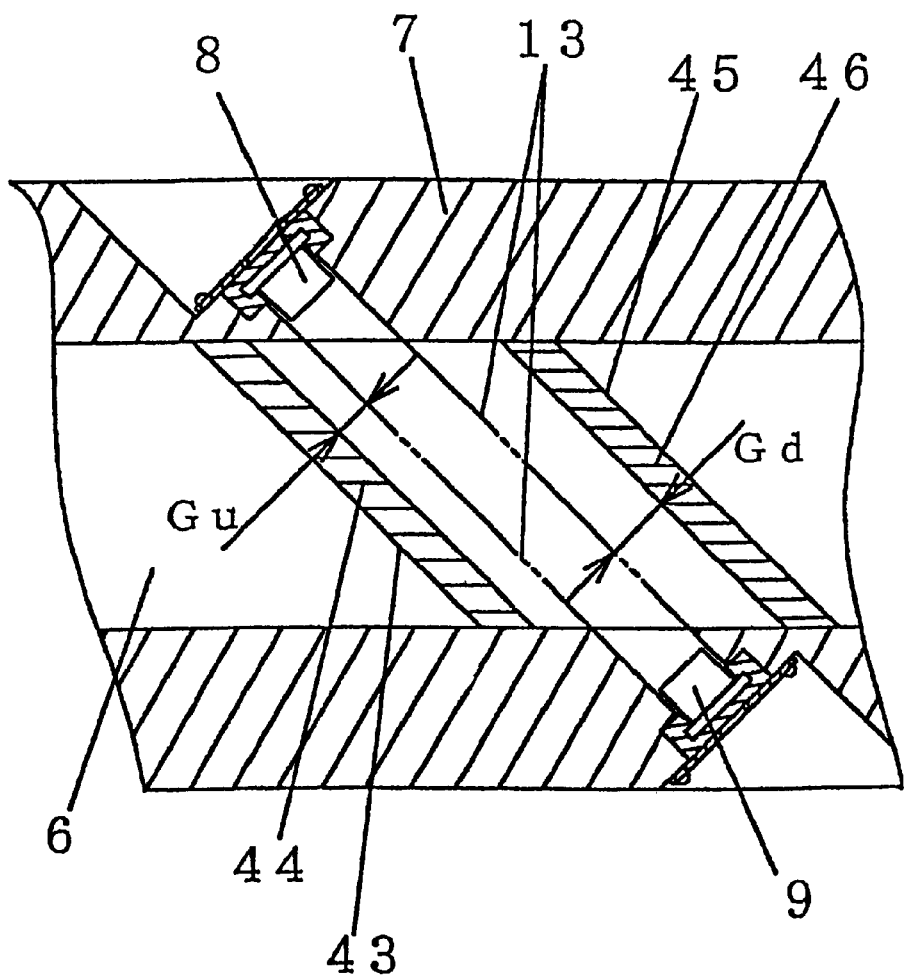
FIG. 23 is a cross-sectional view illustrating the positions where propagation path flow regulators are provided.

FIG. 23 illustrates the distance between the propagation path flow regulator 43 or 45 and the ultrasonic wave propagation path 13 in the present embodiment. The distance between the upstream propagation path flow regulator 43 and the ultrasonic wave propagation path 13 is Gu, and the distance between the downstream propagation path flow regulator 45 and the ultrasonic wave propagation path 13 is Gd.

The distance between the propagation path flow regulator 43 or 45 and the ultrasonic wave propagation path 13 is optimized so as to stabilize the correction coefficient for the measurement values for a variety of fluids to be measured over a wide flow rate range, thereby equally disturbing the flow distribution in the ultrasonic wave propagation path 13 from the upstream side to the downstream side. For example, when the Reynolds number is small, the distance Gu and/or Gd can be reduced, and when the Reynolds number is large, distance Gu and/or Gd can be increased. The Reynolds number is proportional to the inverse of the kinematic viscosity. Therefore, the distance Gu and/or Gd is increased for a fluid having a small viscosity, and the distance Gu and/or Gd is reduced for a fluid having a large viscosity. For example, propane gas has a kinematic viscosity of 4.5 mm$^2$/s (300° K.), and methane gas has a kinematic viscosity of 17.1 mm$^2$/s (300° K.). Therefore, the distance Gu and/or Gd is increased for propane gas, and the distance Gu and/or Gd is reduced for methane gas. Under such conditions, the propagation path flow regulator 43 or 45 should be provided at a distance as great as possible from the ultrasonic wave propagation path 13 in order to reduce the amount of ultrasonic waves propagating through the ultrasonic wave propagation path 13 and reflected by the propagation path flow regulator 43 or 45 thereby influencing the flow velocity measurement. However, in order to equally disturb the flow from the upstream side to the downstream side of the ultrasonic wave propagation path 13, the distance should be optimized. It is understood that the distance Gu and the distance Gd do not have to have the same value, but may be set to have different values, and that the relationship between the distance Gu and the distance Gd varies depending upon the difference between the shape and/or the aperture dimension of the regulation section 44 of the propagation path flow regulator 43 and those of the regulation section 46 of the propagation path flow regulator 45. It is understood that the relationship between the distance and the viscosity may be different from that described above when the shape and/or the aperture dimension of the regulation sections 44 and 46 are varied depending upon the type of the fluid.

Therefore, it is possible to perform a high-precision measurement for various fluids by changing only the propagation path flow regulator without changing the shape and dimension of the measurement flow path 6, thereby increasing the convenience for the user. Moreover, it is possible to provide a measurement device with a low cost by using various common members for various conditions.

Figure 24:
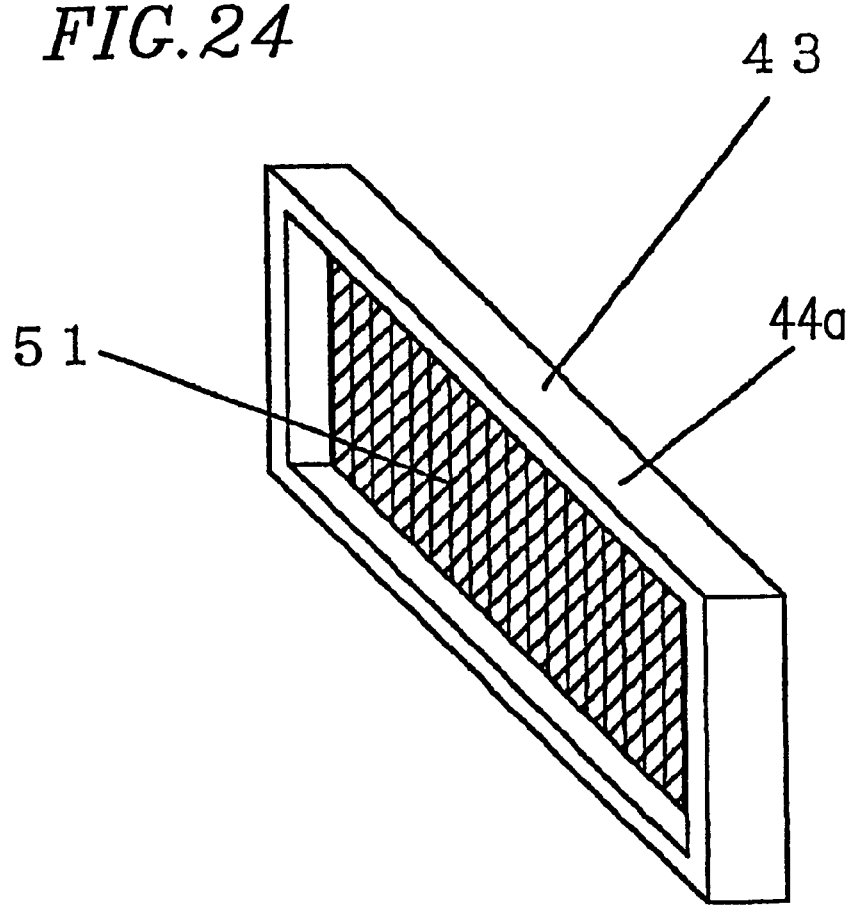
FIG. 24 is a perspective view illustrating an alternative propagation path flow regulator.

FIG. 24 is a perspective view illustrating an alternative embodiment of the propagation path flow regulator. Reference numeral 51 is a regulation section of the propagation path flow regulator 43. The regulation section 51 is formed by a meshed member such as a wire mesh or a fabric having a small thickness in the flow direction. A similar member as the regulation section 51 can also be provided in the propagation path flow regulator 45 (not shown). It is understood that the propagation path flow regulator can be formed by a meshed member alone without using an outer frame 44a of the propagation path flow regulator.

Since the regulation section 51 is formed by the meshed member having a small thickness in the flow direction, it is possible to reduce the size of the propagation path flow regulator 43 or 45 along the flow direction so that it can be installed in a small space, thereby reducing the size of the measurement flow path. Use of a material which does not easily reflect ultrasonic waves for the meshed member covering the ultrasonic wave propagation path 13, in combination with the use of the meshed member which has a large aperture ratio, provides an advantage of reducing the reflection of the ultrasonic waves by the propagation path flow regulator 43 or 45, thereby reducing the influence of interference by reflected waves on the measurement precision and thus realizing a high-precision measurement.

Figure 25:
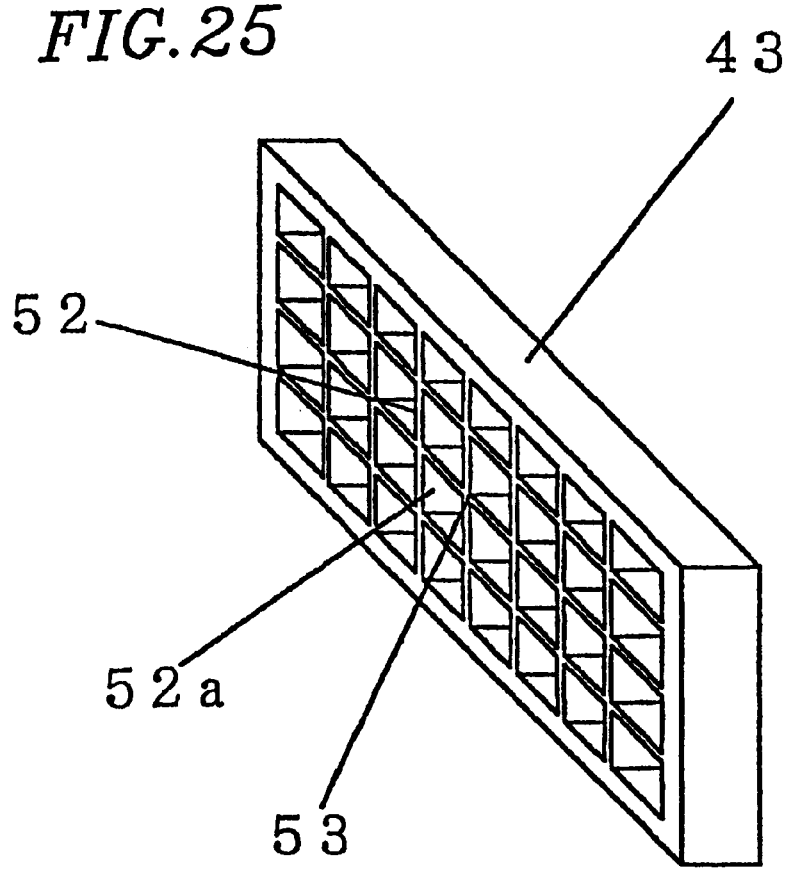
FIG. 25 is a perspective view illustrating an alternative propagation path flow regulator.

FIG. 25 is a perspective view illustrating an alternative embodiment of the propagation path flow regulator. Reference numeral 52 is a regulation section of the propagation path flow regulator 43. The regulation section 52 includes a lattice member 53 having many wall surfaces 52a extending along the flow direction. A similar member as the regulation section 52 can also be provided in the propagation path flow regulator 45 (not shown).

By the wall surfaces 52a extending along the flow direction, it is possible to regulate the direction of the flow passing through the propagation path flow regulator 43. Particularly, it is possible to reduce the generation of the vortex by reducing the flow of the fluid into the aperture holes 11 and 12 provided immediately before the ultrasonic transducers 8 and 9, whereby it is possible to reduce the attenuation of the ultrasonic wave due to a vortex, thereby allowing for a measurement up to a greater flow rate range. Moreover, each wall surface 52a can be directed to a direction such that the flow velocity distribution in the ultrasonic wave propagation path 13 is more equalized so that it is possible to further equalize the flow velocity distribution in the ultrasonic wave propagation path 13, thereby improving the measurement precision.

Figure 26:
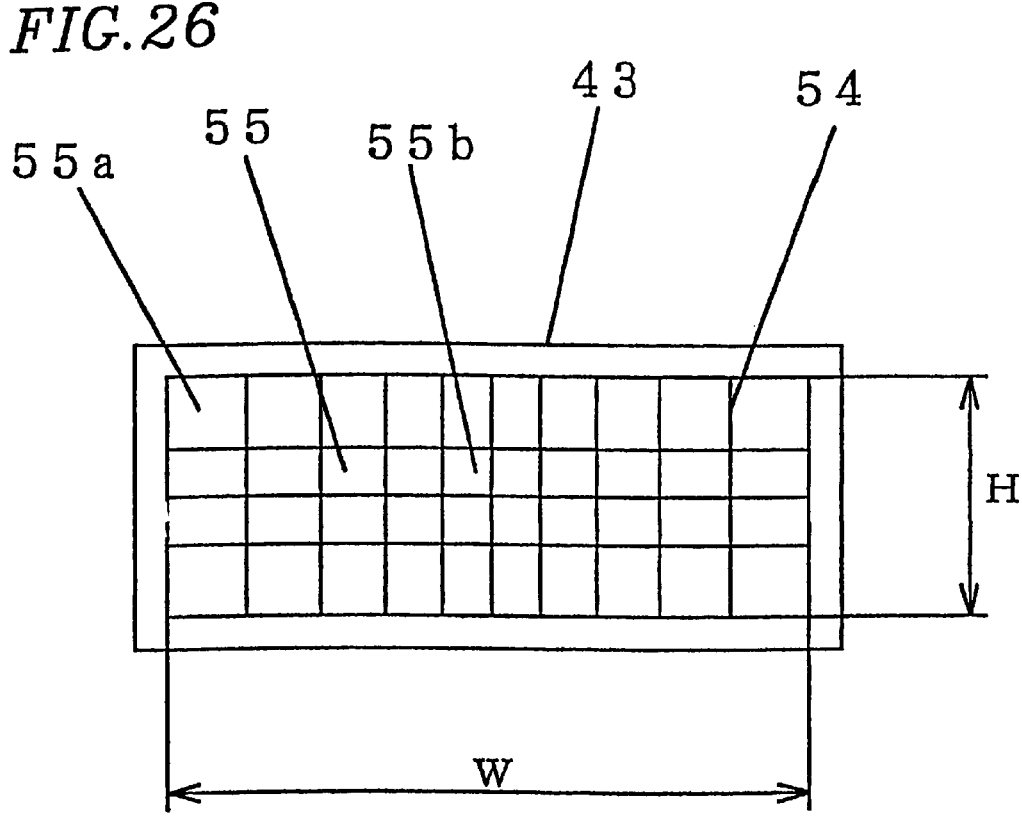
FIG. 26 is a front view of an alternative propagation path flow regulator as viewed along the flow direction.

FIG. 26 is a front view of an alternative embodiment of the propagation path flow regulator as viewed along the flow direction. Reference numeral 54 denotes regulation sections provided in the propagation path flow regulator 43 in which the interval between two adjacent regulation sections is varied depending on the position along the transverse section of the measurement flow path 6 so as to vary the cross-sectional area of each passage hole 55. Herein, the cross-sectional area of a passage hole 55a along the periphery of the cross section of the propagation path flow regulator 43 is set to be greater than that of a passage hole 55b in the center portion of the propagation path flow regulator 43. Specifically, the cross-sectional area of the passage hole 55 increases toward the respective ends of the propagation path flow regulator 43 along the width W direction or the height H direction. A similar member as the regulation section 54 can also be provided in the propagation path flow regulator 45 (not shown).

Next, the operation will be described. When the propagation path flow regulator 43 is absent, it is difficult to obtain a uniform flow velocity distribution because the fluid flowing along the wall surface of the measurement flow path 6 has a reduced flow velocity due to the viscosity of the fluid, while the fluid flowing through the central portion of the measurement flow path 6 has a relatively large flow velocity. However, in this example, the propagation path flow regulator 43 is provided while the cross-sectional area of the passage hole 55 is reduced in the center portion of the cross section of the measurement flow path 6 so as to reduce the flow velocity. The cross-sectional area of the passage hole 55 is increased along the periphery so that the passage resistance is smaller than that in the center portion, thereby suppressing the decrease in the flow velocity. Thus, the flow velocity distribution in the ultrasonic wave propagation path 13 is equalized. Therefore, the flow velocity in the ultrasonic wave propagation path 13 which extends diagonally across the measurement flow path 6 is equalized from the upstream side to the downstream side, so that the measured value of the average flow velocity in the ultrasonic wave propagation path 13 can well conform with that measured across the cross section of the measurement flow path 6 over a wide flow rate range from the laminar flow range to the disturbed flow range, thereby stabilizing the change in the flow rate coefficient and increasing the measurement precision.

As described above, in the ultrasonic flow meter according to Embodiment 4, the propagation path flow regulator 43 is provided immediately upstream of the ultrasonic wave propagation path 13 to extend along the entire area of the ultrasonic wave propagation path 13 from the upstream end to the downstream end thereof, thereby facilitating the disturbance of the flow across the entire area of the ultrasonic wave propagation path 13. Thus, the characteristics of the correction coefficient due to flow rate change can be stabilized over the entire flow rate measurement range, thereby improving the measurement precision. Even when the physical property values of the fluid change, the measurement precision is maintained, thereby increasing the practicability and the convenience. Moreover, by the diagonal arrangement of the propagation path flow regulator 43 across the measurement flow path 6, it is possible to increase the aperture ratio thereof, thereby realizing a measurement device with a reduced pressure loss. Furthermore, by the diagonal arrangement of the propagation path flow regulator 43 across the measurement flow path 6, it is possible to ensure a large area across which the regulation sections 44 can be provided. Thus, it is possible without increasing the pressure loss to reduce the interval between adjacent regulation sections 44 and to increase the number of the regulation sections 44, thereby increasing the flow disturbance facilitating effect.

Thus, the ultrasonic wave propagation path 13 is surrounded by the upstream and downstream propagation path flow regulators 43 and 45, whereby it is possible to equalize the disturbance condition from the upstream side and the downstream side of the ultrasonic wave propagation path 13, thereby further stabilizing the correction coefficient and further improving the measurement precision. Moreover, the influence of the flow condition on the downstream side along the measurement flow path 6 is reduced by the downstream propagation path flow regulator 45. Thus, it is possible to realize a stable measurement irrespective of the piping condition on the downstream side of the measurement flow path 6, thereby improving the freedom in the installment of the measurement device. Moreover, the same effect is obtained both for a forward flow and a reverse flow along the measurement flow path, so that it is possible to stabilize the correction coefficient even for a pulsating flow or a reverse flow, thereby increasing the measurement precision.

The upstream and the downstream propagation path flow regulators 43 and 45 are integrated together. Thus, it is possible to prevent and stabilize a shift in the distance between the propagation path flow regulators or a positional shift between the upstream regulation section and the downstream regulation section, thereby realizing a measurement device with reduced variation. Moreover, the connecting section reinforces the propagation path flow regulators, whereby it is possible to reduce the size or the thickness of the regulation section. Therefore, it is possible to equalize the flow condition in the ultrasonic wave propagation path or to reduce the loss of pressure in the measurement flow path.

It is possible to commonly use the measurement flow path irrespective of the type of the fluid to be measured by changing only the distance of the propagation path flow regulator from the ultrasonic wave propagation path 13, thereby improving the convenience. Moreover, it is possible to maintain a stable measurement precision irrespective of the fluid to be measured. Furthermore, since the measurement flow path can be commonly used, it is possible to reduce the cost.

In one embodiment, the regulation section may be provided in the form of a meshed member. Thus, it is possible to reduce the installment space of the propagation path flow regulator with respect to the flow direction, thereby reducing the size of the measurement flow path.

In one embodiment, the regulation section may be provided in the form of a lattice member whose wall surfaces extend along the flow direction to regulate the flow direction, thereby further equalizing the flow velocity distribution in the ultrasonic wave propagation path and thus improving the measurement precision.

The interval between two adjacent regulation sections may be varied depending on the position along the transverse section of the measurement flow path. Thus, it is possible to optimize the size of each regulation section according to the position along the transverse section of the measurement flow path while maintaining a reduced length of the regulation section along the flow direction. Therefore, it is possible to further equalize the flow velocity distribution in the ultrasonic wave propagation path and to reduce the length of the regulation section along the flow direction, thereby reducing pressure losses while improving the measurement precision due to the equalization of the flow velocity distribution.

By employing a rectangular cross section for the measurement flow path, it is possible to increase the measurement area with respect to the total measurement cross-sectional area, thereby allowing for a measurement under the same conditions from the upstream side to the downstream side of the ultrasonic wave propagation path and thus allowing for a high-precision measurement of the average flow velocity of the fluid.

By the employment of a rectangular cross section for the propagation path flow regulator arranged along the ultrasonic wave propagation path and for the measurement flow path, it is not necessary to increase the aspect ratio of the cross section to create a two-dimensional flow, and it is possible to freely set the cross-sectional specification according to the height of the flow path such that interference by reflected waves is reduced, thereby allowing for ultrasonic transmission/reception with an increased sensitivity. Moreover, it is possible to reduce the loss of pressure in the measurement flow path by adjusting the measurement cross section such that the length along which the measurement cross section contacts the fluid is reduced without excessively flattening the measurement cross section.

A case where the elbow sections 17 and 18 are bent in the width W direction of the measurement flow path 6 has been illustrated in the present embodiment. However, it is understood that the elbow sections 17 and 18 may alternatively be bent in the height H direction of the measurement flow path 6 or any other direction, and the elbow sections 17 and 18 may be bent at different angles.

EMBODIMENT 5

Figure 27:
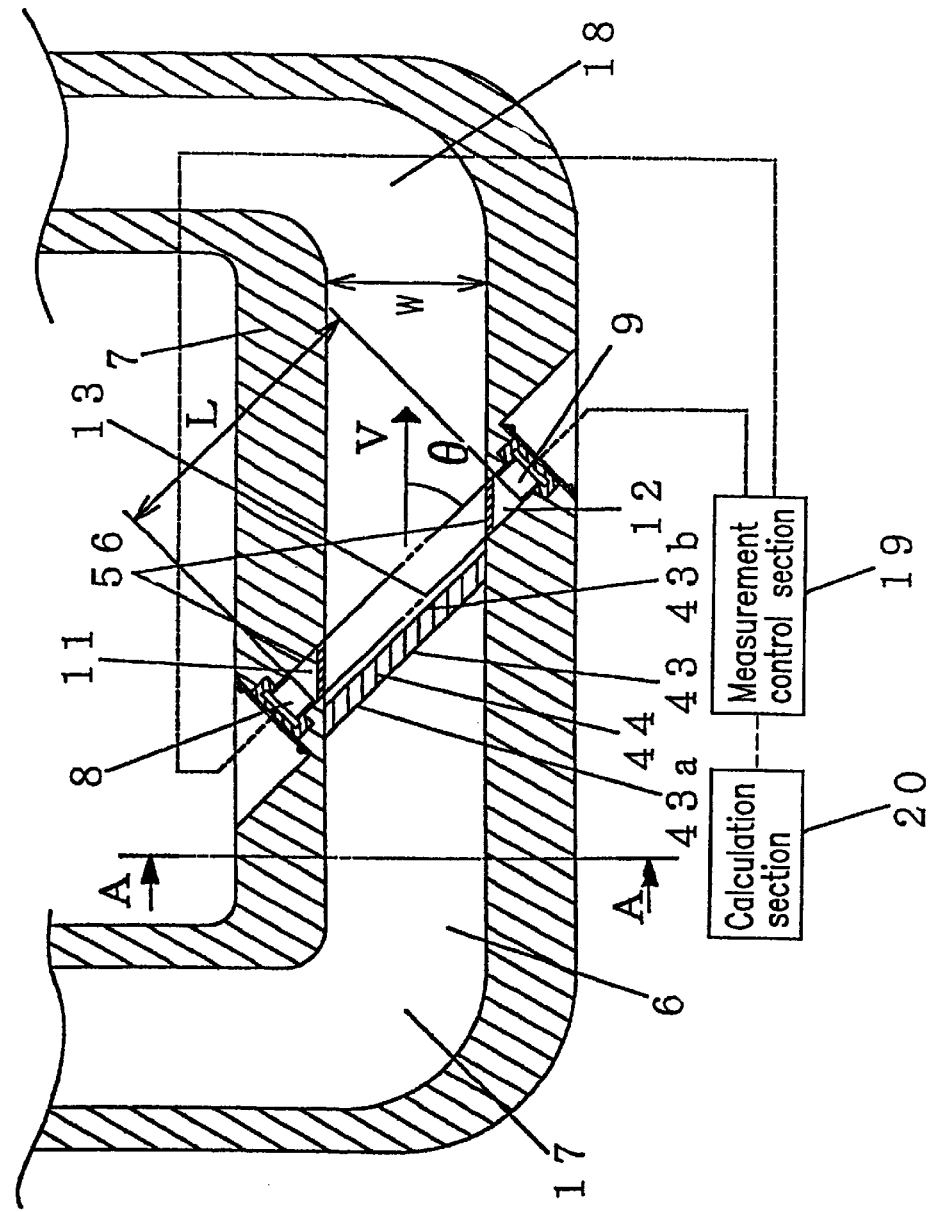
FIG. 27 is a cross-sectional view illustrating a structure of an ultrasonic flow meter according to Embodiment 5 of the present invention.

FIG. 27 is a cross-sectional view illustrating the structure of an ultrasonic flow meter according to Embodiment 5 of the present invention. In FIG. 27, like elements and functions to those of the embodiments shown in FIGS. 1 to 26 are provided with like reference numerals and will not be described in detail, and the parts which are different from the above embodiments will be focused on in the following description.

Figure 28:
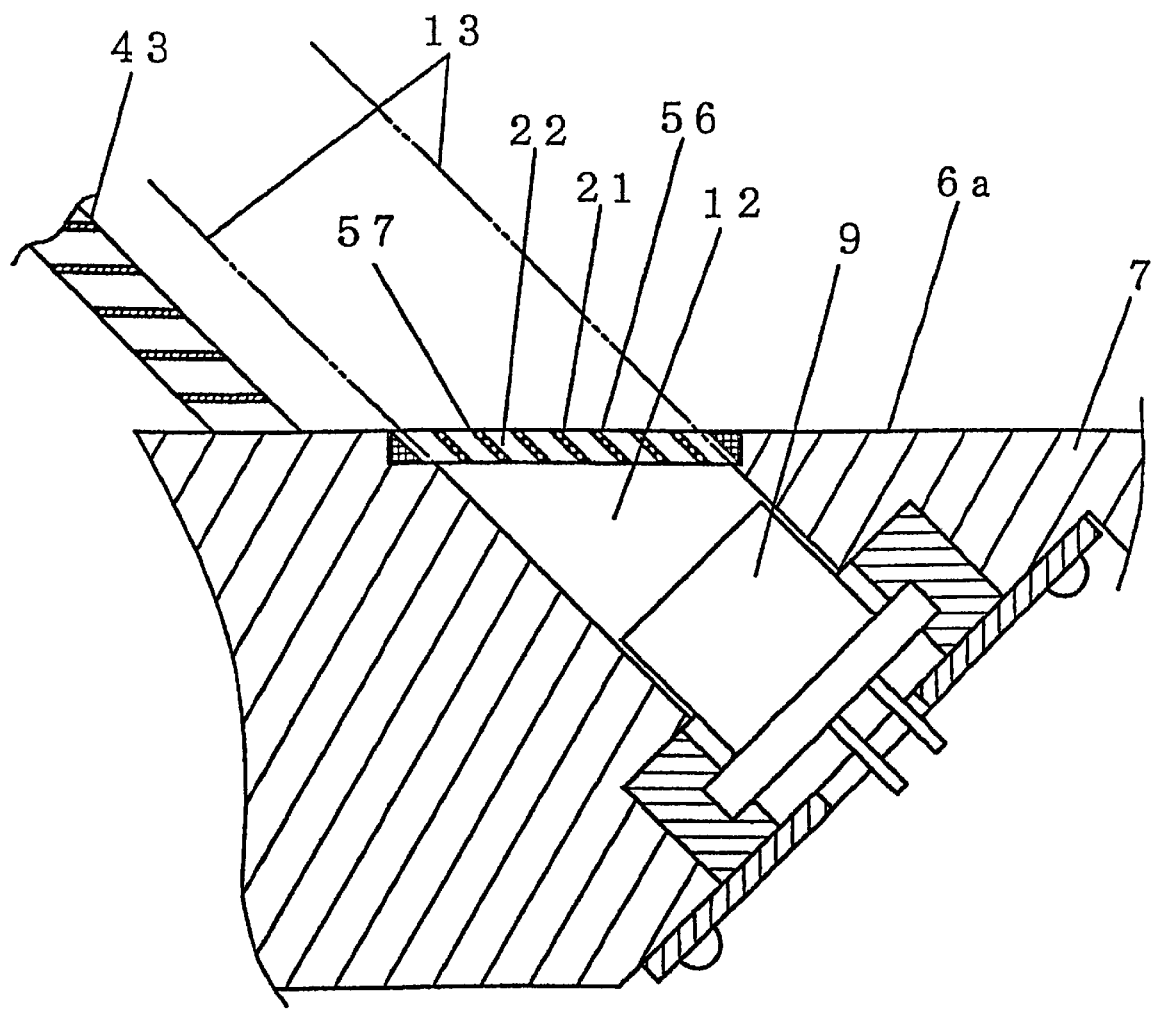
FIG. 28 is a cross-sectional view illustrating an influent suppressor according to Embodiment 5 of the present invention.

Reference numeral 56 is an influent suppressor for reducing the inflow of the fluid to be measured into the aperture holes 11 and 12. The influent suppressor 56 is provided on the downstream side of the above-described propagation path flow regulator 43 which is provided on the upstream side of the ultrasonic wave propagation path 13. The influent suppressor 56 includes a first influent suppressor 57 formed by the aperture hole sealing section 21 having many ultrasonically transmissive holes 22 capable of transmitting an ultrasonic wave therethrough, as illustrated in an enlarged view of FIG. 28. The aperture hole sealing section 21 extends across the ultrasonic wave propagation path 13 and is coplanar with the measurement flow path surface 6a of the aperture holes 11 and 12 so as to reduce the amount of fluid flow into the aperture holes 11 and 12.

Figure 29:
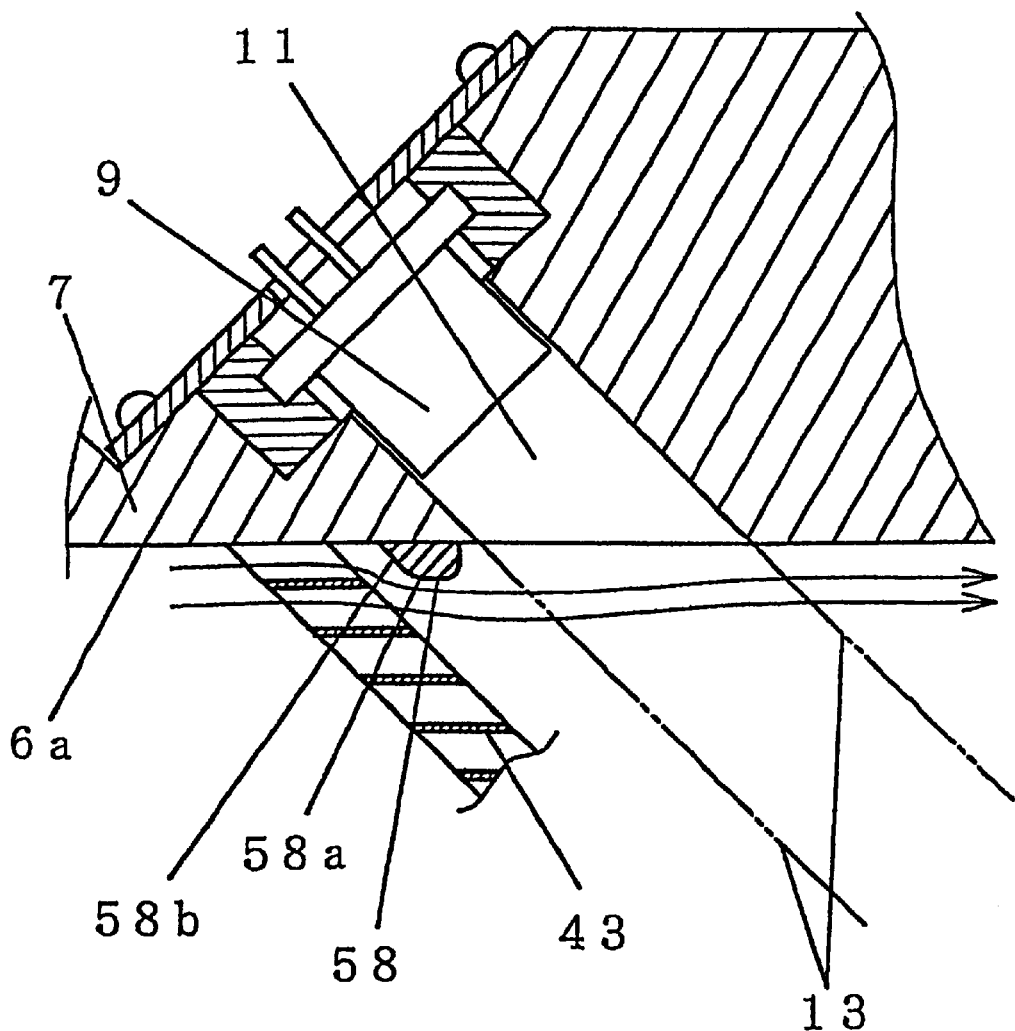
FIG. 29 is a cross-sectional view illustrating an alternative influent suppressor according to Embodiment 5 of the present invention.

FIG. 29 illustrates another embodiment of the influent suppressor. A first influent suppressor 58 includes a flow deflector 58a and a guide surface 58b. The flow deflector 58a is provided to protrude from the flow path wall 7 on the immediate upstream side of the upstream aperture hole 11. The guide surface 58b is provided on the upstream side of the flow deflector 58a with a smoothly increasing height. The first influent suppressor 58 deflects the fluid flowing near the measurement flow path surface 6a away from the wall surface so that the fluid does not enter the aperture hole 11. When the distance Gu or Gd between the propagation path flow regulator and the ultrasonic wave propagation path is small, the flow deflector 58a and the guide surface 58b can be formed integrally with the propagation path flow regulator 43 so as to provide a second influent suppressor.

Figure 30:
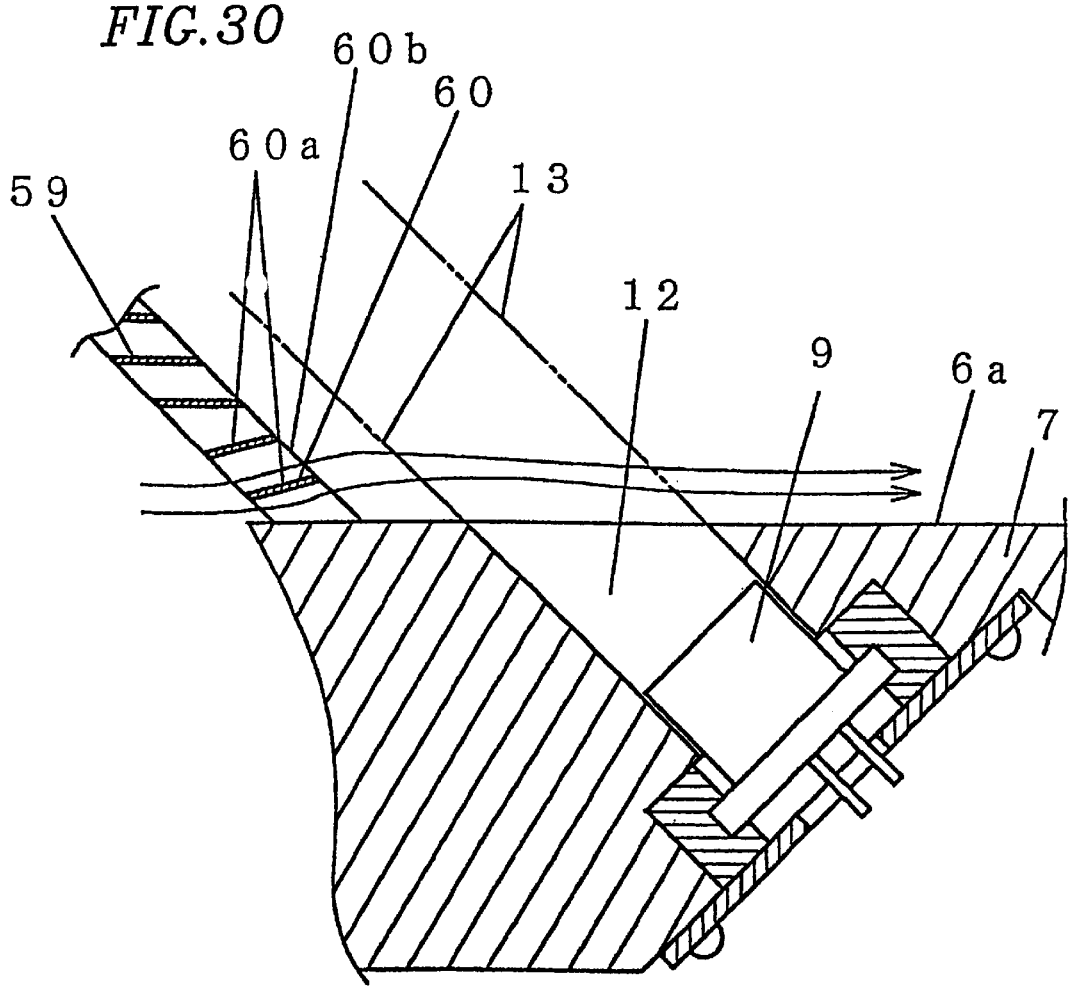
FIG. 30 is a cross-sectional view illustrating an alternative influent suppressor according to Embodiment 5 of the present invention.

In FIG. 30, reference numeral 60 is a second influent suppressor obtained by providing an influent suppressing section 60b with flow deflectors 60a on the side of a propagation path flow regulator 59 near the measurement flow path surface 6a. Thus, the propagation path flow regulator 59 and the second influent suppressor 60 are integrated together.

Next, the flow condition of the fluid to be measured, through the ultrasonic flow meter will be described. First, the fluid to be measured enters the measurement flow path 6 with a non-uniform flow or a flow pulsation due to the increase/decrease in the flow path cross-sectional area provided by a control valve (not shown) which is provided on the upstream side of the measurement flow path 6 and/or due to the passage through the elbow section 17. Then, the disturbance of the flow is facilitated by the regulation sections 44 of the propagation path flow regulator 43 provided immediately upstream of the ultrasonic wave propagation path 13. The propagation path flow regulator 43 is provided immediately upstream of the ultrasonic wave propagation path 13 to extend all the way from the vicinity of the upstream ultrasonic transducer 8 to the vicinity of the downstream ultrasonic transducer 9, whereby the flow disturbance is equally facilitated across the entire area of the ultrasonic wave propagation path 13. In this way, the variation in the flow condition is reduced in the ultrasonic wave propagation path 13 from the upstream side to the downstream side so as to facilitate the measurement of the average flow velocity in the ultrasonic wave propagation path 13. Particularly, when the flow velocity is small (when the flow rate is small) and thus the fluid flows into the measurement flow path 6 as a laminar flow, the flow disturbance is facilitated by the propagation path flow regulator 43 in the ultrasonic wave propagation path 13. Thus, the difference between this flow disturbance and the flow disturbance which results in the ultrasonic wave propagation path 13 when the flow velocity is large (when the flow rate is large), and thus the fluid flows into the measurement flow path 6 as a disturbed flow is small. Therefore, it is possible to stably disturb the flow in the ultrasonic wave propagation path 13 over a wide flow rate range from a small flow rate to a large flow rate. Moreover, the propagation path flow regulator 43 is arranged to extend diagonally across the measurement flow path 6, whereby the propagation path flow regulator 43 can have a greater length within the measurement flow path 6 than that obtained when the propagation path flow regulator 43 is arranged to extend orthogonal to the measurement flow path 6. Therefore, it is possible to provide the propagation path flow regulator 43 with a large aperture ratio and to realize a measurement device with a reduced pressure loss.

Next, the flow in the vicinity of the aperture hole will be described. First, when only the first influent suppressor 57 or 58 provided for the downstream aperture hole 12 is used as the influent suppressor, it is possible to efficiently reduce the fluid flow into the downstream aperture hole around which a strong vortex easily occurs because the downstream aperture hole extends in a direction at an acute angle with respect to the flow so as to efficiently reduce flow disturbances between the ultrasonic transducers, thereby increasing the upper limit value for the flow rate measurement. Particularly, when the aperture hole sealing section 21 is the first influent suppressor 57, it is possible to further increase the influent suppressing effect and to reduce the flow in the aperture hole. Moreover, as compared to the case where the aperture hole sealing section 21 is provided for both of the aperture holes 11 and 12, the amount of ultrasonic attenuation can be reduced, whereby it is possible to reduce the driving input for the ultrasonic transducers and to reduce the power consumption.

Next, when the influent suppressor is the first influent suppressor 57 or 58 provided for both of the upstream and downstream aperture holes 11 and 12, disturbances in the aperture hole, which account for a major part of the total flow disturbance in the ultrasonic wave propagation path, can be reduced efficiently, whereby it is possible to increase the measurement precision and the upper limit value for the flow rate measurement. Particularly, when the aperture hole sealing section 21 is the first influent suppressor 57, it is possible to efficiently reduce flow disturbances for either a forward flow or a reverse flow in the measurement flow path. It is understood that when the first influent suppressor 58 including the flow deflector 58a is provided for the upstream aperture hole 11 and the first influent suppressor 57 including the aperture hole sealing section 21 is provided for the downstream aperture hole 12, it is possible to further reduce flow disturbances between the ultrasonic transducers and to reduce the amount of ultrasonic attenuation, thereby reducing the power consumption for the ultrasonic transducers.

Moreover, when the influent suppressor is the second influent suppressor obtained by providing the propagation path flow regulator with the influent suppressing section, it is possible to suppress the flow into the aperture hole. Furthermore, by the integration of the propagation path flow regulator with the influent suppressor, it is possible to reduce the variation in the suppression of the fluid flow into the aperture hole, thereby increasing the reliability. Moreover, it is possible to provide a compact ultrasonic wave propagation path, thereby reducing the size of the measurement flow path.

Thus, the ultrasonic wave is transmitted and received between the ultrasonic transducers 8 and 9 along the ultrasonic wave propagation path 13 where the flow is stabilized. Thus, it is possible to realize high-precision flow velocity measurement, and to reduce the attenuation of the ultrasonic wave due to the variation in the flow, thereby increasing the upper limit value for the flow rate measurement. If the first influent suppressor 57 or 58 or the second influent suppressor 60 is absent, a strong flow in the measurement flow path 6 may flow into the aperture hole 12 thereby generating a strong vortex because the downstream aperture hole 12 extends in a direction at an acute angle with respect to the measurement flow path 6, whereby the flow velocity measurement precision may be reduced due to a flow velocity fluctuation in a portion of the flow, and/or the upper limit value for the measurement may be reduced by an ultrasonic attenuation due to a vortex. Also for the upstream aperture hole 11, in the absence of the first influent suppressor 57 or 58 or the second influent suppressor 60, there occurs an influent of the flow. However, the influence is small because the aperture hole 11 extends in a direction at an obtuse angle with respect to the measurement flow path 6 whereby the strength of the vortex is smaller than the strength of the vortex occurring around the downstream aperture hole 12. It is understood that it is possible to further stabilize the flow by providing the first influent suppressor 57 or 58 or the second influent suppressor 60 for the upstream aperture hole 11.

Next, the correction coefficient K used when obtaining the flow rate based on the ultrasonic propagation times T1 and T2 will be described. The propagation path flow regulator 43 is provided immediately upstream of the ultrasonic wave propagation path 13 to extend along the entire area of the ultrasonic wave propagation path 13 from the upstream end to the downstream end thereof, thereby facilitating the disturbance of the flow across the entire area of the ultrasonic wave propagation path 13. Thus, the correction coefficient K is stabilized and has a reduced change for a change in the flow rate as in the case described above with reference to FIGS. 17 and 18. Because the characteristics of the correction coefficient due to flow rate change is stabilized, the measurement precision is maintained even when the physical property values of the fluid change, thereby increasing the practicability and the convenience. Moreover, by the significant reduction in the disturbance of the flow between the ultrasonic transducers, it is possible to further increase the ultrasonic reception level across the entire measurement range, thereby further improving the measurement precision. Furthermore, it is possible to reduce the inflow of the fluid into the aperture holes 11 and 12 so as to significantly reduce flow disturbances between the ultrasonic transducers, thereby increasing the upper limit value for the flow rate measurement.

When the aperture hole sealing section is a meshed member of an inclined mesh pattern having an inclination with respect to a horizontal direction, or when the flow deflector is provided both on the upstream side and the downstream side of the aperture hole, it is possible stabilize the correction coefficient and to improve the measurement precision. Moreover, the effects described above in Embodiment 1 are additionally provided, thereby further improving the reliability.

Figure 31:
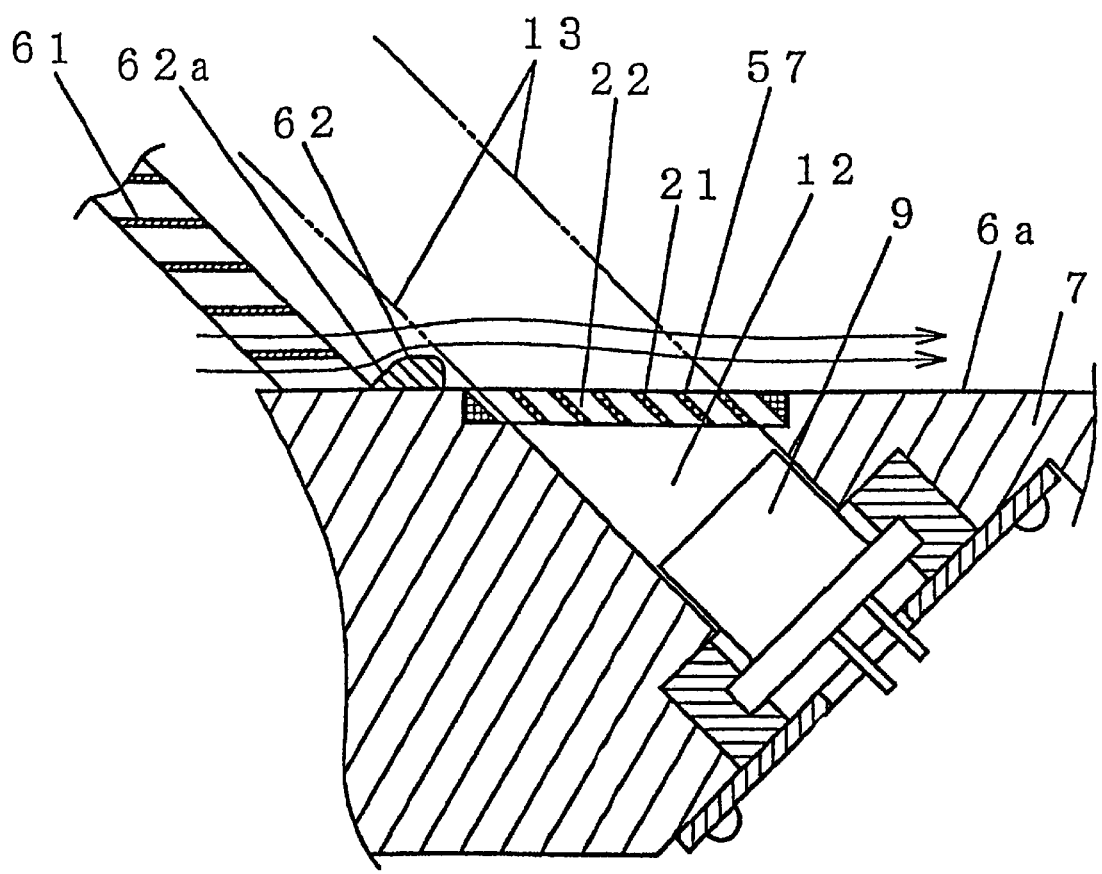
FIG. 31 is a cross-sectional view illustrating an alternative influent suppressor according to Embodiment 5 of the present invention.

FIG. 31 illustrates an alternative embodiment of the influent suppressor, which includes first influent suppressor 57 including the aperture hole sealing section 21 having the ultrasonically transmissive holes 22, and a second influent suppressor 62 including an influent suppressing section 62a provided on the side of a propagation path flow regulator 61 near the measurement flow path surface 6a. Thus, it is possible to further increase the effect of suppressing the flow of the fluid to be measured into the aperture hole, thereby further improving the measurement precision. Moreover, it is possible by the provision of the flow deflector to reduce the attachment of foreign matter such as dust onto the aperture hole sealing section. Thus, the aperture hole sealing section can be selected primarily in view of the ultrasonic transmissivity without so much concern about the clogging of the aperture hole sealing section, thereby increasing the freedom of the selection. Moreover, it is possible to further increase the ultrasonic transmissivity so as to reduce the power consumption, or to further increase the sensitivity so as to realize a device with a desirable measurement precision. Moreover, the second influent suppressor 62 can be processed into a shape suitable for the flow rate or the physical property values of the fluid to be measured as a part of the propagation path flow regulator 61, whereby it is easy to commonly use the measurement flow path 6 itself. Furthermore, the disturbance in the aperture hole is reduced by the multiplier effect of the first and second influent suppressors, and variations in the suppression of the fluid flow into the aperture hole is reduced by the integration of the propagation path flow regulator and the influent suppressor. Therefore, it is possible to increase the measurement precision and the reliability. Moreover, it is possible to provide a compact ultrasonic wave propagation path, thereby reducing the size of the measurement flow path.

Figure 32:
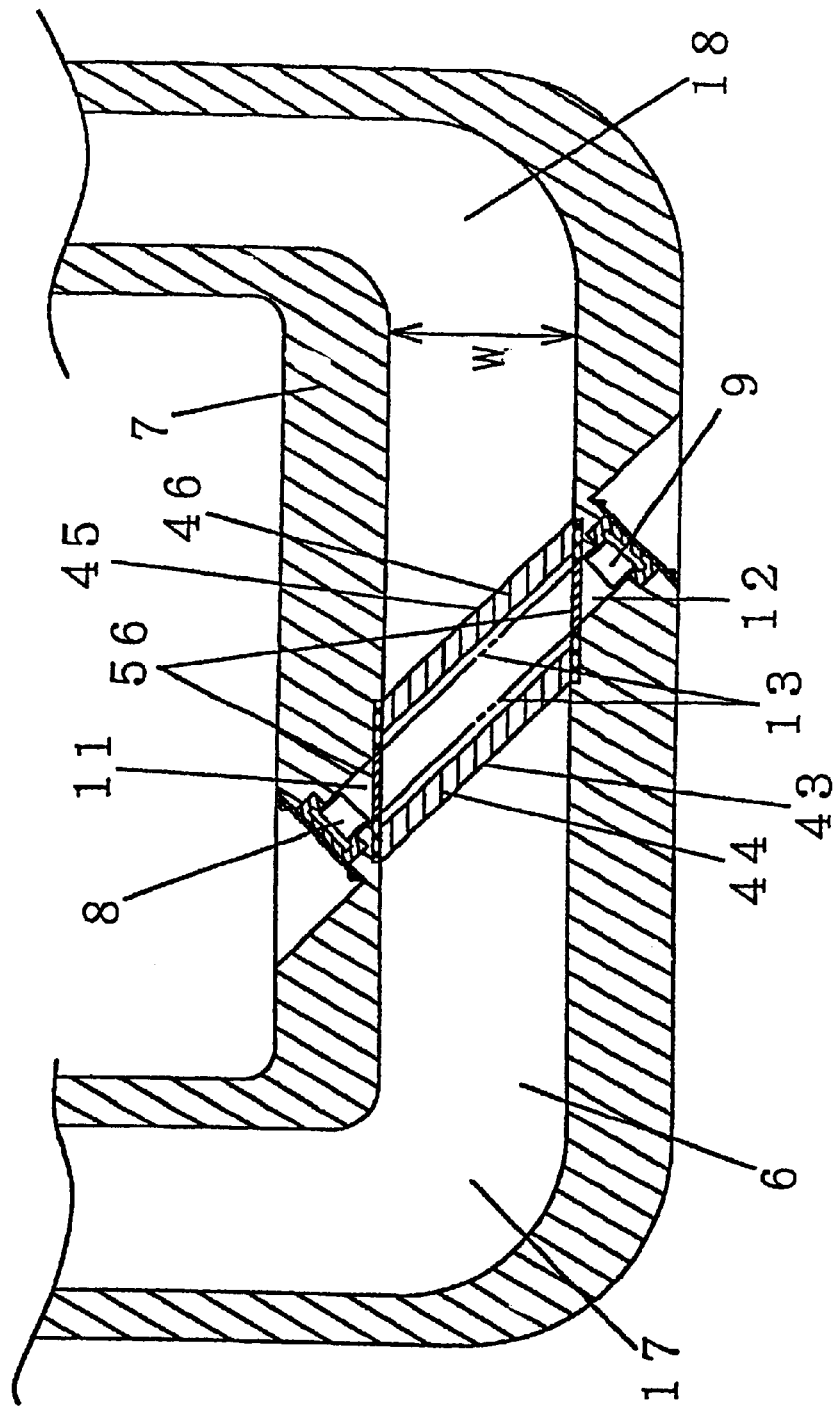
FIG. 32 is a cross-sectional view of an ultrasonic flow meter illustrating an alternative example of Embodiment 5 of the present invention.
Figure 33:
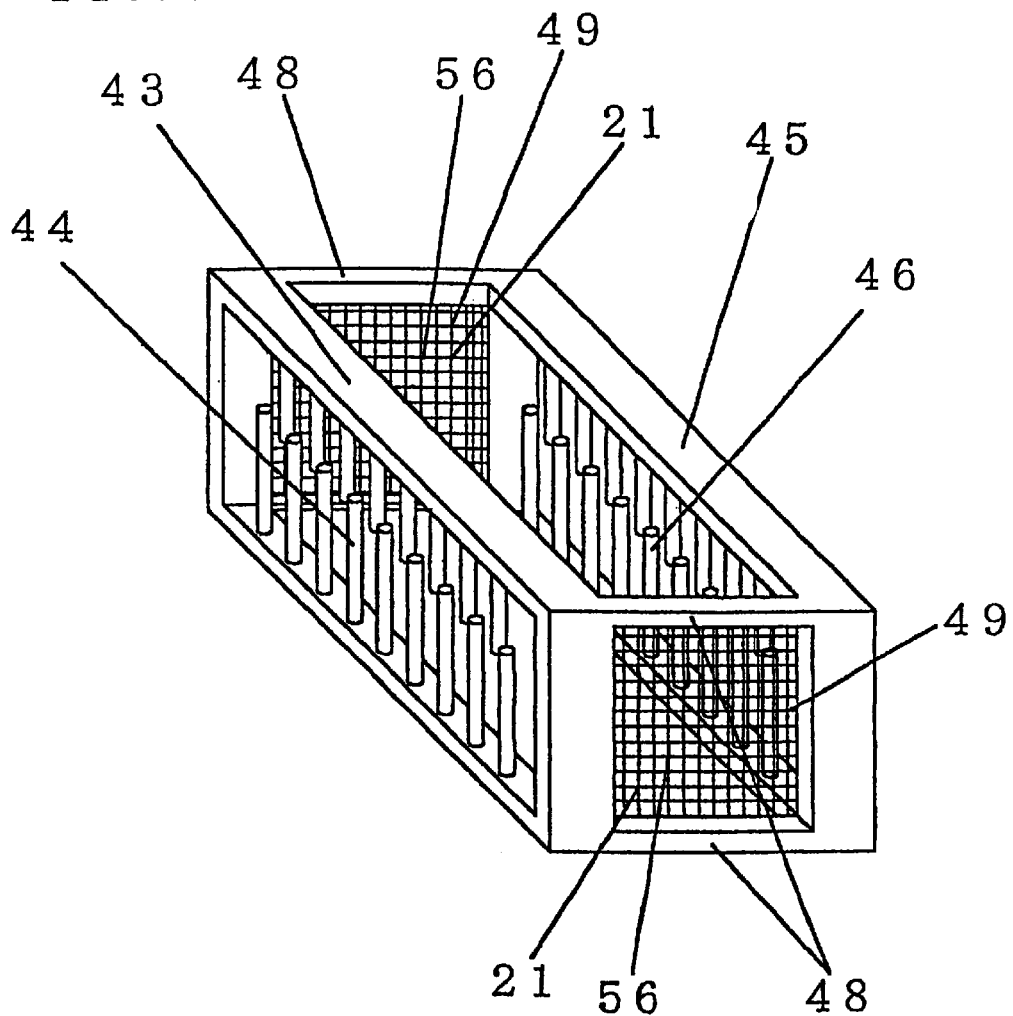
FIG. 33 is a perspective view illustrating an alternative example of influent suppressors and propagation path flow regulators according to Embodiment 5 of the present invention.

FIGS. 32 and 33 illustrate an alternative embodiment of the propagation path flow regulator and the influent suppressor. The ultrasonic wave propagation path 13 is surrounded by the upstream propagation path flow regulator 43 and the downstream propagation path flow regulator 45, and the influent suppressor 56 is further provided. As illustrated in FIG. 33, the propagation path flow regulators 43 and 45 are connected and integrated together by the connecting section 48. Moreover, the influent suppressor 56 is attached to the ultrasonic transmission window 49. The influent suppressor 56 is a mesh as the aperture hole sealing section 21 which covers the aperture holes 11 and 12.

In this structure, the flow in the ultrasonic wave propagation path 13 is equalized and stabilized due to the application of a back pressure by the downstream propagation path flow regulator 45. Moreover, it is possible to perform a stable flow rate measurement by reducing the influence on the flow condition in the ultrasonic wave propagation path 13 from a pulsation, or the like, which occurs due to the variation in the downstream piping configuration or the conditions under which the fluid to be measured is used.

Moreover, the influent suppressor 56 is provided for the aperture holes 11 and 12, so that it is possible to increase the upper limit value for the flow rate measurement.

Moreover, the propagation path flow regulators 43 and 45 are connected together, which is further integrated with the aperture hole sealing section 21 as the influent suppressor 56. Therefore, the positional relationship, e.g., the distance between these elements, is defined, whereby it is possible to reduce the variations in the flow condition in the ultrasonic wave propagation path 13 and to realize a stable measurement with little variation. Moreover, because not only the propagation path flow regulators 43 and 45 are integrated together but also the aperture hole sealing section 21 is further integrated with the propagation path flow regulators 43 and 45, it is possible to further increase the mechanical strength of the propagation path flow regulator. Thus, it is possible to prevent deformation over a long term use, thereby improving the durability and the reliability.

While the propagation path flow regulator 43 is arranged substantially parallel to the ultrasonic wave propagation path 13 along the width W direction of the measurement flow path 6, the propagation path flow regulator 43 may be arranged within the measurement flow path 6 having a circular transverse cross section along the height H direction as described above with reference to FIG. 16. Effects similar to those of the previous embodiments can be expected by arranging the propagation path flow regulator 43 in the measurement flow path 6 having a rectangular transverse cross section, as described above with reference to FIG. 22. Effects described above in the previous embodiments can similarly be expected in the case where the aperture hole is shaped to have an aperture shape which has a side along a direction substantially perpendicular to the direction of the flow through the measurement flow path, or where the non-uniform flow suppressor is provided in the introduction section on the upstream side of the measurement flow path or in the exit section on the downstream side of the measurement flow path.

As described above, in the ultrasonic flow meter according to Embodiment 5, the propagation path flow regulator 43 is provided immediately upstream of the ultrasonic wave propagation path 13 to extend along the entire area of the ultrasonic wave propagation path 13 from the upstream end to the downstream end thereof, thereby facilitating the disturbance of the flow across the entire area of the ultrasonic wave propagation path 13. Thus, the characteristics of the correction coefficient due to flow rate change can be stabilized over the entire flow rate measurement range, thereby preventing an increase in the error due to the correction coefficient and improving the measurement precision. Moreover, the influent suppressor can be provided to reduce the fluid flow into the aperture hole, thereby significantly reducing flow disturbances in the ultrasonic wave propagation path. Therefore, it is possible to increase the ultrasonic reception level and to increase the upper limit value for the flow rate measurement.

The influent suppressor may be a first influent suppressor provided for the downstream aperture hole. Thus, the influent suppressor is arranged for the downstream aperture hole around which a strong vortex easily occurs because the downstream aperture hole extends in a direction at an acute angle with respect to the flow. Therefore, it is possible to reduce the fluid flow into the aperture hole so as to efficiently reduce flow disturbances between the ultrasonic transducers, thereby increasing the upper limit value for the flow rate measurement.

The influent suppressor may be the first influent suppressor provided for the upstream aperture hole and the downstream aperture hole. Thus, disturbances in the aperture hole, which account for a major part of the total flow disturbance in the ultrasonic wave propagation path, can be reduced efficiently, either for a forward flow or a reverse flow along the measurement flow path, whereby it is possible to increase the measurement precision and the upper limit value for the flow rate measurement.

The influent suppressor may be the second influent suppressor which is obtained by providing the propagation path flow regulator with an influent suppressing section. Thus, by the integration of the propagation path flow regulator with the influent suppressor, it is possible to reduce variations in the suppression of the fluid flow into the aperture hole, thereby increasing the reliability and allowing for provision of a compact ultrasonic wave propagation path. Therefore, it is possible to reduce the size of the measurement flow path.

The first influent suppressor may be the aperture hole sealing section having at least one ultrasonically transmissive hole. Thus, by covering the aperture hole with the aperture hole sealing section, it is possible to further increase the effect of suppressing the flow of the fluid to be measured into the aperture hole, thereby reducing and stabilizing the flow in the aperture hole. Moreover, while the propagation of the ultrasonic wave can be ensured by the ultrasonically transmissive holes, the aperture hole sealing section can be provided only for the downstream aperture hole, in which case it is possible to further reduce the attenuation of the ultrasonic wave, thereby reducing the driving input for the ultrasonic transducers and the power consumption.

The first influent suppressor may include the aperture hole sealing section having the ultrasonically transmissive hole and the flow deflector provided in a vicinity of the aperture hole. Thus, it is possible to further increase the effect of suppressing the flow of the fluid to be measured into the aperture hole, thereby further improving the measurement precision. Moreover, it is possible by the provision of the flow deflector to reduce the attachment of foreign matter such as dust onto the aperture hole sealing section. Thus, the aperture hole sealing section can be selected primarily in view of the ultrasonic transmissivity without so much concern about the clogging of the aperture hole sealing section, thereby increasing the freedom of the selection. Moreover, it is possible to further increase the ultrasonic transmissivity so as to reduce the power consumption, or to further increase the sensitivity so as to realize a device with a desirable measurement precision.

The influent suppressor may include the first influent suppressor provided for the aperture hole and the second influent suppressor obtained by providing the propagation path flow regulator with an influent suppressing section. Thus, the disturbance in the aperture hole is reduced by the multiplier effect of the first and second influent suppressors, and variations in the suppression of the fluid flow into the aperture hole is reduced by the integration of the propagation path flow regulator and the influent suppressor. Therefore, it is possible to increase the measurement precision and the reliability. Moreover, it is possible to provide a compact ultrasonic wave propagation path, thereby reducing the size of the measurement flow path.

A case where the elbow sections 17 and 18 are bent in the width W direction of the measurement flow path 6 has been illustrated in the present embodiment. However, it is understood that the elbow sections 17 and 18 may alternatively be bent in the height H direction of the measurement flow path 6 or any other direction, and the elbow sections 17 and 18 may be bent at different angles.

EMBODIMENT 6

Figure 34:
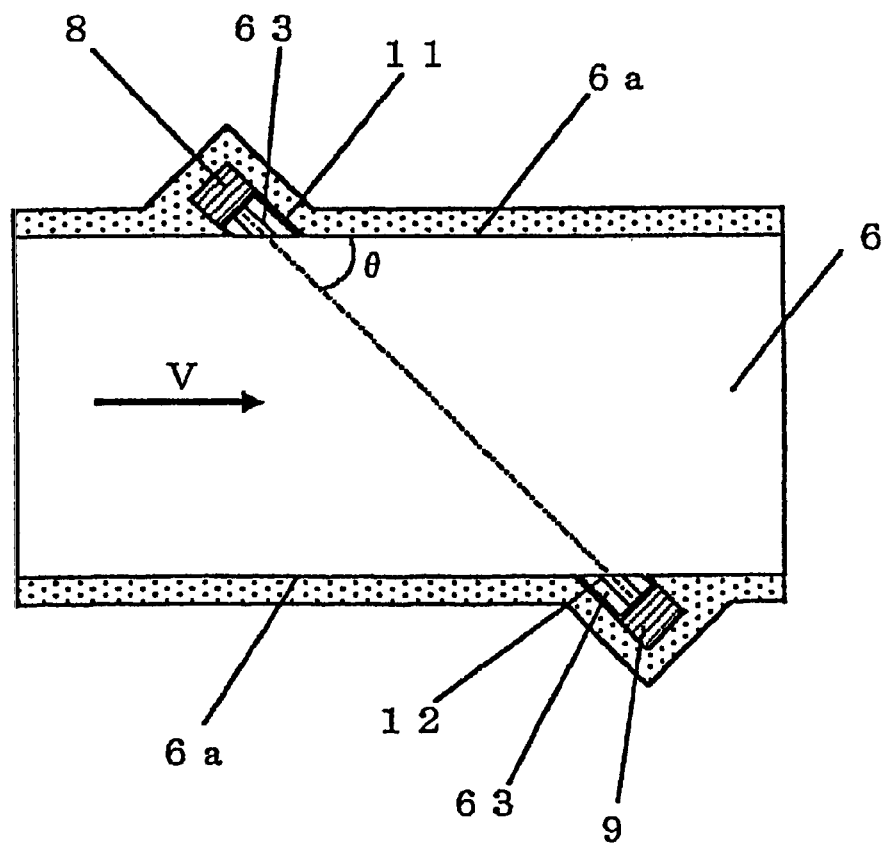
FIG. 34 is a cross-sectional view illustrating a flow path of an ultrasonic flow meter according to Embodiment 6 of the present invention.

FIG. 34 is a cross-sectional view illustrating a flow path of an ultrasonic flow meter according to Embodiment 6 of the present invention. In FIG. 34, like elements and functions to those of the embodiments shown in FIGS. 1 to 33 are provided with like reference numerals and will not be described in detail, and the parts which are different from the above embodiments will be focused on in the following description.

Figure 35:
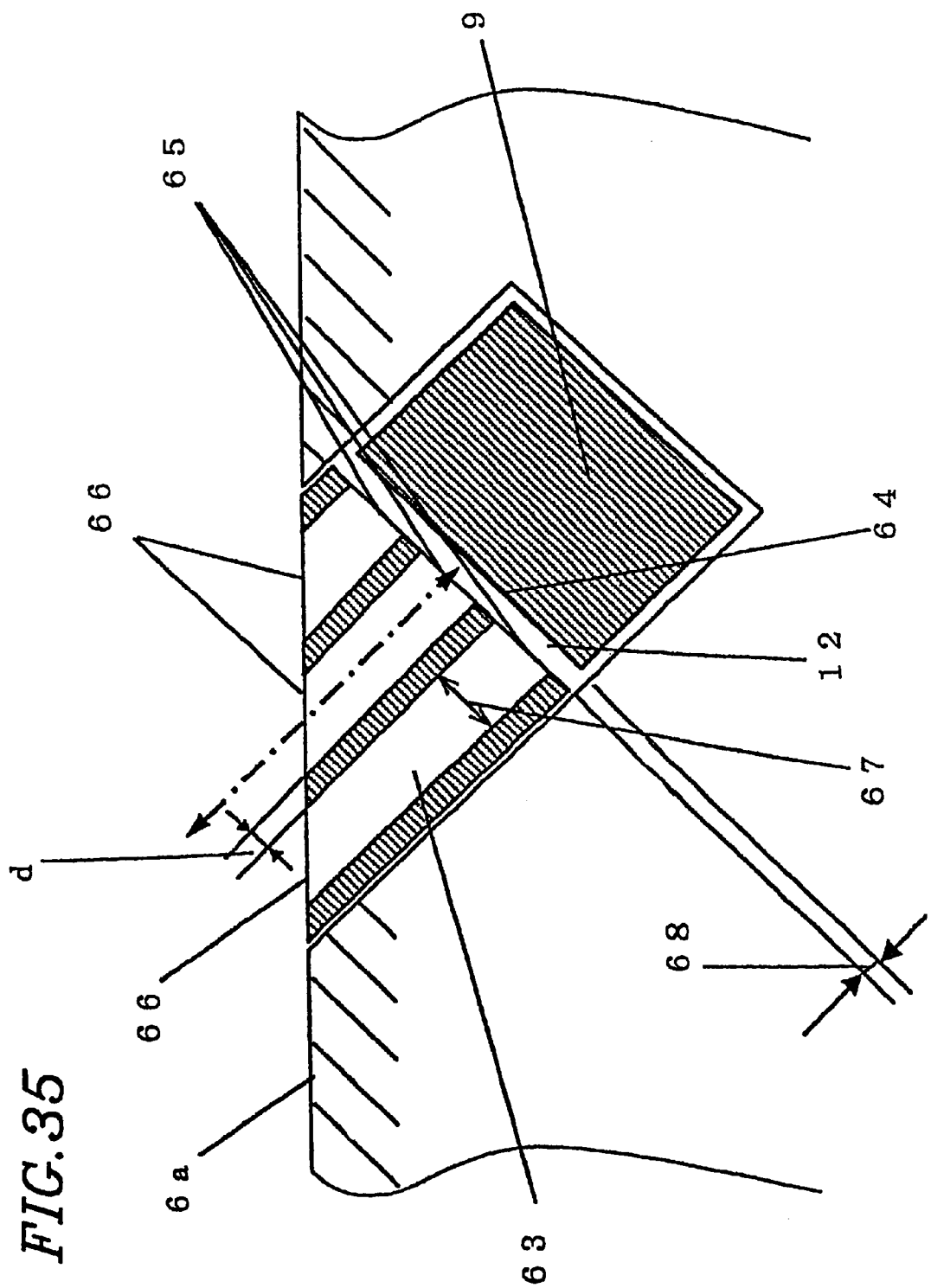
FIG. 35 is a cross-sectional view illustrating an aperture hole section according to Embodiment 6 of the present invention.

Reference numeral 63 denotes partitioned paths provided in each of the aperture holes 11 and 12. The partitioned paths 63 are obtained by partitioning each of the aperture holes 11 and 12 along the ultrasonic propagation direction. As illustrated in FIG. 35, the partitioned paths 63 have an inlet surface 65 extending along a vibration surface 64 of the ultrasonic transducer 9 and an outlet surface 66 extending along the measurement flow path surface 6a. One side 67 of the vertical section of the partitioned paths 63 has a dimension which is longer than the half wavelength $\lambda/2$ of the ultrasonic wave used for transmission/reception and is not an integral multiple of the half wavelength of the ultrasonic wave. A distance 68 between the partitioned paths 63 in the aperture hole 12 and the vibration surface of the ultrasonic transducer 9 is an integral multiple of the half wavelength $\lambda/2$ of the ultrasonic wave. The thickness of each partition of the partitioned paths 63 has a dimension which is shorter than the wavelength $\lambda$ of the ultrasonic wave. While the above description has been directed to the downstream ultrasonic transducer 9, the same applies to the upstream ultrasonic transducer 8.

Figure 36:
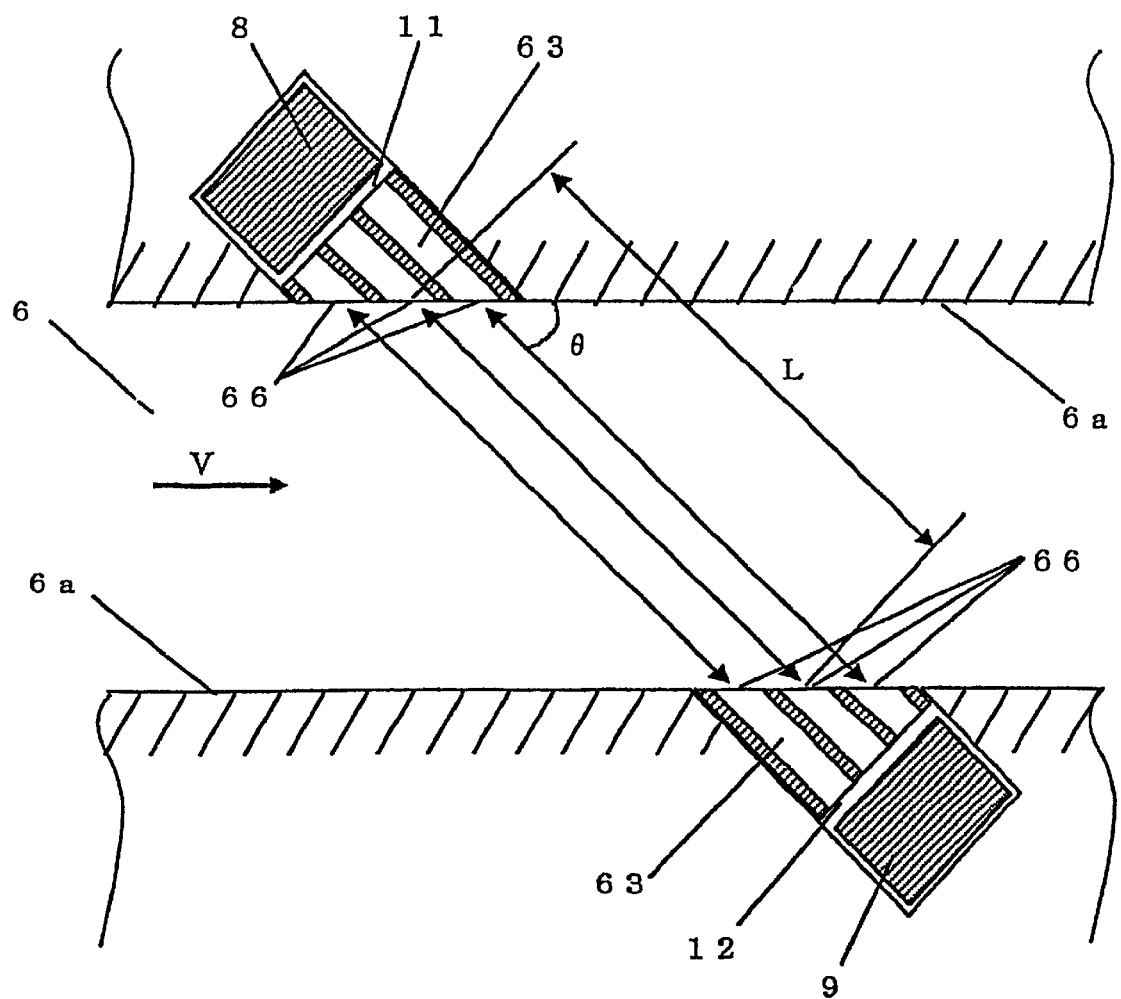
FIG. 36 is a cross-sectional view illustrating the positional relationship between ultrasonic transducers opposing each other according to Embodiment 6 of the present invention.

As illustrated in FIG. 36, each of the partitioned paths 63 of the aperture hole 11 provided along the measurement flow path surface 6a which opposes the ultrasonic transducer 9 is arranged to extend colinearly with a corresponding one of the partitioned paths 63 of the other aperture hole 12.

Next, a common method for the flow rate measurement will be described. As described above, the ultrasonic flow meter obtains the flow velocity V as shown in the following expression based on the difference between the inverse of the ultrasonic propagation time T1 and the inverse of the ultrasonic propagation time T2, and converts the flow velocity V into the flow rate by multiplying the flow velocity V by the cross-sectional area of the flow path.

Thus, the flow velocity V is obtained as shown in following expression.

$$V=[L/(2\cos\theta)]\times[(1/T1)-(1/T2)]$$

The ultrasonic propagation distance L, which is influenced by the flow, varies depending on whether the flow enters the aperture hole. Specifically, a flow may or may not enter the aperture hole depending upon the flow velocity or the presence/absence of a pulsating flow, thereby varying the effective propagation distance L and causing an error in the measured flow rate.

In the structure of the present invention, the inside of each aperture hole provided in the measurement flow path is divided into smaller sections. Thus, a vortex is less likely to occur and it is possible to reduce the flow of the fluid into the aperture hole by the function of the partitioned paths as an influent suppressor. Therefore, it is possible to maintain the effective propagation distance L constant and to properly measure the flow rate even when the flow velocity changes or a pulsation occurs. Moreover, since the ultrasonic wave propagates through the fluid to be measured within the partitioned paths, the decrease in the sensitivity is less than that which would result when using a bulk element. Furthermore, due to the partitioning of the paths, it is possible to maintain the rectilinear property of the ultrasonic waves and to realize a desirable transmission/reception thereof. Moreover, since the ultrasonic waves can enter the partitioned paths at a right angle and thus travel therethrough in a straight path, an ultrasonic wave propagation path with no reflection and little attenuation is provided. Furthermore, since the outlet is a flat surface with respect to the measurement flow path surface, there is no disturbance in the flow in the periphery layer along the measurement flow path surface. Moreover, due to the alignment of the outlet surface as the radiation surface, it is possible to radiate the ultrasonic wave efficiently. The transmission surface of one of the pair of partitioned paths is aligned with the reception surface of the other one of the partitioned paths along the traveling direction of the ultrasonic wave, whereby it is possible to eliminate the reflective attenuation thereof due to the partition plate in the partitioned paths of the opposing aperture hole.

The side 67 of the vertical section of each of the partitioned paths is longer than the half wavelength. Thus, the viscosity influence from the partition surface is reduced, whereby it is possible to provide partitioned paths with little attenuation. Moreover, it is possible to set the length of the side 67 not to be an integral multiple of the wavelength so as to suppress resonance in the lateral direction, thereby realizing an efficient propagation.

The distance 68 between the ultrasonic transducer and the inlet surface of the partitioned paths can be set such that a resonance is provided at the half wavelength, whereby it is possible to provide an efficient radiation. The thickness d of each partition of the partitioned paths can be set to be shorter than the wavelength so as to prevent the reflection of the ultrasonic wave as it enters the partitioned paths, thereby providing an efficient propagation of the ultrasonic wave and realizing a desirable transmission/reception.

Figure 37:
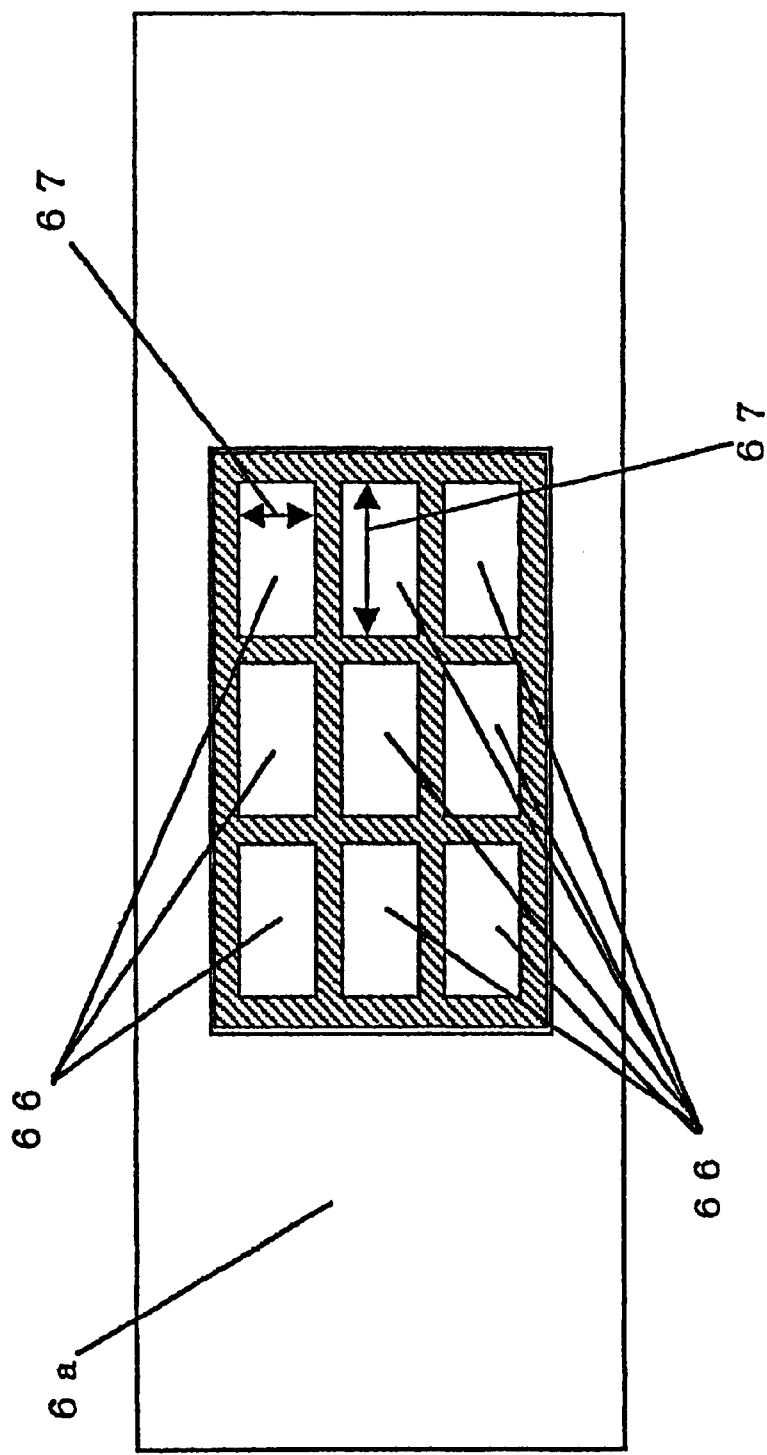
FIG. 37 is a front view illustrating outlet surfaces of first partitioned paths according to Embodiment 6 of the present invention.
Figure 38:
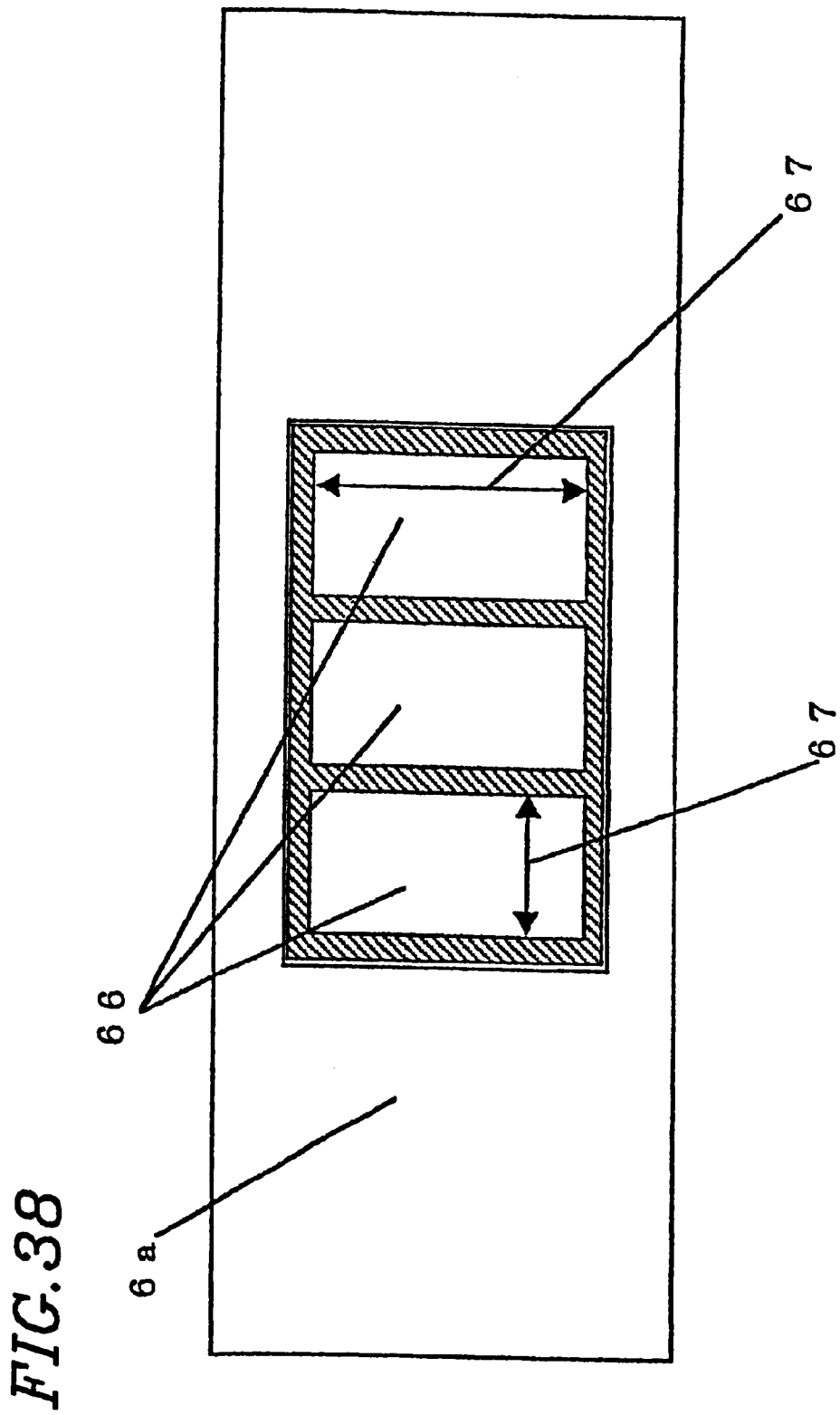
FIG. 38 is a front view illustrating outlet surfaces of second partitioned paths according to Embodiment 6 of the present invention.
Figure 39:
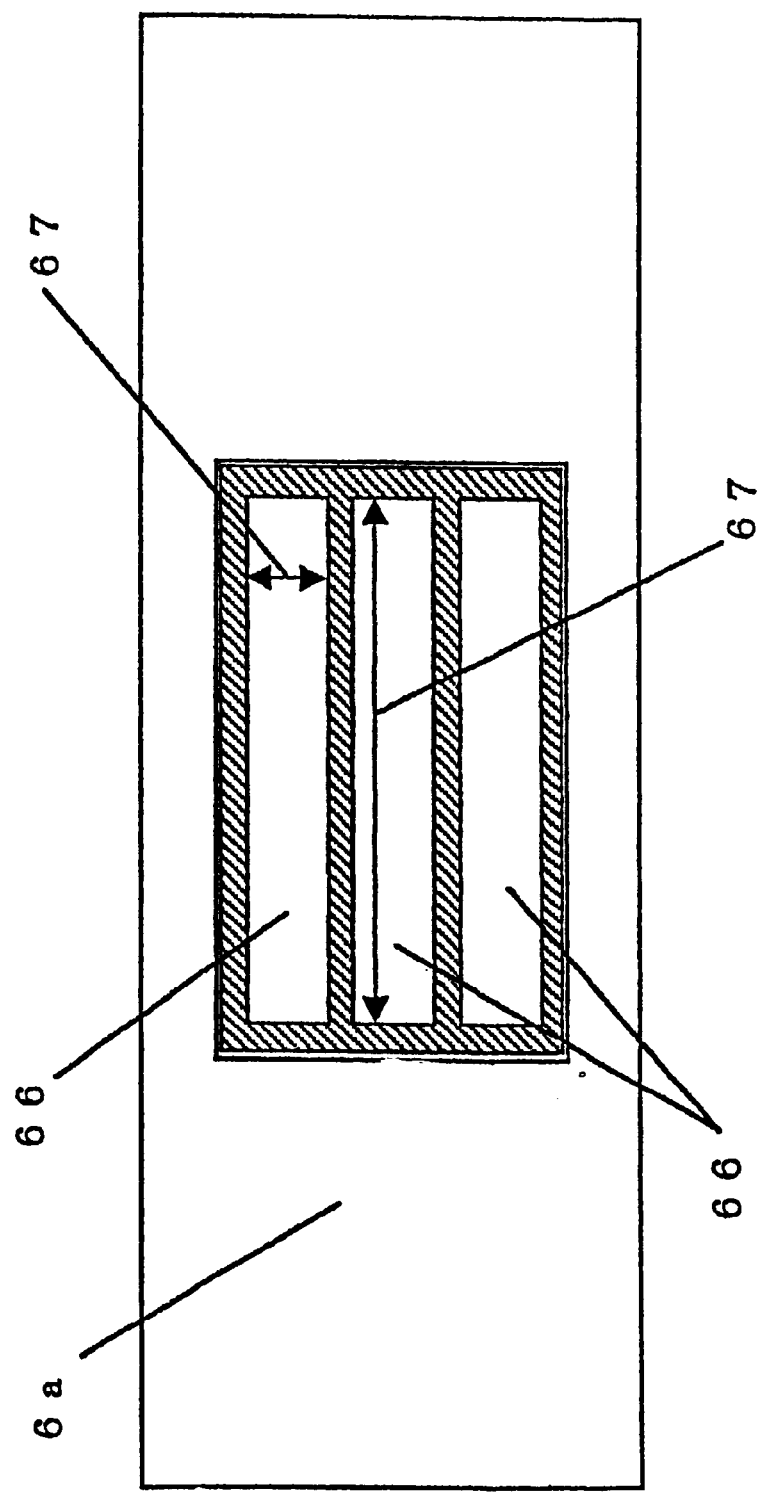
FIG. 39 is a front view illustrating outlet surfaces of third partitioned paths according to Embodiment 6 of the present invention.
Figure 40:
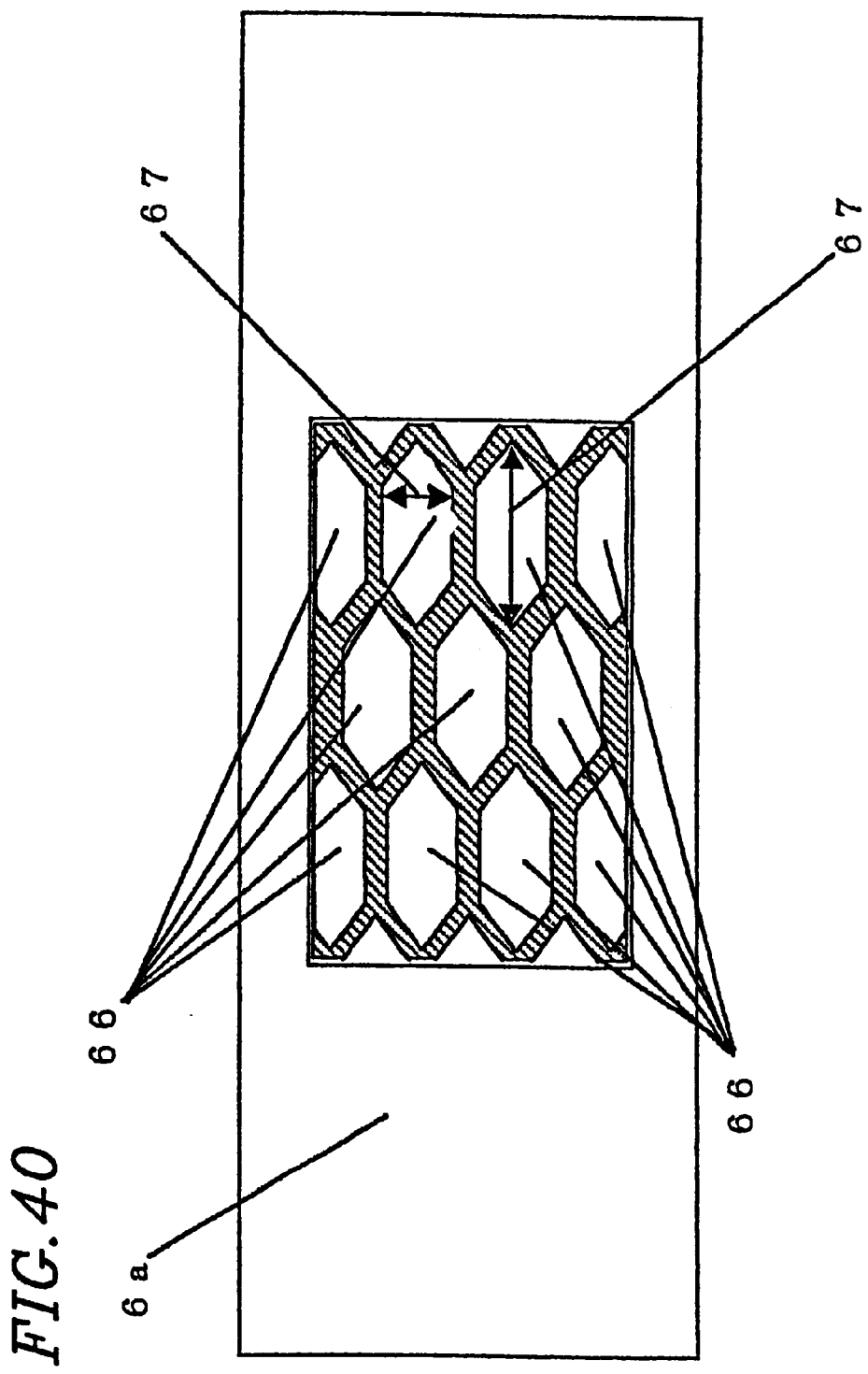
FIG. 40 is a front view illustrating an outlet surface of partitioned paths according to Embodiment 6 of the present invention.

Similar effects can be provided when employing a rectangular cross section for the partitioned paths as illustrated in FIGS. 37, 38 and 39. When employing a honeycomb partitioned paths as illustrated in FIG. 40, the honeycomb lattice material can easily be fixed by fitting it into the aperture hole. Moreover, the thickness d of the partition can be sufficiently smaller than the wavelength of the ultrasonic wave, and it is possible to divide each aperture hole in the vertical and lateral directions. Furthermore, the ultrasonic wave propagates efficiently, thereby realizing a desirable transmission/reception.

One of the partitioned paths has its opening at the center of the aperture hole. Thus, since there is an opening at the center of the aperture hole, the aperture hole is aligned with the central axis of the ultrasonic transducer, thereby efficiently effecting the propagation in the center area where the output of the ultrasonic wave is high, thereby improving the signal transmission by the ultrasonic transmission/reception.

When employing a polygonal shape such that the opposing surfaces of the partitioned paths are not parallel to each other, the propagation along a direction perpendicular to the travelling direction of the ultrasonic wave is diffused so that a resonance is unlikely to occur, thereby providing an effect that the ultrasonic wave propagates efficiently. Particularly, when a honeycomb lattice material is used for the partitioned paths with an opening at the center of the partitioned paths, it is possible to make more efficient the signal transmission by the ultrasonic transmission/reception due to the above-described reduction in the resonance phenomenon, the effect provided by the sufficiently small thickness d of the partition, and the efficient propagation of the ultrasonic wave in the center area where the output of the ultrasonic wave is high.

Moreover, as illustrated in FIG. 41, each of the partitioned paths may include a communication section 69 at a certain point along its length for communicating the partitioned path with an adjacent one of the partitioned paths. Thus, the total area of the partitions is reduced, and it is possible to minimize the attenuation by the wall surfaces. The size of the communication section 69 may also be greater than the wavelength of the ultrasonic wave so that the partitioned paths can easily be connected to each other. By providing the connection section and the partition section alternately, it is possible to obtain the effect of partition and the effect of reducing the attenuation.

Figure 42:
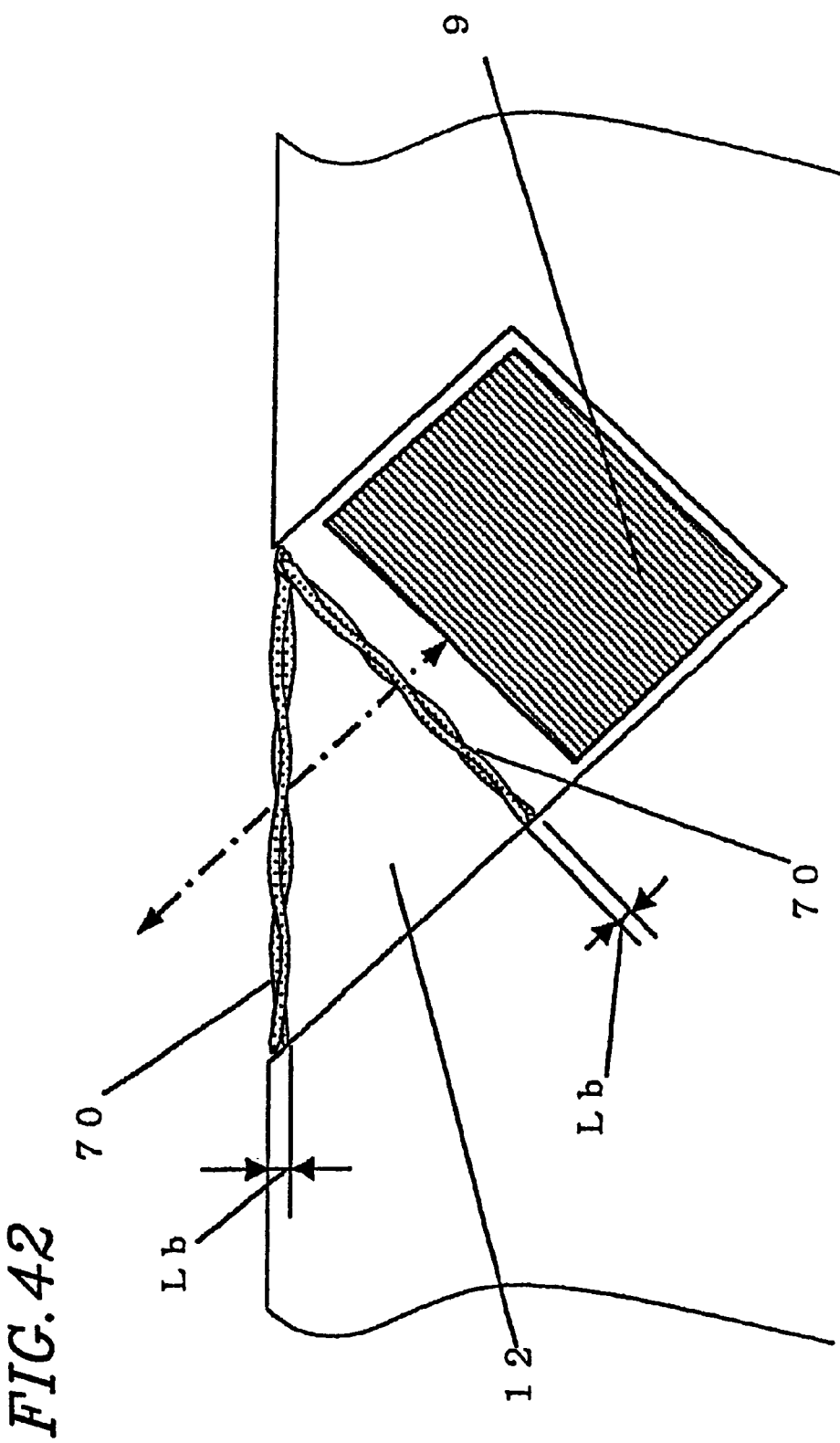
FIG. 42 is a cross-sectional view illustrating an alternative example of the partitioned paths according to Embodiment 6 of the present invention.
Figure 42:
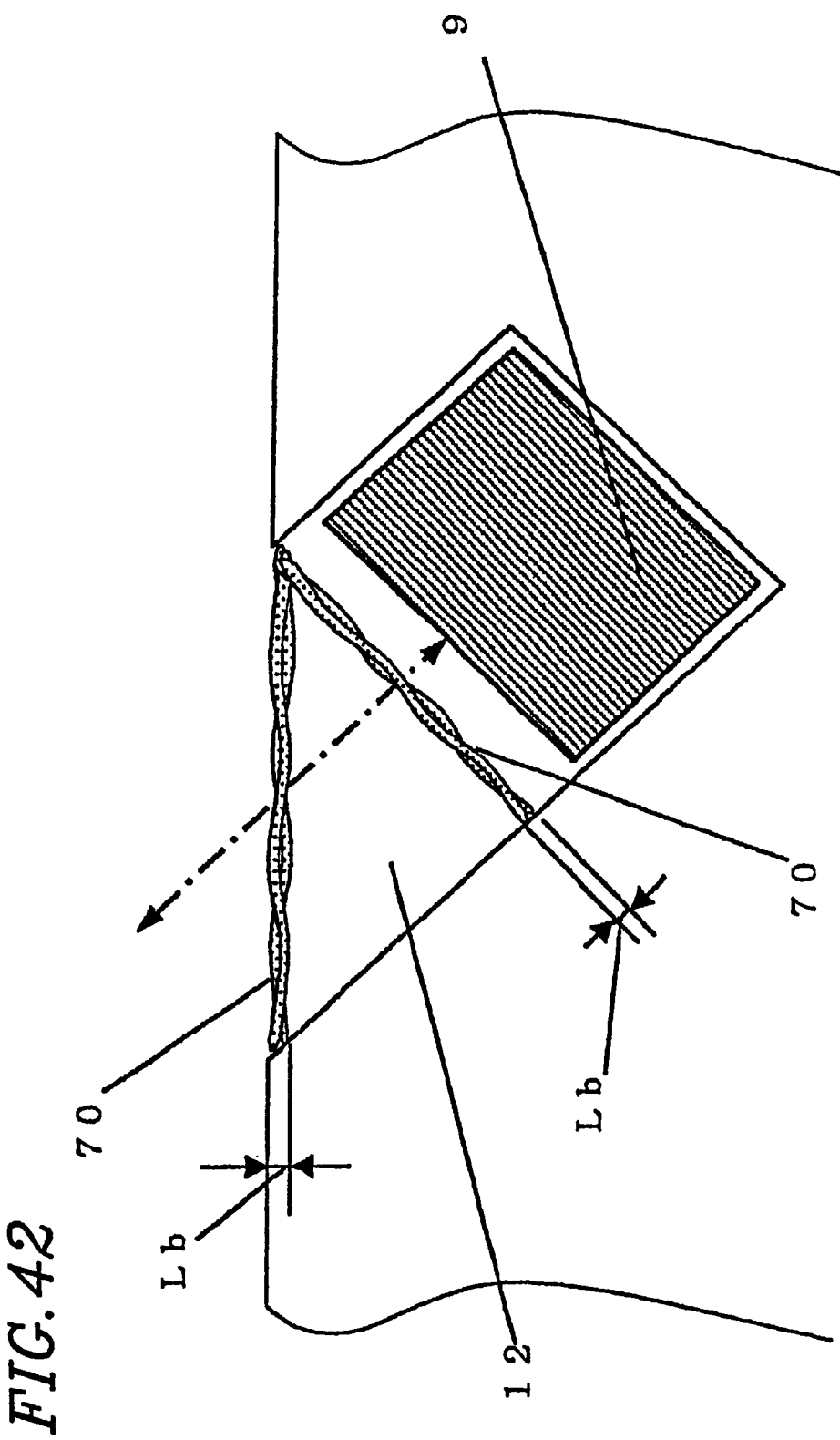
Figure 43:
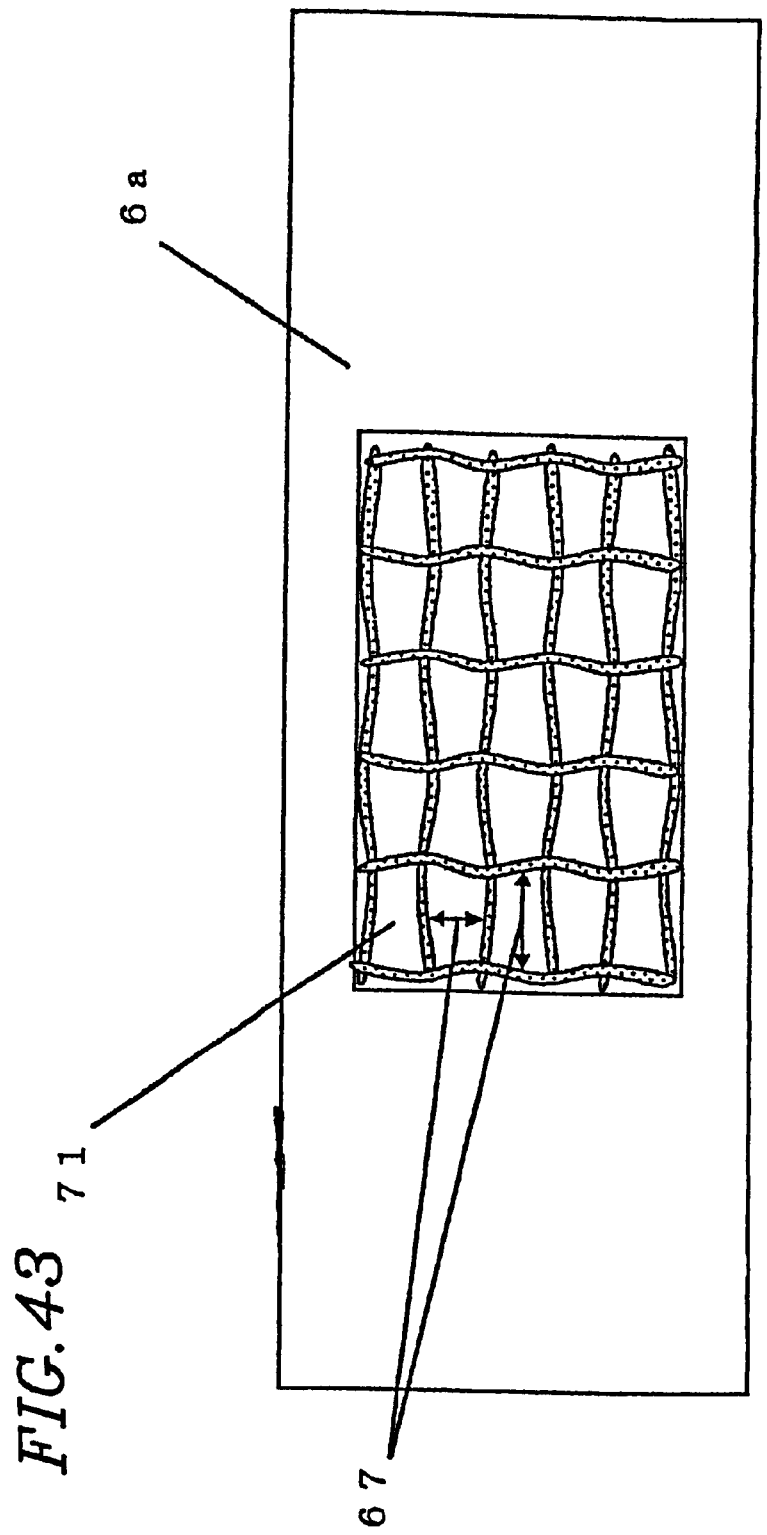
FIG. 43 is a front view illustrating an outlet surface of the partitioned paths shown in FIG. 42.
Figure 44:
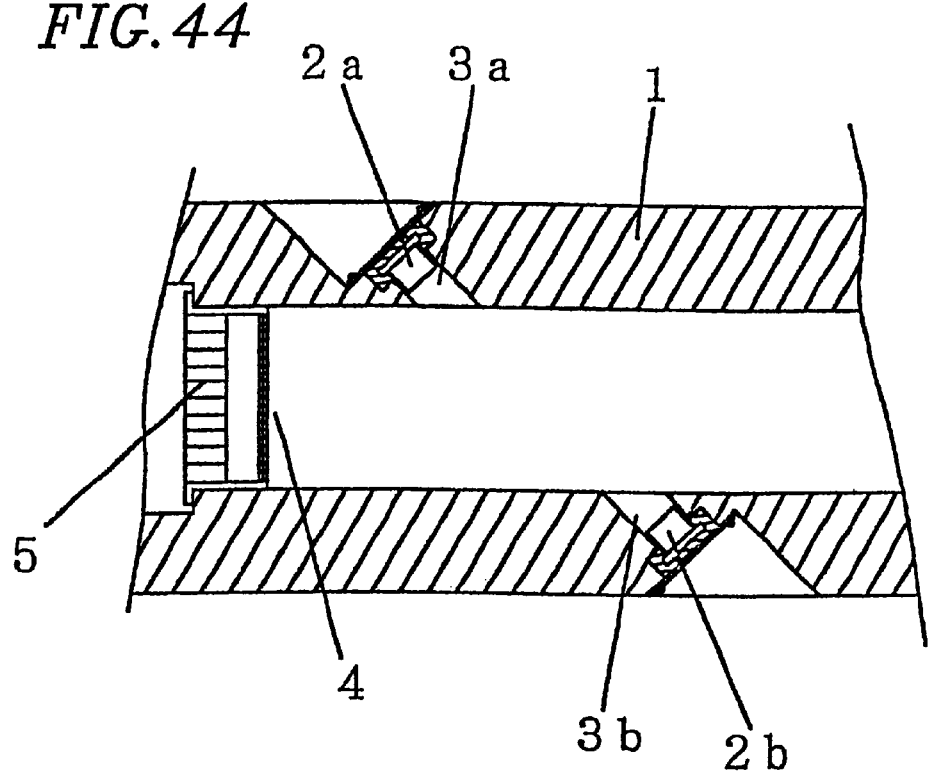
FIG. 44 is a diagram illustrating a structure of a conventional ultrasonic flow meter.

Next, an alternative embodiment of the partitioned paths will be described with reference to FIGS. 42 and 43. FIG. 42 is a cross-sectional view illustrating partitioned paths 70 of the aperture hole 12. The difference from the previous embodiments is that the partitioned paths are obtained by providing a wire mesh as a mesh material on the ultrasonic transducer side along a direction perpendicular to the ultrasonic propagation direction and on the flow path side along the flow path wall surface, whereby the path length Lb of th partitioned paths is shorter than the wavelength λ of the ultrasonic wave used for transmission/reception. FIG. 43 illustrates an opening 71.

By employing a path length which is shorter than the wavelength of the ultrasonic wave, each partitioned path can serve as a propagation path with little attenuation. Moreover, the aperture space in each aperture hole provided along the measurement flow path surface is divided into smaller portions so that a vortex is unlikely occur and it is possible to reduce the flow of the fluid into the aperture hole. Therefore, even when the flow velocity changes or a pulsation occurs, the flow rate can be properly measured. Moreover, since the ultrasonic wave propagates through the air in the partitioned paths, the decrease in the sensitivity is less than that which would result when using a bulk element. Furthermore, by the division of the path, it is possible to maintain the rectilinear property of the ultrasonic waves and to realize a desirable transmission/reception thereof.

The side 67 of the vertical cross section of the partitioned paths is longer than the half wavelength, it is possible to provide a propagation path which is less susceptible to the viscosity of the fluid flowing along the partition surface and thus has little attenuation. Moreover, by setting the length of the side 67 not to be an integral multiple of the wavelength so as to suppress resonance in the lateral direction, thereby realizing an efficient propagation.

By employing the partitioned paths for a measurement flow path which is provided with an influent suppressor such as the first influent suppressor or the second influent suppressor, it is possible to further reduce flow disturbances in the aperture hole. Thus, in addition to the effects described above, it is possible to improve the upper limit value for the measurement.

INDUSTRIAL APPLICABILITY

As is apparent from the above description, the ultrasonic flow meter of the present invention provides the following effects.

The ultrasonic flow meter of the present invention includes: a first influent suppressor provided in a vicinity of at least the downstream aperture hole for reducing inflow of the fluid to be measured into the aperture hole; and a second influent suppressor provided on an upstream side of the measurement flow path with respect to the aperture holes for reducing the inflow of the fluid to be measured into the aperture holes, wherein the first influent suppressor provided for the downstream aperture hole includes an aperture hole sealing section having at least one ultrasonically transmissive hole. Thus, it is possible to stabilize the flow between the ultrasonic transducers so as to enhance the ultrasonic reception level, thereby increasing the measurement precision and the upper limit value for the flow rate measurement, and to reduce the driving input for the ultrasonic transducers by the enhancement of the ultrasonic reception level and by improving the attenuation of the ultrasonic wave by providing the influent suppressor.

Alternatively, the ultrasonic flow meter of the present invention includes a first influent suppressor and a second influent suppressor for reducing inflow of the fluid to be measured into the aperture holes for both a forward flow and a reverse flow of the fluid to be measured, wherein: the first influent suppressor provided for the aperture hole which is on the downstream side when the fluid flows in a forward direction is an aperture hole sealing section having at least one ultrasonically transmissive hole; and the second influent suppressor is provided on both an inlet side and an outlet side of the measurement flow path. Thus, even when the flow has a pulsation and causes a momentary reverse flow, it is possible to reduce, as in the case of a forward flow, the inflow of the fluid to be measured into the aperture hole, and to significantly reduce flow disturbances between the ultrasonic transducers, thereby increasing the measurement precision and the upper limit value for the flow rate measurement.

Alternatively, the ultrasonic flow meter of the present invention includes a propagation path flow regulator provided along an ultrasonic wave propagation path between the upstream ultrasonic transducer and the downstream ultrasonic transducer and having a regulation section exposed to the flow. Thus, the regulation section of the propagation path flow regulator arranged immediately upstream of the ultrasonic wave propagation path facilitates the disturbance of the flow across the entire zone from the upstream side to the downstream side of the ultrasonic wave propagation path. Therefore, in the ultrasonic wave propagation path, the flow condition is equally disturbed across the entire area of the ultrasonic wave propagation path along the width direction from an area near the upstream aperture hole to an area near the downstream aperture hole irrespective of the flow rate, whereby it is possible to reduce the changes in the correction coefficient across the entire flow rate measurement zone, thereby preventing increases in the error due to the correction coefficient and increasing the measurement precision. Thus, the measurement precision is maintained even when the Reynolds number changes due to the change in the kinematic viscosity of the fluid, whereby it is possible to realize a measurement device which is resistant against changes in the temperature of the fluid or changes in the composition of the fluid, thereby increasing the practicability of the device.

Alternatively, the ultrasonic flow meter of the present invention includes: a propagation path flow regulator provided along an ultrasonic wave propagation path between the upstream ultrasonic transducer and the downstream ultrasonic transducer and having a regulation section exposed to the flow: and an influent suppressor for reducing inflow of the fluid to be measured into the aperture hole. Thus, the regulation section of the propagation path flow regulator arranged immediately upstream of the ultrasonic wave propagation path facilitates the disturbance of the flow across the entire zone from the upstream side to the downstream side of the ultrasonic wave propagation path. Therefore, in the ultrasonic wave propagation path, the flow condition is equally disturbed across the entire area of the ultrasonic wave propagation path along the width direction from an area near the upstream aperture hole to an area near the downstream aperture hole irrespective of the flow rate, whereby it is possible to reduce the changes in the correction coefficient across the entire flow rate measurement zone, thereby preventing increases in the error due to the correction coefficient and increasing the measurement precision. Moreover, it is possible to arrange the influent suppressor for the aperture hole which opens into the measurement flow path so as to reduce the fluid flow into the aperture hole, thereby significantly reducing flow disturbances along the ultrasonic wave propagation path between the ultrasonic transducers and increasing the upper limit value for the flow rate measurement.

Alternatively, the first influent suppressor provided for the upstream aperture hole is a flow deflector. Thus, it is possible to eliminate the propagation losses of the ultrasonic waves through the ultrasonically transmissive hole for the upstream aperture hole, thereby reducing the driving input for the ultrasonic transducers, and to reduce the flow of the fluid into the upstream aperture hole, thereby stabilizing flow disturbances along the ultrasonic wave propagation path and improving the measurement precision.

Alternatively, the first influent suppressor provided for the upstream aperture hole is an aperture hole sealing section having at least one ultrasonically transmissive hole. Thus, it is possible to significantly reduce the inflow of the fluid into the upstream and downstream aperture holes, thereby increasing the upper limit value for the flow rate measurement and increasing the measurement precision even for a flow which is accompanied by a reverse flow. Moreover, it is possible to realize an ultrasonic transmission/reception with desirable S/N characteristics by the significant reduction in flow disturbances due to the aperture hole. Thus, it is possible to reduce the transmission output and the driving input, thereby reducing the power consumption.

Alternatively, an aperture ratio of the aperture hole sealing section provided for the upstream aperture hole is greater than an aperture ratio of the aperture hole sealing section provided for the downstream aperture hole. Thus, propagation losses of the ultrasonic waves can be reduced, whereby it is possible to improve the upper limit value for the flow rate measurement and the measurement precision for a reverse flow, and to reduce the power consumption by reducing the driving input for the ultrasonic transducers.

Alternatively, the propagation path flow regulator is arranged on the upstream side and the downstream side with respect to the ultrasonic wave propagation path. Thus, the ultrasonic wave propagation path is surrounded by the upstream and downstream propagation path flow regulators, whereby it is possible to equalize the disturbance condition from the upstream side and the downstream side of the ultrasonic wave propagation path, thereby further stabilizing the correction coefficient and further improving the measurement precision. Moreover, the influence of the flow condition on the downstream side along the measurement flow path is reduced by the downstream propagation path flow regulator. Thus, it is possible to realize a stable measurement irrespective of the piping condition on the downstream side of the measurement device, thereby improving the freedom in the installment of the measurement device. Moreover, the same effect is obtained both for a forward flow and a reverse flow along the measurement flow path, so that it is possible to stabilize the correction coefficient even for a pulsating flow, thereby increasing the measurement precision.

Alternatively, the propagation path flow regulators arranged on the upstream side and the downstream side with respect to the ultrasonic wave propagation path are integrated together via a connector section. Thus, it is possible to prevent and stabilize a shift in the distance between the propagation path flow regulators or a positional shift between the upstream regulation section and the downstream regulation section, thereby realizing a measurement device with reduced variation. Moreover, the connecting section reinforces the propagation path flow regulators, whereby it is possible to reduce the size or the thickness of the regulation section. Therefore, it is possible to equalize the flow condition in the ultrasonic wave propagation path or to reduce the loss of pressure in the measurement flow path.

Alternatively, the propagation path flow regulators arranged on the upstream side and the downstream side with respect to the ultrasonic wave propagation path and the influent suppressor are integrated together. Thus, it is possible to define the positional relationship, e.g., distance, between the upstream and downstream propagation path flow regulators and the influent suppressor, thereby stabilizing the flow condition. Therefore, it is possible to reduce the variations in the flow condition in the ultrasonic wave propagation path and to realize a stable measurement with little variation. It is possible by such integration to further increase the mechanical strength of the propagation path flow regulator, thereby preventing its deformation over a long term use and thus improving its durability and reliability.

Alternatively, the influent suppressor is a first influent suppressor provided for the downstream aperture hole. Thus, the influent suppressor is arranged for the downstream aperture hole around which a strong vortex easily occurs because the downstream aperture hole extends in a direction at an acute angle with respect to the flow. Therefore, it is possible to reduce the fluid flow into the aperture hole so as to efficiently reduce flow disturbances between the ultrasonic transducers, thereby increasing the upper limit value for the flow rate measurement.

Alternatively, the influent suppressor is a first influent suppressor provided for the upstream aperture hole and the downstream aperture hole. Thus, disturbances in the aperture hole, which account for a major part of the total flow disturbance in the ultrasonic wave propagation path, can be reduced efficiently, whereby it is possible to increase the measurement precision and the upper limit value for the flow rate measurement.

Alternatively, the influent suppressor is a second influent suppressor which is obtained by providing the propagation path flow regulator arranged along the ultrasonic wave propagation path with an influent suppressing section. Thus, by the integration of the propagation path flow regulator with the influent suppressor, it is possible to reduce variations in the suppression of the fluid flow into the aperture hole, thereby increasing the reliability and allowing for provision of a compact ultrasonic wave propagation path. Therefore, it is possible to reduce the size of the measurement flow path.

Alternatively, the influent suppressor includes a first influent suppressor provided for the aperture hole and a second influent suppressor obtained by providing the propagation path flow regulator with an influent suppressing section. Thus, the disturbance in the aperture hole is reduced by the multiplier effect of the first and second influent suppressors, and variations in the suppression of the fluid flow into the aperture hole is reduced by the integration of the propagation path flow regulator and the influent suppressor. Therefore, it is possible to increase the measurement precision and the reliability. Moreover, it is possible to provide a compact ultrasonic wave propagation path, thereby reducing the size of the measurement flow path.

Alternatively, the first influent suppressor is an aperture hole sealing section having at least one ultrasonically transmissive hole. Thus, by covering the aperture hole with the aperture hole sealing section, it is possible to further increase the effect of suppressing the flow of the fluid to be measured into the aperture hole, thereby reducing and stabilizing the flow in the aperture hole.

Alternatively, the first influent suppressor includes an aperture hole sealing section having at least one ultrasonically transmissive hole and a flow deflector provided in a vicinity of the aperture hole. Thus, it is possible to further increase the effect of suppressing the flow of the fluid to be measured into the aperture hole, thereby further improving the measurement precision. Moreover, it is possible by the provision of the flow deflector to reduce the attachment of foreign matter such as dust onto the aperture hole sealing section. Thus, the aperture hole sealing section can be selected primarily in view of the ultrasonic transmissivity without so much concern about the clogging of the aperture hole sealing section, thereby increasing the freedom of the selection. Moreover, it is possible to further increase the ultrasonic transmissivity so as to reduce the power consumption, or to further increase the sensitivity so as to realize a device with a desirable measurement precision.

Alternatively, an aperture ratio of the aperture hole sealing section provided for the upstream aperture hole is greater than an aperture ratio of the aperture hole sealing section provided for the downstream aperture hole. Thus, propagation losses of the ultrasonic waves can be reduced, whereby it is possible to improve the upper limit value for the flow rate measurement and the measurement precision for a reverse flow, and to reduce the power consumption by reducing the driving input for the ultrasonic transducers.

Alternatively, the aperture hole sealing section is a meshed member of an inclined mesh pattern having an inclination with respect to a horizontal direction. Thus, the pattern is inclined with respect to the horizontal direction, so that it is possible to facilitate settling of minute particles such as dust attached onto the inclined mesh portions, thereby reducing the amount of such minute particles deposited and thus preventing clogging of the meshed member. Therefore, it is possible to ensure propagation of the ultrasonic wave therethrough and to maintain a stable measurement precision over a long time, thereby improving the durability and reliability.

Alternatively, the flow deflector is provided on the upstream side and the downstream side of the aperture hole. Thus, both for a forward flow and a reverse flow along the measurement flow path, it is possible to further improve the measurement precision, to suppress the flow into the aperture hole, and to prevent foreign matter from entering the aperture hole. Therefore, even for a pulsating flow which is accompanied by a reverse flow, it is possible to maintain a stable measurement precision over a long time, thereby improving the durability and reliability.

Alternatively, a distance between the propagation path flow regulator and the ultrasonic propagation path is varied depending on a type of the fluid to be measured. Thus, it is possible to commonly use the measurement flow path irrespective of the type of the fluid to be measured by changing only the propagation path flow regulator, thereby improving the convenience, and to maintain a stable measurement precision irrespective of the fluid to be measured. Moreover, since the measurement flow path can be commonly used, it is possible to reduce the cost.

Alternatively, the regulation section of the propagation path flow regulator is provided in the form of a meshed member. Thus, it is possible to reduce the installment space of the propagation path flow regulator with respect to the flow direction, thereby reducing the size of the measurement flow path.

Alternatively, the regulation section of the propagation path flow regulator is provided in the form of a lattice member whose wall surfaces extend along the flow direction. Thus, it is possible to regulate the flow direction by the wall surfaces extending along the flow direction, thereby further equalizing the flow velocity distribution in the ultrasonic wave propagation path and thus improving the measurement precision.

Alternatively, an interval between two adjacent regulation sections of the propagation path flow regulator is varied depending on a position along a transverse section of the measurement flow path. Thus, it is possible to optimize the aperture size according to the position along the transverse section of the measurement flow path while maintaining a reduced length of the regulation section along the flow direction. Therefore, it is possible to further equalize the flow velocity distribution in the ultrasonic wave propagation path and reduce the length of the regulation section along the flow direction, thereby reducing pressure losses while improving the measurement precision due to the equalization of the flow velocity distribution.

Alternatively, a cross section of the measurement flow path along a direction perpendicular to the flow therethrough has a rectangular shape. Thus, by employing the rectangular cross section, it is possible to increase the measurement area with respect to the total measurement cross-sectional area, thereby allowing for a flow measurement under the same condition from the upstream side to the downstream side of the ultrasonic wave propagation path. Moreover, it is possible to increase the two-dimensionality of the flow along the measurement flow path, thereby allowing for a high precision measurement of the average flow velocity of the fluid. Furthermore, it is possible to further increase the two-dimensionality of the flow by providing a second influent suppressor.

Alternatively, a cross section of the measurement flow path along a direction perpendicular to the flow therethrough has a rectangular shape with an aspect ratio less than 2. Thus, it is not necessary to create a two-dimensional flow by increasing the aspect ratio, and it is possible to freely set the cross-sectional specification according to the height of the flow path such that interference by reflected waves is reduced, thereby allowing for ultrasonic transmission/reception with an increased sensitivity. Moreover, it is possible to reduce the loss of pressure in the measurement flow path by adjusting the measurement cross section such that the length along which the measurement cross section contacts the fluid is reduced without excessively flattening the measurement cross section.

Alternatively, the aperture hole opens into the measurement flow path in a shape which has a side extending along a direction substantially perpendicular to the direction of the flow through the measurement flow path. Thus, it is possible to equally transmit/receive the ultrasonic wave with respect to the height direction of the measurement flow path, and to shorten the aperture length of the aperture hole in the measurement flow path along the flow direction. Therefore, it is possible to further reduce flow disturbances due to the aperture hole, thereby further improving the measurement precision.

Alternatively, an introduction section arranged on the upstream side of the measurement flow path is provided with a non-uniform flow suppressor which has a passage opening with a minute aperture. Thus, it is possible to supply a stable flow into the measurement flow path irrespective of the shape of the flow path or the piping configuration upstream of the measurement flow path, thereby reducing flow disturbances between the ultrasonic transducers. Therefore, it is possible to further increase the upper limit value for the flow rate measurement and to further improve the measurement precision. Moreover, it is possible to realize a stable measurement irrespective of the shape of the flow path or the piping configuration upstream of the measurement flow path, thereby increasing the freedom in the installment of the measurement device.

Alternatively, an introduction section arranged on the upstream side of the measurement flow path and an exit section arranged on the downstream side of the measurement flow path are each provided with a non-uniform flow suppressor which has a passage opening with a minute aperture. Thus, it is possible to supply a stable flow into the measurement flow path even when the fluid to be measured has a pulsating flow which is accompanied by a reverse flow or the fluid to be measured has a pulsation source on the downstream side. Therefore, it is possible to reduce flow disturbances between the ultrasonic transducers, to further improve the upper limit value for the flow rate measurement, and to further improve the measurement precision. Moreover, it is possible to realize a stable measurement irrespective of the shape of the flow path, the piping configuration, or the pulsation source, upstream or downstream of the measurement flow path, thereby further improving the freedom in the installment of the measurement device.

Alternatively, a cross-sectional area of the introduction section or the exit section is greater than cross-sectional area of the measurement flow path. Thus, it is possible to increase the installment cross-sectional area of the non-uniform flow suppressor so as to reduce pressure losses due to the non-uniform flow suppressor, thereby preventing increases in pressure losses. Moreover, it is possible to increase the cross-sectional area of the introduction section or the exit section, thereby allowing for attachment of the measurement device without changing the shape of the introduction section or the exit section even when the shape of the flow path or the piping configuration on the upstream side or the downstream side is varied. Thus, it is possible to realize a measurement device with an increased freedom in the installment thereof.

Alternatively, an aperture size of the passage opening of the non-uniform flow suppressor is less than an aperture size of a passage opening provided in the second influent suppressor. Thus, even when the upstream or downstream connection port is arranged with a positional shift, the fluid can equally flow within the measurement flow path, thereby allowing for a measurement with an increased measurement precision. Moreover, even when the fluid to be measured has a pulsation, it is possible to supply the fluid into the measurement flow path in a flow with a reduced pulsation due to the passage opening having a small aperture size, thereby improving the measurement precision even for a pulsating flow. Furthermore, due to the passage opening of the non-uniform flow suppressor having a small aperture size, it is possible to reduce the amount of dirt and/or dust entering the measurement section, thereby increasing the reliability of the measurement operation along the measurement flow path.

Alternatively, another ultrasonic flow meter of the present invention includes: a measurement flow path through which a fluid to be measured flows; ultrasonic transducers provided respectively on an upstream side and a downstream side with respect to each other along the measurement flow path; and an upstream aperture hole and a downstream aperture hole, the aperture holes for exposing the ultrasonic transducers to the measurement flow path, wherein at least one of the aperture holes includes a plurality of partitioned paths extending along a propagation direction of the ultrasonic wave. Thus, since the ultrasonic wave propagates through the fluid within the partitioned paths, there is little decrease in the sensitivity. Moreover, due to the partitioning of the paths, it is possible to maintain the rectilinear property of the ultrasonic waves and to realize a desirable transmission/reception thereof. Furthermore, the aperture flow path within the aperture hole provided along the side surface of the flow path is divided into small parts, whereby a vortex is less likely to occur and it is possible to reduce the flow of the fluid into the aperture hole. Therefore, it is possible to properly measure the flow rate even when a pulsation occurs.

Alternatively, at least one of the aperture holes includes a plurality of partitioned paths extending along a propagation direction of the ultrasonic wave. Thus, the fluid flow into the aperture hole can be reduced by the influent suppressor and the upper limit value for the measurement can be improved. Moreover, since the ultrasonic wave propagates through the fluid within the partitioned paths, there is little decrease in the sensitivity. Furthermore, due to the partitioning of the paths, it is possible to maintain the rectilinear property of the ultrasonic waves and to realize a desirable transmission/reception thereof. Moreover, the aperture flow path within the aperture hole provided along the side surface of the flow path is divided into small parts, whereby a vortex is less likely to occur and it is possible to further reduce the flow of the fluid into the aperture hole. Therefore, it is possible to properly measure the flow rate even when a pulsation occurs.

Alternatively, each of the partitioned paths has an inlet surface extending along a vibration surface of the ultrasonic transducer and an outlet surface extending along a wall surface of the measurement flow path. Thus, since the ultrasonic waves can enter the partitioned paths at a right angle and thus travel therethrough in a straight path, an ultrasonic wave propagation path with no reflection and little attenuation is provided. Moreover, since the outlet is a flat surface with respect to the wall surface of the flow path, there is no disturbance in the flow in the periphery layer along the wall surface of the flow path. Furthermore, due to the alignment of the outlet surface as the radiation surface, it is possible to radiate the ultrasonic wave efficiently.

Alternatively, each of the partitioned paths of one of the aperture holes extends colinearly with a corresponding one of the partitioned paths of the other aperture hole. Thus, the transmission surface and the reception surface are aligned with each other along the traveling direction of the ultrasonic wave, whereby it is possible to reduce the reflective attenuation thereof due to the partition plate in the partitioned paths of the opposing aperture hole.

Alternatively, one side of a vertical section of each of the partitioned paths is longer than a half wavelength of an ultrasonic wave used for transmission/reception. Thus, the viscosity influence from the partition surface is reduced, whereby it is possible to provide partitioned paths with little attenuation.

Alternatively, one side of a vertical section of each of the partitioned paths is not an integral multiple of a half wavelength of an ultrasonic wave used for transmission/reception. Thus, it is possible to suppress resonance in the lateral direction, thereby realizing an efficient propagation.

Alternatively, a distance between the partitioned paths of the aperture hole and the vibration surface of a corresponding one of the ultrasonic transducers is an integral multiple of a half wavelength of the ultrasonic wave. Thus, resonance is provided at the half wavelength, whereby it is possible to provide an efficient radiation.

Alternatively, a thickness of each partition of the partitioned paths is shorter than the wavelength of an ultrasonic wave used for transmission/reception. Thus, it is possible to prevent the reflection of the ultrasonic wave, thereby providing an efficient transmission/reception thereof.

Alternatively, the partitioned paths are formed by fitting a honeycomb lattice into the aperture hole. Thus, by the employment of a lattice, it is possible to divide each aperture hole in the vertical and lateral directions.

Alternatively, one of the partitioned paths has its opening at a center of the aperture hole. Thus, the aperture hole is aligned with the center of the ultrasonic transducer, thereby allowing for an efficient transmission/reception.

Alternatively, a path length of each of the partitioned paths is shorter than the wavelength of an ultrasonic wave used for transmission/reception. Thus, it is possible to provide an ultrasonic wave propagation path with little attenuation.

Alternatively, the partitioned paths are formed by arranging a net member in the aperture hole along a direction perpendicular to a propagation direction of the ultrasonic wave. Thus, by dividing the aperture hole with a net, it is possible to minimize the length of the path.

Alternatively, each of the partitioned paths includes a communication section at a certain point along its length for communicating the partitioned path with an adjacent one of the partitioned paths. Thus, it is possible to minimize the attenuation due to the partition plates.

What is claimed is:

1. An ultrasonic flow meter, comprising: a measurement flow path through which a fluid to be measured flows; ultrasonic transducers provided respectively on an upstream side and a downstream side with respect to each other along the measurement flow path: an upstream aperture hole and a downstream aperture hole, the aperture holes for exposing the ultrasonic transducers to the measurement flow path; a first influent suppressor provided for the upstream aperture hole and the downstream aperture hole for reducing inflow of the fluid to be measured into the aperture holes; a second influent suppressor provided on an upstream side of the measurement flow path with respect to the aperture holes for reducing the inflow of the fluid to be measured into the aperture holes; a measurement control section for measuring a propagation time of an ultrasonic wave between the ultrasonic transducers; and a calculation section for calculating a flow rate based on a signal from the measurement control section, wherein the first influent suppressor provided for the aperture holes is an aperture hole sealing section having ultrasonically transmissive holes; and an aperture ratio of the aperture hole sealing section provided for the upstream aperture hole is greater than an aperture ratio of the aperture hole sealing section provided for the downstream aperture hole.

2. An ultrasonic flow meter, comprising: a measurement flow path through which a fluid to be measured flows; ultrasonic transducers provided respectively on an upstream side and a downstream side with respect to each other along the measurement flow path; an upstream aperture hole and a downstream aperture hole, the aperture holes for exposing the ultrasonic transducers to the measurement flow path; a first influent suppressor provided in a vicinity of at least the downstream aperture hole for reducing inflow of the fluid to be measured into the aperture hole; a second influent suppressor provided on an upstream side of the measurement flow path with respect to the aperture holes for reducing the inflow of the fluid to be measured into the aperture holes; a measurement control section for measuring a propagation time of an ultrasonic wave between the ultrasonic transducers, and a calculation section for calculating a flow rate based on a signal from the measurement control section, wherein the first influent suppressor comprises an aperture hole sealing section having ultrasonically transmissive holes and is provided in the form of a meshed member of an inclined mesh pattern having an inclination with respect to a horizontal direction.

3. An ultrasonic flow meter, comprising: a measurement flow path through which a fluid to be measured flows; ultrasonic transducers provided respectively on an upstream side and a downstream side with respect to each other along the measurement flow path; and an upstream aperture hole and a downstream aperture hole, the aperture holes for exposing the ultrasonic transducers to the measurement flow path, wherein at least one of the aperture holes comprises a plurality of partitioned paths extending along a propagation direction of the ultrasonic wave.

4. An ultrasonic flow meter according to claim 3, wherein at least one of the aperture holes comprises a plurality of partitioned paths extending along a propagation direction of the ultrasonic wave.

5. An ultrasonic flow meter according to claim 3, wherein each of the partitioned paths has an inlet surface extending along a vibration surface of the ultrasonic transducer and an outlet surface extending along a wall surface of the measurement flow path.

6. An ultrasonic flow meter according to claim 3, wherein each of the partitioned paths of one of the aperture holes extends colinearly with a corresponding one of the partitioned paths of the other aperture hole.

7. An ultrasonic flow meter according to claim 3, wherein one side of a vertical section of each of the partitioned paths is longer than a half wavelength of an ultrasonic wave used for transmission/reception.

8. An ultrasonic flow meter according to claim 3, wherein one side of a vertical section of each of the partitioned paths is not an integral multiple of a half wavelength of an ultrasonic wave used for transmission/reception.

9. An ultrasonic flow meter according to claim 3, wherein a distance between the partitioned paths of the aperture hole and the vibration surface of a corresponding one of the ultrasonic transducers is an integral multiple of a half wavelength of the ultrasonic wave.

10. An ultrasonic flow meter according to claim 3, wherein a thickness of each partition of the partitioned paths is shorter than a wavelength of an ultrasonic wave used for transmission/reception.

11. An ultrasonic flow meter according to claim 3, wherein the partitioned paths are formed by fitting a honeycomb lattice into the aperture hole.

12. An ultrasonic flow meter according to claim 3, wherein one of the partitioned paths has its opening at a center of the aperture hole.

13. An ultrasonic flow meter according to claim 3, wherein each of the partitioned paths includes a communication section at a certain point along its length for communicating the partitioned path with an adjacent one of the partitioned paths.

14. An ultrasonic flow meter according to claim 3, wherein a path length of each of the partitioned paths is shorter than a wavelength of an ultrasonic wave used for transmission/reception.

15. An ultrasonic flow meter according to claim 14, wherein the partitioned paths are formed by arranging a net member in the aperture hole along a direction perpendicular to a propagation direction of the ultrasonic wave.

16. An ultrasonic flow meter, comprising: a measurement flow path through which a fluid to be measured flows; ultrasonic transducers provided respectively on an upstream side and a downstream side with respect to each other along the measurement flow path; an upstream aperture hole and a downstream aperture hole, the aperture holes for exposing the ultrasonic transducers to the measurement flow path; a first influent suppressor provided in a vicinity of at least the downstream aperture hole for reducing inflow of the fluid to be measured into the aperture hole; a second influent suppressor provided on an upstream side of the measurement flow path with respect to the aperture holes for reducing the inflow of the fluid to be measured into the aperture holes; a measurement control section for measuring a propagation time of an ultrasonic wave between the ultrasonic transducers; and a calculation section for calculating a flow rate based on a signal from the measurement control section, wherein: the first influent suppressor provided for the downstream aperture hole comprises aperture hole sealing means having ultrasonically transmissive holes; the second influent suppressor comprises a direction regulation section for adjusting a flow direction of the fluid to be measured and a variation suppressing section for making the flow velocity distribution uniform or reducing the pulsation of the flow; and the direction regulation section and the variation suppressing section are located in close vicinity to each other.

17. An ultrasonic flow meter according to claim 1, wherein the aperture hole sealing section is a meshed member of an inclined mesh pattern having an inclination with respect to a horizontal direction.

18. An ultrasonic flow meter according to claim 1, wherein a cross section of the measurement flow path along a direction perpendicular to the flow therethrough has a rectangular shape.

19. An ultrasonic flow meter according to claim 1, wherein a cross section of the measurement flow path along a direction perpendicular to the flow therethrough has a rectangular shape with an aspect ratio less than 2.

20. An ultrasonic flow meter according to claim 1, wherein the aperture hole opens into the measurement flow path in a shape which has a side extending along a direction substantially perpendicular to a direction of the flow through the measurement flow path.

21. An ultrasonic flow meter according to claim 1, wherein at least one of the aperture holes comprises a plurality of partitioned paths extending along a propagation direction of the ultrasonic wave.

22. An ultrasonic flow meter according to claim 1, wherein the first influent suppressor provided for the upstream aperture hole is a flow deflector.

23. An ultrasonic flow meter according to claim 22, wherein the flow deflector is provided on the upstream side and the downstream side of the aperture hole.

24. An ultrasonic flow meter according to claim 1, wherein the first influent suppressor provided for the upstream aperture hole is an aperture hole sealing section having at least one ultrasonically transmissive hole.

25. An ultrasonic flow meter according to claim 24, wherein an aperture ratio of the aperture hole sealing section provided for the upstream aperture hole is greater than an aperture ratio of the aperture hole sealing section provided for the downstream aperture hole.

26. An ultrasonic flow meter according to claim 1, wherein the first influent suppressor comprises an aperture hole sealing section having at least one ultrasonically transmissive hole and a flow deflector provided in a vicinity of the aperture hole.

27. An ultrasonic flow meter according to claim 26, wherein an aperture ratio of the aperture hole sealing section provided for the upstream aperture hole is greater than an aperture ratio of the aperture hole sealing section provided for the downstream aperture hole.

28. An ultrasonic flow meter according to claim 26, wherein the flow deflector is provided on the upstream side and the downstream side of the aperture hole.

29. An ultrasonic flow meter according to claim 1, wherein an introduction section arranged on the upstream side of the measurement flow path is provided with a non-uniform flow suppressor which has a passage opening with a minute aperture.

30. An ultrasonic flow meter according to claim 29, wherein a cross-sectional area of the introduction section or the exit section is greater than a cross-sectional area of the measurement flow path.

31. An ultrasonic flow meter according to claim 29, wherein an aperture size of the passage opening of the non-uniform flow suppressor is less than an aperture size of a passage opening provided in the second influent suppressor.

32. An ultrasonic flow meter according to claim 1, wherein an introduction section arranged on the upstream side of the measurement flow path and an exit section arranged on the downstream side of the measurement flow path are each provided with a non-uniform flow suppressor which has a passage opening with a minute aperture.

33. An ultrasonic flow meter according to claim 32, wherein a cross-sectional area of the introduction section or the exit section is greater than a cross-sectional area of the measurement flow path.

34. An ultrasonic flow meter according to claim 32, wherein an aperture size of the passage opening of the non-uniform flow suppressor is less than an aperture size of a passage opening provided in the second influent suppressor.

35. An ultrasonic flow meter, comprising: a measurement flow path through which a fluid to be measured flows; ultrasonic transducers provided respectively on an upstream side and a downstream side with respect to each other along the measurement flow path; an upstream aperture hole and a downstream aperture hole, the aperture holes for exposing the ultrasonic transducers to the measurement flow path; a first influent suppressor and a second influent suppressor for reducing inflow of the fluid to be measured into the aperture holes for both a forward flow and a reverse flow of the fluid to be measured; a measurement control section for measuring a propagation time of an ultrasonic wave between the ultrasonic transducers; and a calculation section for calculating a flow rate based on a signal from the measurement control section, wherein: the first influent suppressor provided for the aperture hole which is on the downstream side when the fluid flows in a forward direction is aperture hole sealing means having ultrasonically transmissive holes; the second influent suppressor comprises a direction regulation section for adjusting a flow direction of the fluid to be measured and a variation suppressing section for making the flow velocity distribution uniform or reducing the pulsation of the flow; and the direction regulation section and the variation suppressing section are located in close vicinity to each other and are provided on both an inlet side and an outlet side of the measurement flow path.

36. An ultrasonic flow meter according to claim 35, wherein the aperture hole sealing section is a meshed member of an inclined mesh pattern having an inclination with respect to a horizontal direction.

37. An ultrasonic flow meter according to claim 35, wherein a cross section of the measurement flow path along a direction perpendicular to the flow therethrough has a rectangular shape.

38. An ultrasonic flow meter according to claim 35, wherein a cross section of the measurement flow path along a direction perpendicular to the flow therethrough has a rectangular shape with an aspect ratio less than 2.

39. An ultrasonic flow meter according to claim 35, wherein the aperture hole opens into the measurement flow path in a shape which has a side extending along a direction substantially perpendicular to a direction of the flow through the measurement flow path.

40. An ultrasonic flow meter according to claim 35, wherein at least one of the aperture holes comprises a plurality of partitioned paths extending along a propagation direction of the ultrasonic wave.

41. An ultrasonic flow meter according to claim 35, wherein the first influent suppressor provided for the upstream aperture hole is a flow deflector.

42. An ultrasonic flow meter according to claim 41, wherein the flow deflector is provided on the upstream side and the downstream side of the aperture hole.

43. An ultrasonic flow meter according to claim 35, wherein the first influent suppressor provided for the upstream aperture hole is an aperture hole sealing section having at least one ultrasonically transmissive hole.

44. An ultrasonic flow meter according to claim 43, wherein an aperture ratio of the aperture hole sealing section provided for the upstream aperture hole is greater than an aperture ratio of the aperture hole sealing section provided for the downstream aperture hole.

45. An ultrasonic flow meter according to claim 35, wherein the first influent suppressor comprises an aperture hole sealing section having at least one ultrasonically transmissive hole and a flow deflector provided in a vicinity of the aperture hole.

46. An ultrasonic flow meter according to claim 45, wherein an aperture ratio of the aperture hole sealing section provided for the upstream aperture hole is greater than an aperture ratio of the aperture hole sealing section provided for the downstream aperture hole.

47. An ultrasonic flow meter according to claim 45, wherein the flow deflector is provided on the upstream side and the downstream side of the aperture hole.

48. An ultrasonic flow meter according to claim 35, wherein an introduction section arranged on the upstream side of the measurement flow path is provided with a non-uniform flow suppressor which has a passage opening with a minute aperture.

49. An ultrasonic flow meter according to claim 48, wherein a cross-sectional area of the introduction section or the exit section is greater than a cross-sectional area of the measurement flow path.

50. An ultrasonic flow meter according to claim 48 wherein an aperture size of the passage opening of the non-uniform flow suppressor is less than an aperture size of a passage opening provided in the second influent suppressor.

51. An ultrasonic flow meter according to claim 35, wherein an introduction section arranged on the upstream side of the measurement flow path and an exit section arranged on the downstream side of the measurement flow path are each provided with a non-uniform flow suppressor which has a passage opening with a minute aperture.

52. An ultrasonic flow meter according to claim 51, wherein a cross-sectional area of the introduction section or the exit section is greater than a cross-sectional area of the measurement flow path.

53. An ultrasonic flow meter according to claim 51, wherein an aperture size of the passage opening of the non-uniform flow suppressor is less than an aperture size of a passage opening provided in the second influent suppressor.

54. An ultrasonic flow meter, comprising: a measurement flow path through which a fluid to be measured flows, ultrasonic transducers provided respectively on an upstream side and a downstream side with respect to each other along the measurement flow path; aperture holes for exposing each ultrasonic transducer to the measurement flow path; a propagation path flow regulator provided along an ultrasonic wave propagation path between the upstream ultrasonic transducer and the downstream ultrasonic transducer and having a regulation section exposed to the flow; a measurement control section for measuring a propagation time of an ultrasonic wave between the ultrasonic transducers; and a calculation section for calculating a flow rate based on signal from the measurement control section.

55. An ultrasonic flow meter according to claim 54, wherein a distance between the propagation path flow regulator and the ultrasonic propagation path is varied depending on a type of the fluid to be measured.

56. An ultrasonic flow meter according to claim 54, wherein the regulation section of the propagation path flow regulator is provided in the form of a meshed member.

57. An ultrasonic flow meter according to claim 54, wherein the regulation section of the propagation path flow regulator is provided in the form of a lattice member whose wall surfaces extend along the flow direction.

58. An ultrasonic flow meter according to claim 54, wherein an interval between two adjacent regulation sections of the propagation path flow regulator is varied depending on a position along a transverse section of the measurement flow path.

59. An ultrasonic flow meter according to claim 54, wherein a cross section of the measurement flow path along a direction perpendicular to the flow therethrough has a rectangular shape.

60. An ultrasonic flow meter according to claim 54, wherein a cross section of the measurement flow path along a direction perpendicular to the flow therethrough has a rectangular shape with an aspect ratio less than 2.

61. An ultrasonic flow meter according to claim 54, wherein the aperture hole opens into the measurement flow path in a shape which has a side extending along a direction substantially perpendicular to a direction of the flow through the measurement flow path.

62. An ultrasonic flow meter according to claim 54 wherein at least one of the aperture holes comprises a plurality of partitioned paths extending along a propagation direction of the ultrasonic wave.

63. An ultrasonic flow meter according to claim 54, wherein the propagation path flow regulator is arranged on the upstream side and the downstream side with respect to the ultrasonic wave propagation path.

64. An ultrasonic flow meter according to claim 63, wherein the propagation path flow regulators arranged on the upstream side and the downstream side with respect to the ultrasonic wave propagation path are integrated together via a connector section.

65. An ultrasonic flow meter according to claim 54, wherein an introduction section arranged on the upstream side of the measurement flow path is provided with a non-uniform flow suppressor which has a passage opening with a minute aperture.

66. An ultrasonic flow meter according to claim 65, wherein a cross-sectional area of the introduction section or the exit section is greater than a cross-sectional area of the measurement flow path.

67. An ultrasonic flow meter according to claim 65, wherein an aperture size of the passage opening of the non-uniform flow suppressor is less than an aperture size of a passage opening provided in the second influent suppressor.

68. An ultrasonic flow meter according to claim 54, wherein an introduction section arranged on the upstream side of the measurement flow path and an exit section arranged on the downstream side of the measurement flow path are each provided with a non-uniform flow suppressor which has a passage opening with a minute aperture.

69. An ultrasonic flow meter according to claim 68, wherein a cross-sectional area of the introduction section or the exit section is greater than a cross-sectional area of the measurement flow path.

70. An ultrasonic flow meter according to claim 68, wherein an aperture size of the passage opening of the non-uniform flow suppressor is less than an aperture size of a passage opening provided in the second influent suppressor.

71. An ultrasonic flow meter, comprising: a measurement flow path through which a fluid to be measured flows; ultrasonic transducers provided respectively on an upstream side and a downstream side with respect to each other along the measurement flow path; aperture holes for exposing each ultrasonic transducer to the measurement flow path; a propagation path flow regulator provided along an ultrasonic wave propagation path between the upstream ultrasonic transducer and the downstream ultrasonic transducer and having a regulation section exposed to the flow; an influent suppressor for reducing inflow of the fluid to be measured into the aperture hole; a measurement control section for measuring a propagation time of an ultrasonic wave between the ultrasonic transducers; and a calculation section for calculating a flow rate based on a signal from the measurement control section.

72. An ultrasonic flow meter according to claim 71, wherein the propagation path flow regulators arranged on the upstream side and the downstream side with respect to the ultrasonic wave propagation path and the influent suppressor are integrated together.

73. An ultrasonic flow meter according to claim 71, wherein the influent suppressor is a first influent suppressor provided for the downstream aperture hole.

74. An ultrasonic flow meter according to claim 71, wherein the influent suppressor is a first influent suppressor provided for the upstream aperture hole and the downstream aperture hole.

75. An ultrasonic flow meter according to claim 71, wherein the influent suppressor is a second influent suppressor which is obtained by providing the propagation path flow regulator arranged along the ultrasonic wave propagation path with an influent suppressing section.

76. An ultrasonic flow meter according to claim 71, wherein the influent suppressor comprises a first influent suppressor provided for the aperture hole and a second influent suppressor obtained by providing the propagation path flow regulator with an influent suppressing section.

77. An ultrasonic flow meter according to claim 71, wherein a distance between the propagation path flow regulator and the ultrasonic propagation path is varied depending on a type of the fluid to be measured.

78. An ultrasonic flow meter according to claim 71, wherein the regulation section of the propagation path flow regulator is provided in the form of a meshed member.

79. An ultrasonic flow meter according to claim 71, wherein the regulation section of the propagation path flow regulator is provided in the form of a lattice member whose wall surfaces extend along the flow direction.

80. An ultrasonic flow meter according to claim 71, wherein an interval between two adjacent regulation sections of the propagation path flow regulator is varied depending on a position along a transverse section of the measurement flow path.

81. An ultrasonic flow meter according to claim 71, wherein a cross section of the measurement flow path along a direction perpendicular to the flow therethrough has a rectangular shape.

82. An ultrasonic flow meter according to claim 71, wherein a cross section of the measurement flow path along a direction perpendicular to the flow therethrough has a rectangular shape with an aspect ratio less than 2.

83. An ultrasonic flow meter according to claim 71, wherein the aperture hole opens into the measurement flow path in a shape which has a side extending along a direction substantially perpendicular to a direction of the flow through the measurement flow path.

84. An ultrasonic flow meter according to claim 71, wherein an introduction section arranged on the upstream side of the measurement flow path is provided with a non-uniform flow suppressor which has a passage opening with a minute aperture.

85. An ultrasonic flow meter according to claim 71, wherein an introduction section arranged on the upstream side of the measurement flow path and an exit section arranged on the downstream side of the measurement flow path are each provided with a non-uniform flow suppressor which has a passage opening with a minute aperture.

86. An ultrasonic flow meter according to claim 71, wherein at least one of the aperture holes comprises a plurality of partitioned paths extending along a propagation direction of the ultrasonic wave.

87. An ultrasonic flow meter according to claim 71, wherein the propagation path flow regulator is arranged on the upstream side and the downstream side with respect to the ultrasonic wave propagation path.

88. An ultrasonic flow meter according to claim 87, wherein the propagation path flow regulators arranged on the upstream side and the downstream side with respect to the ultrasonic wave propagation path are integrated together via a connector section.

* * * * *